(12) United States Patent
Charles

(10) Patent No.: US 6,333,826 B1
(45) Date of Patent: Dec. 25, 2001

(54) OMNIRAMIC OPTICAL SYSTEM HAVING CENTRAL COVERAGE MEANS WHICH IS ASSOCIATED WITH A CAMERA, PROJECTOR, OR SIMILAR ARTICLE

(76) Inventor: Jeffrey R. Charles, 2454 E. Washington Blvd., Pasadena, CA (US) 91104

( * ) Notice: Subject to any disclaimer, the term of this patent is extended or adjusted under 35 U.S.C. 154(b) by 0 days.

(21) Appl. No.: 09/036,612

(22) Filed: Mar. 7, 1998

Related U.S. Application Data

(60) Provisional application No. 60/043,701, filed on Apr. 16, 1997, and provisional application No. 60/055,876, filed on Aug. 15, 1997.

(51) Int. Cl.$^7$ .................................................. G02B 17/00
(52) U.S. Cl. ........................ 359/725; 359/728; 359/729; 359/731
(58) Field of Search .................................. 359/726–736, 359/725

(56) References Cited

U.S. PATENT DOCUMENTS

| | | |
|---|---|---|
| D. 312,263 | 11/1990 | Charles . |
| 2,638,033 | 5/1953 | Buchele et al. . |
| 3,229,576 | 1/1966 | Rees . |
| 3,822,936 | 7/1974 | Pinzone et al. . |
| 3,846,809 | 11/1974 | Pinzone . |
| 4,012,126 | 3/1977 | Dykes et al. . |
| 4,045,116 | 8/1977 | La Russa . |
| 4,078,860 | 3/1978 | Globus et al. . |
| 4,395,093 | 7/1983 | Rosendahl et al. . |
| 4,484,801 | 11/1984 | Cox . |
| 4,566,763 | 1/1986 | Greguss . |
| 5,115,266 | 5/1992 | Troje . |
| 5,185,667 | 2/1993 | Zimmerman . |
| 5,384,588 | 1/1995 | Martin et al. . |
| 5,627,675 * | 5/1997 | Davis et al. .......................... 359/729 |
| 5,631,778 | 5/1997 | Powell . |

FOREIGN PATENT DOCUMENTS 1.234341   10/1960   (FR) .

OTHER PUBLICATIONS http://www.behere.com; Subject Version First seen Mar., 29, 1997; "Our Stuff" Section; Be HERE Corporation Portal SI Panoramic Lens.

http://www.versacorp.com; Subject Document First Uploaded Mar., 9, 1997; Versacorp Axial Strut Omniramic Reflectors; by Jeffrey R. Charles.

http://www.eclipsechaser.com; Subject Document First Uploaded Mar., 9, 1997; Converting Panoramas to Circular Images and Vice Versa—Without a Computer!; by Jeffrey R. Charles.

http://www.eclipsechaser.com; Subject Document First Uploaded Feb., 14, 1997 Techniques for Wide Angle Eclipse Photography; Jeffrey R. Charles.

(List continued on next page.)

Primary Examiner—Scott J. Sugarman

(57) ABSTRACT

The present invention relates to an omniramic wide angle optical system which is associated with a camera, projector, medical instrument, surveillance system, flight control system, or similar article. The optical system typically consists of a Cassegrain system having a strongly curved convex reflecting surface with a prolate aspheric figure, a secondary reflector surface, and a modular imaging and correcting lens system. The invention further relates to the distribution of still or motion picture image elements by optical or electronic means, whereby the entire image or any subset thereof is converted from a two dimensional annular image or a segment thereof to a viewable horizontal image or a subset thereof; or, from a horizontal format image or a subset thereof into an annular image or a segment thereof. The present invention also relates to the capture, integration, and display of images having three dimensional information and the capture and presentation of sound and other attributes of real or artificially generated subject matter.

67 Claims, 34 Drawing Sheets

OTHER PUBLICATIONS http://www.nearfield.com/spherecam; Subject Version First seen Feb., 10, 1997; A Full Sphere Camera for Point of View and VR Photography; by Dan Slater.

American Photographer; Oct. 1932; Photography with Whole Sky Lens; by J. Slater.

http://www.cs.columbia.edu/CAVE/omnicam; Subject Version First seen Mar., 20, 1997; Omnicamera: Omnidirectional Video Camera; by the Computer Vision Laboratory of the Department of Computer Science at Columbia University.

http://www.behere.com; Subject Version First seen Feb., 9, 1997; "What's Up" Section; BE HERE Corporation Panoramic Lens.

http://www.versacorp.com; Subject Document First Uploaded Aug. 5, 1996 (or earlier); Portable All–Sky Reflector with "Invisible" Axial Camera Support; by Jeffrey R. Charles.

Unusal Telescopes; Cambridge University Press; by Peter L. Manly; Date Unknown (Probably 1991); Page Unknown; Photo and Brief Description of Axial Strut Wide Angle Reflector Using Metalized L'eggs Hose Egg for a Reflector.

Proceedings of the 1988 Riverside Telescope Makers Conference; 1988; pp. 74–80; Portable All–Sky Reflector with "Invisible" Camera Support; by Jeffrey R. Charles.

Astronomy Magazine; Apr., 1987; pp. 64–70; How to Build and Use an All–Sky Camera; by Jeffrey R. Charles, Robert Reeves, and Chris Schur.

Sky & Telescope; Aug. 1986; pp. 184 and 186; Gleanings for ATM's by Roger W. Sinnott.

Estes Park High School "Whispering Pine" Yearbook; 1977; End Sheet Photos; by Jeffrey R. Charles.

Gitzo Peri–Apollar Brochure.

Spiratone 1976 Bicentennial Sale Catalog; p. 28; Spiratone Birds Eye Attachment.

Vivitar Series 1 Solid Catadioptric Telephoto Lens System for 35mm Cameras; Available since the 1970's.

Hulchnerama 120 Brochure.

GlobuScope Panoramic Camera Brochure.

Garnett Vision Brochure and Exhibit; Hiroo Iwata; Institute of Engineering Mechanics; University of Tsukuba; Tsukuba, Japan; First seen at Siggraph Conference on Aug. 7, 1997.

Virtual Explorer Brochure and Exhibit; Senses Bureau; University of California, San Diego, Department of Chemistry and Biochemistry; First seen at Siggraph Conference on Aug. 7, 1997.

VIVIDS and AVATAR Brochure and Exhibit; Brooks Air Force Base; First seen at Siggraph Conference on Aug. 7, 1997.

Versacorp Omnidirectional (360°) and other Wide Angle Optical Instrumentation Brochure; First Distributed at Siggraph Conference on Aug. 5, 1997.

Melles Griot Optics Guide 5 Catalog; pp. 12–17 through 12–21; Rhodium Coated Electrolytically Replicated Nickel Paraboloidal and Ellipsoidal Reflectors; Printed in 1990.

http://www.versacorp.com; Subject Document First Uploaded Mar., 9, 1997, Last Revised Aug., 4, 1997; Versacorp Axial Strut Omniramic Reflectors and other Wide Angle Optical Systems; by Jeffrey R. Charles (A Revision of Ref. 5).

http://www.behere.com; Subject Version First seen Jun., 17, 1997; "Our Stuff" Section.

http://www.versacorp.com; Subject Document First Uploaded Jun., 14, 1997; Polar Projection and X–Y Omnidirectional Images; by Jeffrey R. Charles.

Omnimax Projection System; First seen at San Diego Planetarium in mid 1980's.

Proceedings of the May 8, 1995 Jet Propulsion Laboratory Mini Conference on Innovative Space Mission Applications of Thin Films and Fabrics; Published Sep., 1995; pp. 61–82; Airborne Large Aperture Telescope (ALAT) Paper; by Jeffrey R. Charles.

Popular Science; Mar. 1998; Top of p. 32; Camera in the Round.

Arizona Republic; Feb. 14, 1998; pp. E1 and E9; Virtual House Tours on the Web.

Arizona News–Sun; Feb. 7, 1998; p. B6; Camera Gives Buyers Virtual View.

P.C. Magazine; Jan. 20, 1998; Page Unknown; (Article Shows Be Here Portal SI).

CNN Science and Technology Week Program and Website; Website First seen Feb. 9, 1997; Be Here Panoramic Lens.

Chromed Metal Towel Bar Holder Having an Inwardly Offset (Rapially Compressed) Spherical Figure which Results in a Pointed Apex; First seen in 1976.

* cited by examiner

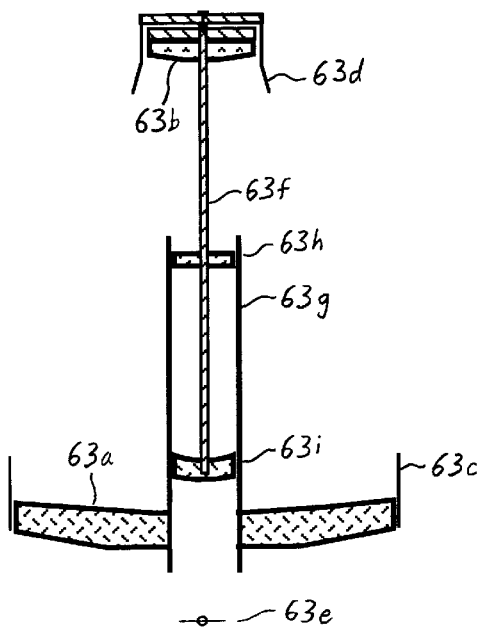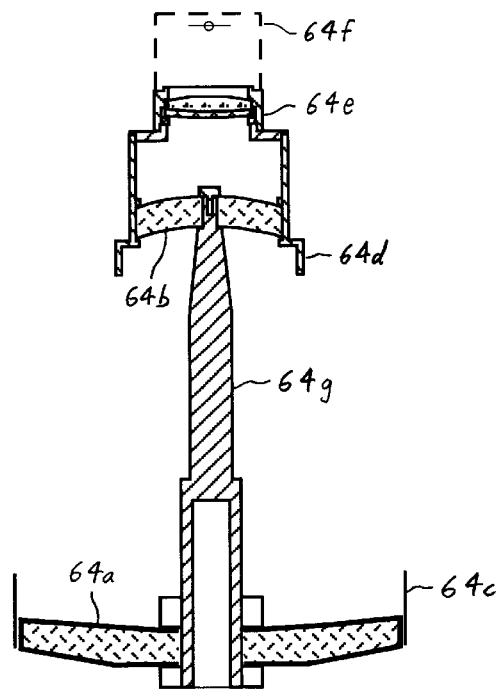
FIG. 63
FIG. 64

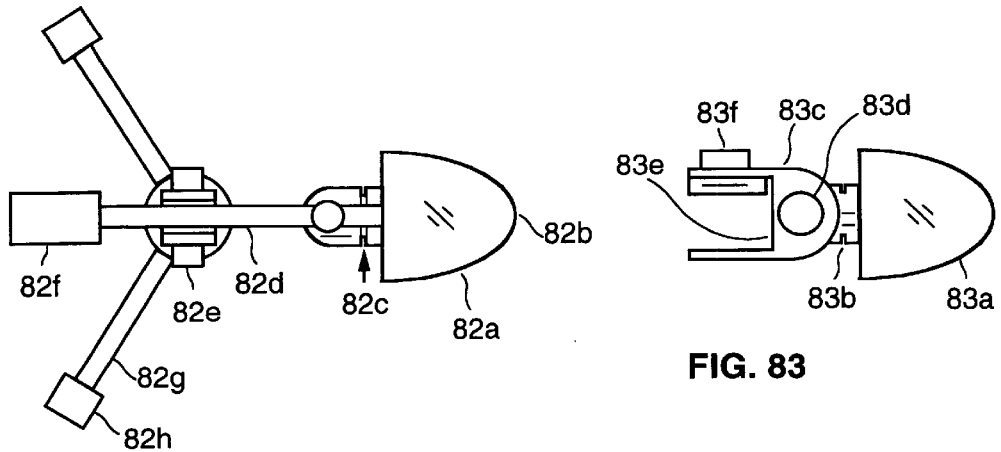
FIG. 82
FIG. 83
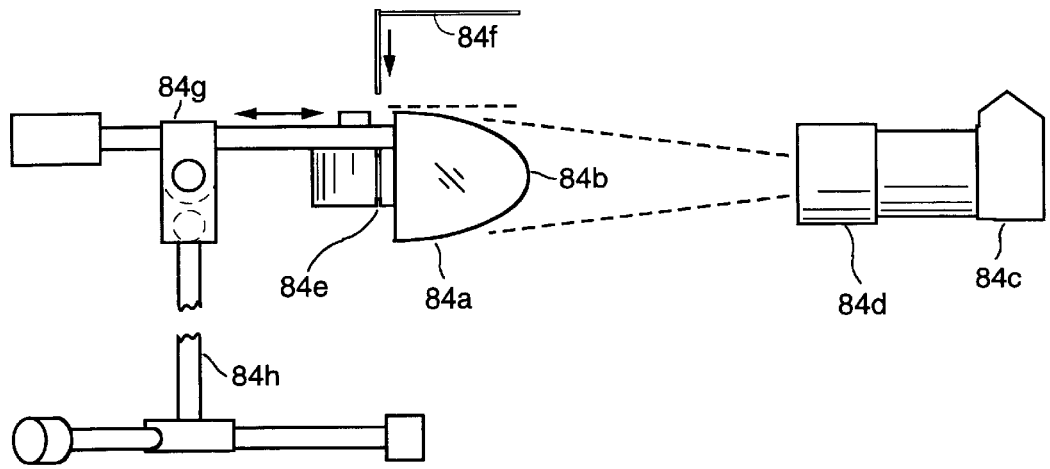
FIG. 84

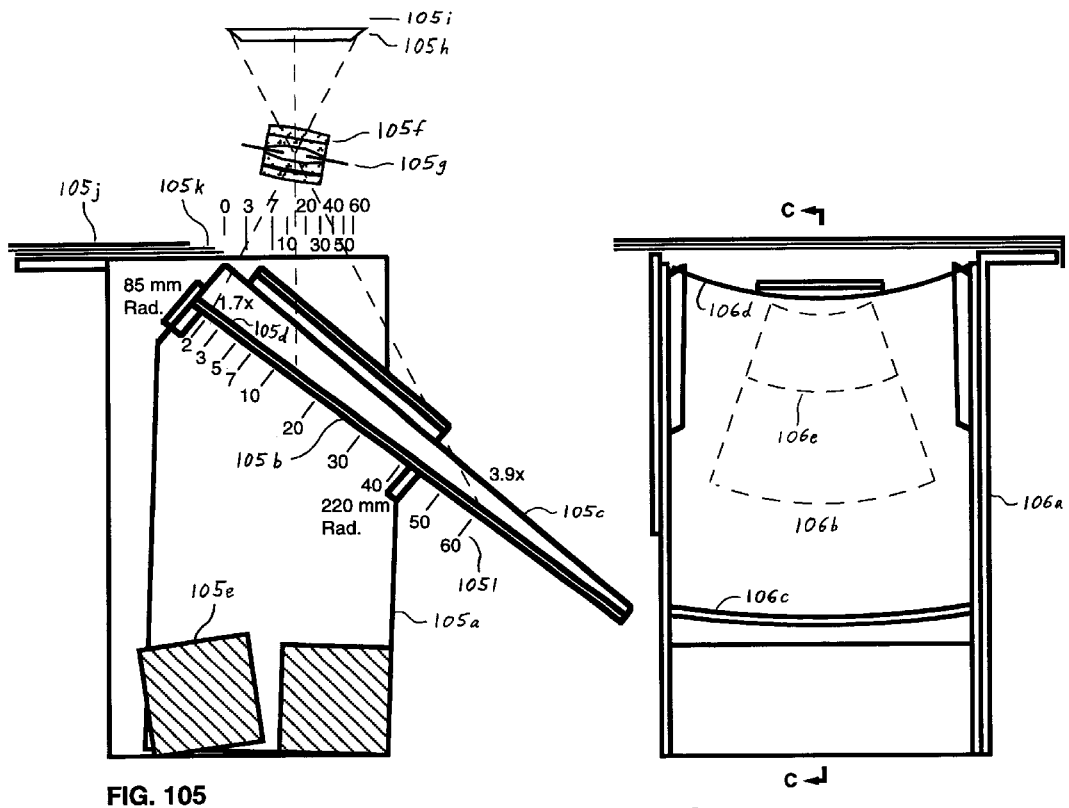
FIG. 105
FIG. 106
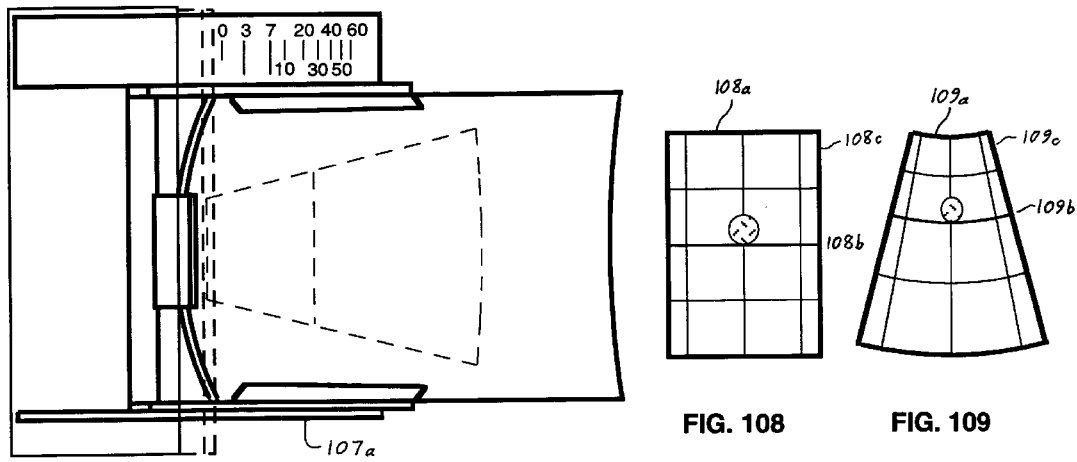
FIG. 107
FIG. 108
FIG. 109

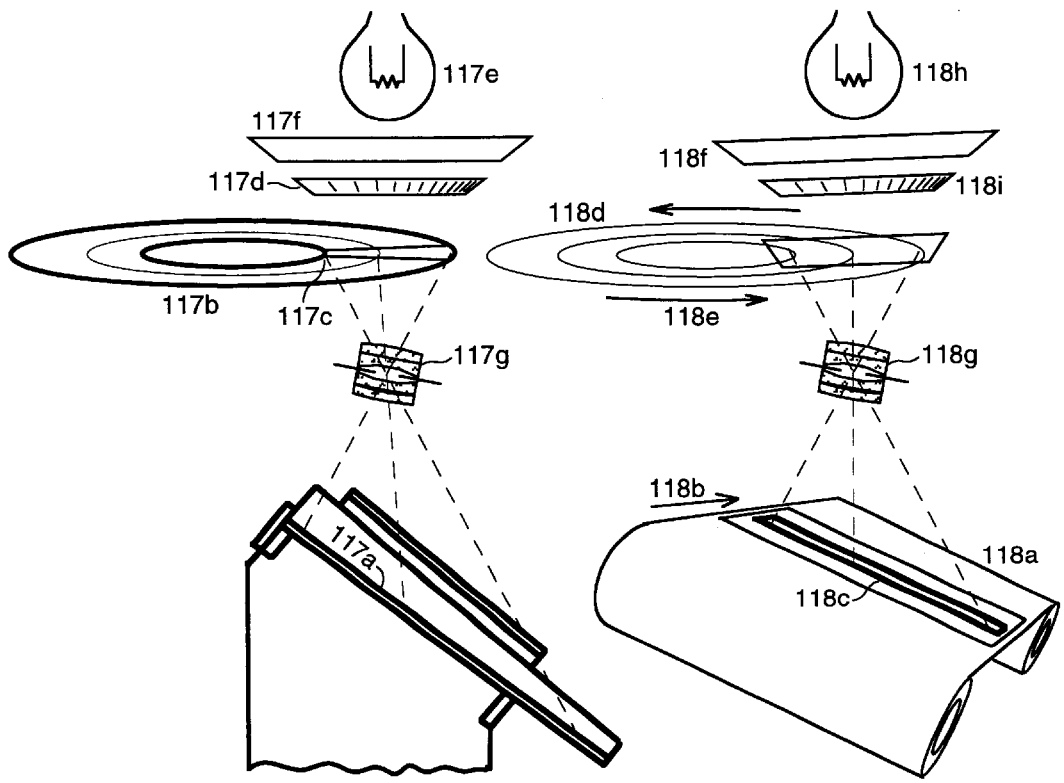
FIG. 117
FIG. 118
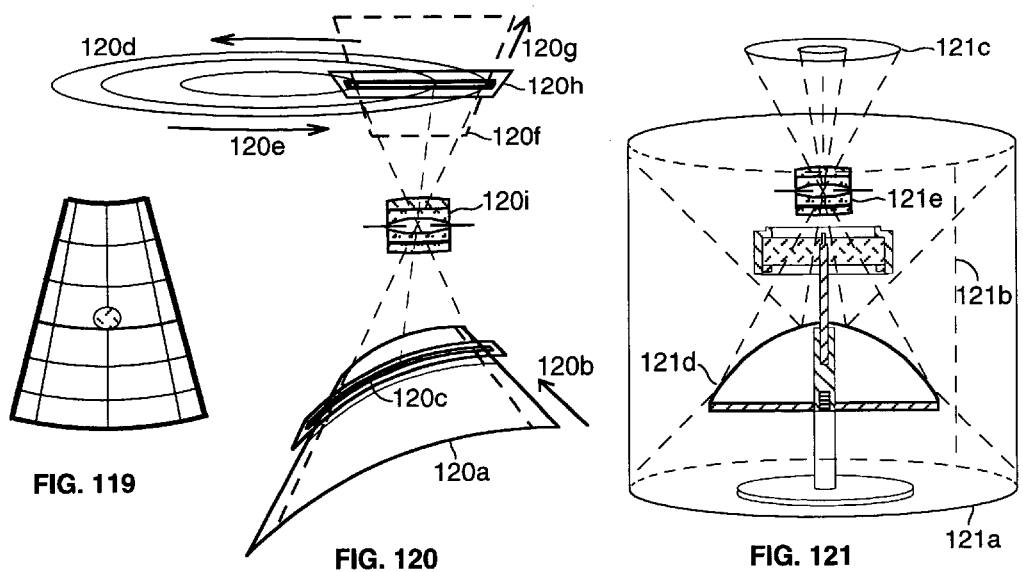
FIG. 119
FIG. 120
FIG. 121

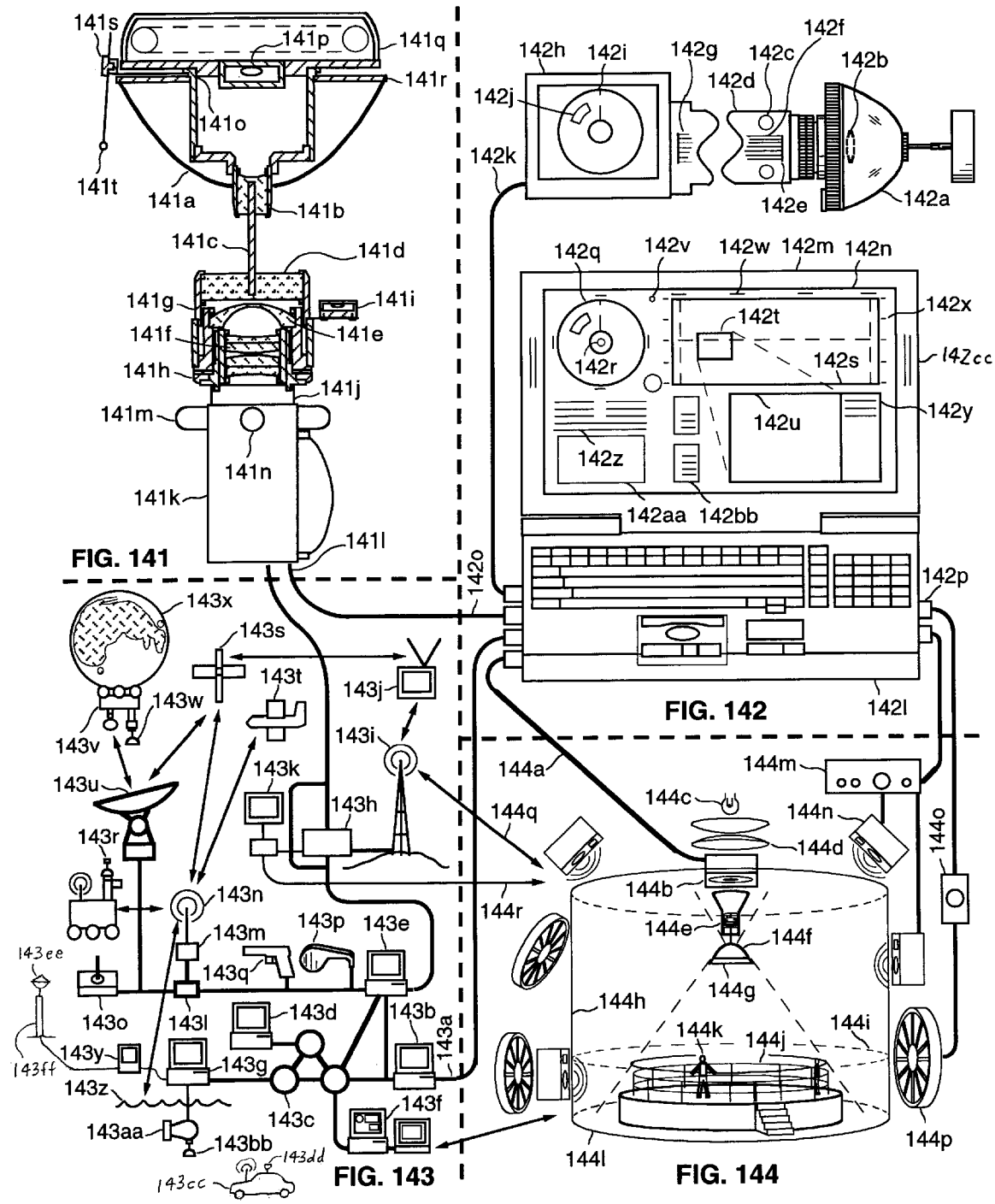

OMNIRAMIC OPTICAL SYSTEM HAVING CENTRAL COVERAGE MEANS WHICH IS ASSOCIATED WITH A CAMERA, PROJECTOR, OR SIMILAR ARTICLE

PRIORITY

This application claims the benefit of U.S. provisional application Ser. No. 60/043,701, filed Apr. 16, 1997. Further, this application claims the benefit of U.S. provisional application Ser. No. 60/055,876, filed Aug. 15, 1997. This application also claims the benefit of material originated by the applicant that was published less than one year prior to its filing. These include: "Versacorp Axial Strut Omniramic (TM) Reflectors" (IDS number 5, published Mar. 9, 1997); Converting Panoramas to Circular Images and Vice Versa— Without a Computer!" (IDS number 6, published Mar. 9, 1997), "Polar Projection and X-Y Omnidirectional Images (IDS number 30, published Jun. 14, 1997); "Versacorp Omnidirectional (360 deg.) and other Wide Angle Optical Instrumentation" brochure (IDS number 26, published Aug. 5, 1997).

FIELD OF THE INVENTION

The present invention relates to a wide angle optical system providing means for the simultaneous and seamless imaging of the entire great circle perpendicular to its optical axis, said imaging also encompassing a substantial angular area on either side of the plane of said great circle, whereby three dimensional space is transformed into a two dimensional annular format image or whereby a two dimensional annular image is projected onto a surrounding surface or into surrounding three dimensional media. The invention may be associated with or incorporated into a film camera, electronic camera, electronic sensor, projector, medical instrument, surveillance system, robotic system, command and control system, flight system, simulator, virtual reality booth, suite, theater, or similar article. The invention further relates to the distribution of still or motion picture images by optical or electronic means, whereby entire two dimensional annular images or any segments thereof are converted into viewable horizontal images or subsets thereof; or, from horizontal format images or any subsets thereof into annular images or a segments thereof. Further, the present invention relates to the capture, integration, and display of images having three dimensional information and the capture and presentation of sound and other characteristics of real or artificially generated subject matter.

DESCRIPTION OF THE RELATED ART

Many means for imaging a great circle of a sphere that is disposed around a particular vantage point are presently known. Assembly of a plurality of discrete images to form a fixed or moving panoramic image is common in the prior art. Assembly of two opposing images, each alternately taken with a fisheye lens having at least 180 degrees of coverage to image the entire sphere around the camera in two separate images is also known in the prior art. Alternate use of a single hemispherical fisheye lens to capture images in opposing directions, where said fisheye lens is used in combination with an indexing bracket having means to index the 180 degree zone of the typically distorted entrance pupil of said fisheye lens in the same spatial position when recording each of the opposing still images is also known, and is embodied in the IPIX (R) imaging system. Simultaneous use of two opposing cameras, each having a fisheye lens of at least 180 degrees coverage is also known, and is embodied in Dan Slater's Spherecam. The Spherecam facilitates instantaneous imaging of the entire sphere around the camera pair in two separate images.

Presently known panoramic motion picture systems include the Circle Vision 360 theater at Disneyland (R) and other systems having various degrees of coverage such as planetariums equipped with Omnimax (TM) projectors. The disadvantage of these systems is that each image has insufficient coverage to provide a 360 degree panorama in a single original image. Therefore, assembly of two or more images is required to provide a complete 360 degree panoramic image.

The use of a single refractive optical system in hyper hemispherical and panoramic imaging is common in the prior art. Systems utilizing refractive means include rotating panoramic cameras, fisheye lenses having more than 180 degrees of coverage, and J. M. Slater's whole sky lens, as shown on page 582 of the October 1932 issue of American Photographer. The system by Slater is difficult to manufacture with conventional optical fabrication equipment due to the deep internal curvature and delicate nature of its outer elements.

Reflectors are widely used in hyper hemispherical or panoramic imaging and projection. Systems of this type are shown in U.S. Pat. No. 5,631,778 (Panoramic fish-eye imaging system), U.S. Pat. No. 5,115,266 (Optical system for recording or projecting a panoramic image), U.S. Pat. No. 4,395,093 (Lens system for panoramic imagery), U.S. Pat. No. 4,012,126 (Optical system for 360 degree image transfer), U.S. Pat. No. 3,846,809 (Reflectors and mounts for panoramic projection), U.S. Pat. No. 3,822,936 (Optical system for panoramic projection), and D312,263 (the applicant's patent for a Wide angle reflector attachment for a camera or similar article), and as embodied in disclosures of the Columbia University Omnicamera and the Be Here (TM) panoramic lens prototype. These systems have various advantages and disadvantages, with excessive size, vulnerability of optical surfaces, weak mechanical components, or complexity versus image quality being the most common disadvantages.

Optical reflector configurations include a simple reflector disposed directly in front of a camera lens, as embodied in the Spiratone Birds Eye Attachment; a Cassegrain system having integral imaging optics as shown in U.S. Pat. No. 4,012,126 (Optical system for 360 degree image transfer) and FIGS. 6 through 12 of U.S. Pat. No. D312,263 (Wide angle reflector attachment for a camera or similar article); or a system having three or more reflectors, as shown in U.S. Pat. No. 5,627,675 (Optics assembly for observing a panoramic scene).

Support means for a camera or reflective optical element include a tripod; a transparent cylinder of the type embodied in the Spiratone Birds Eye Attachment; a transparent hollow semi-sphere of the type shown in U.S. Pat. No. 4,395,093 (Lens system for panoramic imagery) and U.S. Pat. No. 4,012,126 (Optical system for 360 degree image transfer); a transparent annular window combined with a short retaining fixture, as shown in U.S. Pat. No. 5,627,675 (Optics assembly for observing a panoramic scene), an axial strut and transparent optical substrate of the type shown in U.S. Pat. No. 5,115,266 (Optical system for recording or projecting a panoramic image), U.S. Pat. No. 3,846,809 (Reflectors and mounts for panoramic projection), and D312,263 (Wide angle reflector attachment for a camera or similar article), pages 74 to 80 of the 1988 Riverside Telescope Makers Conference proceedings, or pages 68 and 69 of the April, 1987 issue of Astronomy magazine; and a solid optical substrate, as in the applicant's co-pending provisional applications 60/043,701 and 60/055,876.

Systems having support means for a camera or secondary reflector that consist of a tripod or other off-axis structure have a disadvantage in that part of the subject matter is obstructed by off-axis elements of the support structure. Prior systems having axial strut supports have the disadvantage of a strut which influences an excessively large portion of the image, causes excessive flare, or is long or thin enough to be subject to damage or excessive flexure or vibration. Systems having outer refractive surfaces or enclosures have the disadvantage of being subject to flare from the additional exposed optical surface.

Reflective surfaces consist of a metallic coating on an external reflector surface (as shown and as shown on pages 79 and 80 of the proceedings of the 1988 Riverside Telescope Makers Conference); internal optical surfaces which utilize total internal reflection, as shown in U.S. Pat. No. 4,566,763 (Panoramic imaging block for three-dimensional space), the JPL Radial Profilometry paper, and Peri-Apollar lens; and an internal optical surface having a reflective coating, as shown in the applicant's provisional patent applications.

Reflector substrates include spun, machined, polished, or plated metal surfaces, as embodied in the applicant's larger hubcap reflector which is shown on page 186 of the August 1986 issue of Sky and Telescope magazine, page 68 of the April 1987 issue of Astronomy magazine, and as shown and described on pages 74 through 80 of the proceedings of the 1988 Riverside Telescope Makers Conference; electrolytically replicated metal surfaces, including those having an outer coating of rhodium, as embodied in Melles Griot concave light multipliers on page 12–17 of the Optics Guide 5 catalog; glass having a reflective coating, as embodied in the Spiratone Birds Eye attachment; transparent refractive material having a reflective coating, as shown in U.S. Pat. No. D312,263 (Wide angle reflector attachment for a camera or similar article); plastic having a reflective outer coating, as embodied in the applicant's smaller reflector invention on page 186 of the August 1986 issue of Sky and Telescope. These optical surfaces have various advantages and disadvantages, with most of the disadvantages relating to trades between cost, optical quality, and durability.

Some of the prior art consists of or incorporates refracting optics to eliminate field curvature. Some of these optics also reduce aberrations. Used alone, reflector systems can produce aberrations, with the most severe aberrations typically being off-axis.

Many of the principles related to aberrations from reflectors can be more elegantly illustrated through examination of the prior art in the more mature field of Cassegrain telescopes and telephoto catadioptric camera lens systems. Each of these optical systems differs significantly from a wide angle reflector in that the field of view is narrow and nearly the entire surface of the primary and secondary mirror is typically utilized in imaging each point of subject matter, while only a small percentage of a wide angle reflector is utilized in imaging each point of subject matter.

The relative figures of primary and secondary mirrors in Cassegrain telescopes or telephoto catadioptric lens systems can be optimized to reduce imaged on-axis aberrations to a size smaller than the Airy disk.

In a Cassegrain telescope, the figures of the primary and secondary mirrors can be optimized to affect off-axis aberrations in a way which reduces the severity of aberrations or results in an aberration which is relatively practical to correct by means of comparatively small auxiliary refracting optics which are located relatively near the focal plane. Cassegrain telescope systems include the Ritchey-Chrétien, a telescope having a concave hyperboloidal primary mirror and a convex hyperboloidal secondary mirror. This combination results in off-axis astigmatism, an aberration relatively difficult to correct with refracting optics if they are located in close proximity to the focal plane. Another Cassegrain system is the Classical Cassegrain, a telescope having a concave paraboloidal primary mirror and a convex hyperboloidal secondary mirror. Coma is the predominant aberration with this system, but coma is relatively easy to correct or reduce with refracting optics, even if they are located relatively near the focal plane. Accordingly, refractive coma correctors are commonly available for Cassegrain telescopes.

Simpler published coma corrector designs include those by Brixner, Jones, and Jones-Bird. These simpler systems are designed primarily for Newtonian telescopes and they correct coma at the expense of introducing other aberrations; however, these are advantageous when their use will reduce the overall size of the combined imaged aberrations to an acceptable level.

An effective corrector for Classical Cassegrain and Schmidt-Cassegrain telescopes is a multiple element system offered by Celestron, and more recently, by Meade Instruments. This optical system has substantial positive optical power which results in a faster numerical focal ratio at the focal plane than that of the telescope alone. More sophisticated corrector lenses are utilized in compact Catadioptric telephoto camera lenses- These include the Nikon 500 mm telephoto mirror lens and the Vivitar 800 mm Solid Catadioptric telephoto lens for a 35 mm camera. In catadioptric telephoto lenses, corrective lenses are occasionally used in combination with reflective optics in which imaging aberrations that are roughly equal and opposite to the residual aberrations of said corrective lenses have been deliberately introduced.

In the case of a convex wide angle reflector, a virtual image typically exists on an imaginary curved surface typically being disposed behind said convex reflector. When a real image is produced by means of imaging the virtual image with a conventional imaging lens system, aberrations present in said virtual image are typically repeated to the real image. In addition, the curvature of the virtual image results in curvature of the surface of best focus for the real image. Therefore, a wide angle reflector system must incorporate or otherwise utilize means for correcting field curvature and reducing or correcting aberrations in the virtual image if the real image is to be of high overall resolution and still facilitate a flat focal surface. Imaging lens systems having means to correct field curvature and at least some aberrations exist in the prior art. An imaging lens system of this type is shown in U.S. Pat. No. 4,484,801 (Panoramic lens with elements to correct Petzval curvature), U.S. Pat. No. 4,395,093 (Lens system for panoramic imagery), U.S. Pat. No. 4,012,126 (Optical system for 360 degree image transfer).

Corrective optics not previously associated with wide angle imaging include some of the concepts mentioned above for telescope optics, corrector lenses, and telephoto lenses or curved field lens systems of the type used to sharply image the curved surface of a CRT, in older oscilloscope cameras. Association of these optics with one or more wide angle optical surfaces forms a part of the present invention.

Means for accurately indicating the boundaries of coverage include a flat plate behind the primary reflector, as shown in pages 78 through 80 of the proceedings of the 1988 Riverside Telescope Makers Conference; a curved mask behind the convex reflector having its concave side toward the rear surface of the reflector, as shown in U.S. Pat. No. 5,627,675 (Optics assembly for observing a panoramic scene); a sudden change in the reflectivity of the reflector surface, as in U.S. Pat. No. D312,263; and a cell which retains the outer perimeter of the reflector, as shown in U.S. Pat. No. D312,263.

In his prior U.S. Pat. No. D312,263 and in a subsequent publication, the applicant has shown means for imaging a field of view which encompasses the entire great circle surrounding a particular vantage point. Functional details are not described in patent D312,263, so a brief description of functions the applicant can determine (by virtue of being the inventor thereof) is provided here. The first embodiment shown patent D312,263 (FIGS. 1 through 5) consists of a simple convex reflector, with support means for a camera and imaging optics. The second embodiment (FIGS. 7 through 12) consists of two external reflectors and a small imaging lens system. In the second embodiment, the incoming light is reflected by a strongly curved convex reflector having a prolate aspheric figure to a smaller flat secondary mirror which is centered on the optical axis directly in front of said primary reflector, being supported by an axial strut. From the secondary mirror, light is reflected through a transparent area in the center of the primary reflector substrate, where it is refracted by an imaging lens to produce a real image of the virtual image formed by the primary reflector at the focal plane. The end of the axial strut closest to the camera is supported by the transparent area in the center of the primary reflector. Disadvantages of this system include a relatively long axial strut and a simplified imaging lens system which does not adequately correct off-axis aberrations.

Prior art in the field of electronic image processing that is applicable to panoramic imaging includes the "polar coordinates" filter in Adobe Photoshop (TM), which is capable of converting an entire circular or annular image into a square image which can then be scaled in one dimension to provide a rectangular panoramic image having relatively normal image proportions. Disadvantages of this system include the fact that several steps are required if the image elements are to be redistributed in a way that provides an undistorted result. These steps include manually cropping the image so that the circular or annular portion is centered within a square. Furthermore, the applicant has discovered that the circle in the image which corresponds to a flat horizon must be centered in the square image area if the horizon in the final image is fo be straight. After the image is converted from polar to rectangular coordinates, it must be scaled in one axis in order to provide normal proportions for objects at the horizon. Additional steps which form a part of the present invention are required in order to provide normal proportions in elements of the image which are a significant distance above or below the horizon. A further disadvantage of the polar coordinates filter is that the entire circumference of the annular or circular image must be converted in order to view any part of it in rectangular coordinates. This can be inefficient at times when only part of the original image contains the subject matter of interest.

In the field of the present invention, it is important to distinguish between two definitions which are often applied to the concept of an "omnidirectional" field of view or a 360 degree angle of view:

In the context of this patent application, the most accurate definition relates to the actual angle of view of an optical system, where the specified angle of view is determined by the true angular coverage of said optical system relative to its optical axis; meaning that if an optical system is truly has 360 degree omnidirectional coverage, it must cover the entire sphere around itself. According to this definition, the present invention is not typically capable of imaging the entire sphere in a contiguous image owing to a conical exclusion zone behind its primary reflector, and in some embodiments, a second conical exclusion zone in front of the primary reflector.

The more inaccurate definition of omnidirectional relates to the fact that a great circle (such as the horizon) can be imaged by an optical system which has a field of view greater than 180 degrees. Such a system is not truly omnidirectional. This definition is often used in promotional material to incorrectly specify that an optic covers 360 degrees, when in fact it may only cover something like 240 degrees. According to this definition, all embodiments of the present invention (including those with a central angular obscuration) would cover 360 degrees. In order to eliminate confusion, the applicant's term "Omniramic" shall be used to describe this type of coverage.

BRIEF SUMMARY OF THE PRESENT INVENTION

The applicant has shown in his provisional patent application Ser. No. 60/043,701 an improved means for imaging a 360 degree field of view which is omniramic, or nearly omnidirectional. In his provisional patent application Ser. Nos. 06/043,701 and 60/055,876 and in his referenced publications that were published less than one year prior to the filing of the present application, the applicant has further shown means for the photographic and electronic transformation and distribution of still and full motion omniramic images and segments thereof.

It is an object of the present invention to provide improved means for simultaneously and seamlessly imaging up to the entire 360 degrees of a great circle perpendicular to its optical axis, said imaging further encompassing a substantial angular area on either side of the plane of said great circle, whereby three dimensional space surrounding the invention is transformed into one or more two dimensional annular images or vice versa. More particularly, the present invention relates to a wide angle optical imaging system that typically includes reflecting and refracting optics, said optics providing means for the geometric transformation of three dimensional space surrounding the invention into one or more two dimensional annular or sectored images, or, the transformation of one or more two dimensional annular or sectored images into one or more two or three dimensional projected images which surround the invention or which are distributed and displayed at remote locations. The invention is associated with or incorporated into a camera, projector, medical instrument, surveillance system, robotic system, flight control system, simulator, or similar article.

Images produced or projected by the invention are applicable to many fields, including ordinary or full motion indoor and outdoor panoramic photography with various format cameras; omniramic and omnidirectional recording of subjects for virtual reality applications with a film camera, electronic camera, or similar article; omniramic or omnidirectional projection of imaged subject matter or artificially generated images in settings including planetariums, theme parks, conference rooms; theaters, suites, booths, or goggles; home entertainment and maintenance systems; videography; live or delayed broadcast including that via radio carrier waves, closed circuit systems, or the Internet; surveillance; minimally invasive omnidirectional observation and imaging of difficult to access subjects, as applicable to dry or immersion bore scopes or laparascopic instrumentation; the enabling and enhancement of assembly and inspection techniques; omnidirectional expansion or reception of lasers and other light sources for applications including illumination, optical communication, or optical motion sensing; robotic vision systems including rovers and unmanned automomous vehicles (UAVs); vision and subject recognition for autonomous and other flight or vehicle or instrument command and control or simulation systems, including virtual reality systems; and for viewing, observing, measuring, imaging, recording, broadcasting, projecting, or simulating defined or diffuse subjects of large angular subtense, including crowds, architecture, landscapes, weather related events, or the boundary of the lunar umbra as projected on the earth's atmosphere during a total solar eclipse. The invention is also associated with integral or separate microphones which are used in recording or monitoring single or multiple channels of sound from the subject. The invention is further associated with sound generation means which include speakers, as well as systems which simulate wind, smell, and other attributes of real or artificially generated subject matter.

The present invention is applicable to both original imaging of a subject and for projection of photographic or artificially generated (including computer generated) images. The invention is also applicable to the reception or transmission of light or other radio energy for purposes other than imaging. In addition, some embodiments may have applications to transducers or microphonics or sound distribution in media including air and liquid.

For clarity, the invention will typically be described in terms of an optical imaging system such as that used with or incorporated into a film or electronic camera. Obviously, directions traveled by light or other energy or particles or media or wave forms will be reversed where the invention is used for projection, and, in the cases of imaging or applications other than imaging, the subject energy or particles or wave forms will propagate according to the same laws of physics regardless of the direction and whether or not imaging applications are involved.

The optical system may be used in any orientation; however, it is typically used in a vertical orientation (i.e pointed up or down) for 360 degree panoramic (i.e. "omniramic") applications. When so used, a preferred embodiment of the invention images the entire horizon and a substantial angle above and below the horizon as a two dimensional annular image, or as a two dimensional segmented image or two or more concentric images which contain three dimensional information. The maximum practical field of view for a contiguous image produced by the invention includes the entire sphere around the primary reflector with the exception of a conical area behind the primary reflector that may be as small as a few [dozen] degrees in subtense. The extreme frontal coverage of the widest embodiment is facilitated in part by a torroidal primary reflector figure.

The present invention provides images containing three dimensional data by means of opposing reflectors, concentric reflectors, scalloped reflectors, or any combination thereof. Embodiments having both scalloped and concentric or opposing reflectors provide three dimensional information in multiple axes. Three dimensional images produced by the invention typically consist of concentric, sectored, or hybrid annular images which may be disposed on a single focal surface or on separate focal surfaces. These images may be analyzed, converted and displayed as flat or curved three dimensional panoramas or immersive whole scene images or segments thereof, or projected back through an appropriate embodiment of the invention or other optical system to provide a projected three dimensional "stereo" image which surrounds the invention or viewing participants.

A preferred embodiment of the invention typically consists of a strongly curved convex primary reflecting surface which may have a prolate aspheric figure and a hole or transparent area in its center, said primary reflecting surface having sufficient curvature to image a field of view greater than 180 degrees, thereby providing means to image a great circle surrounding it; a secondary reflector (in some embodiments), an imaging and correcting lens system which is optically disposed between and in optical communication with the primary or secondary reflector and the focal surface of a camera or other article, light baffles, aperture adjustment means, tilt indication means, adjustable objects to effectively cover bright light sources and reduce flare, and mechanical mounting components.

Mounting components for a preferred embodiment may include an axial strut to axially support instrumentation, a camera, or a secondary reflector in front of the primary reflector without obstructing subject matter or a projection surface which is disposed perpendicular to the optical axis; with the end of said axial strut closest to the focal surface being supported by an optically clear lens or window. The axial strut in the present invention is optimized to minimize its effect on central parts of the image while also being rigid enough to provide stable support and minimize susceptibility to damage or excessive flexure or vibration. Other embodiments of the invention may support instrumentation, a camera, or a secondary reflector by means of an off-axis vane having a thin profile as seen from the optical axis, said vane also providing means for routing wires or other fixtures.

Features of the present invention may be interchanged (or combined with prior art) to optimize it for various applications. Degrees of freedom resorted to in different embodiments of the invention include but are not limited to the materials and manufacturing techniques used to make the invention; the size of the invention, the eccentricity (degree of aspheric figure, if not spherical) and degree of curvature of the primary reflector figure; the radial modification or offset (including torroidal curvature, where present in an embodiment), if any, of the primary reflector figure; the existence, size, and figure of the transparent window (or nonreflective area in the center of the primary reflector surface, where a transparent substrate is used), whether or not said window or transparent area supports an axial strut, whether or not the surfaces of said window or transparent area are flat or curved on order to have optical power; the existence, size, and figure of the secondary reflector (flat, concave, convex, spherical, aspheric, continuous or radially modified or radially discontinuous curvature), the existence, size, and figure of additional reflectors which may oppose or surround the invention's other reflector surfaces; the existence, size, and figure of scallops on any of the optical surfaces; the existence, size and figure front refractive surfaces for the primary or secondary reflectors, the size and type of primary baffle used, the existence, size, and type of a secondary baffle; the existence, size, and type of imaging and correcting optics; whether or not some or all of the imaging or correcting optics are an integral part of a transparent reflector substrate; the existence and figure of the imaging lens or lenses; whether the imaging optics are interchangeable or are a permanent part of the overall optical system; whether the imaging optics provide a real image in an interchangeable lens camera or serve as an a focal interface for a fixed lens or other camera; whether or not aperture adjustment means are provided; the means used for aperture adjustment or the correction of aberrations or field curvature; the position of the focal plane relative to the invention; and any combination of these degrees of freedom.

The original 360 degree panoramic image produced by a preferred embodiment of the invention is annular. An annular panoramic image may be viewed directly; however, such images may seem distorted to most observers. Therefore, it is typically desirable to convert the annular image to a more conventional rectangular format.

It is a further object of the present invention to provide means to transform the annular image into one or more images that are projected, printed, or otherwise displayed on surfaces or in media which surrounds the invention or observers of said images. This is typically accomplished by using the optical system of the invention as a projection or enlarging optic. Furthermore, it is an object of the present invention to provide means to transform all or part of one or more original annular images into one or more still or motion picture panoramas or segments thereof which are printed or otherwise viewed on a flat or relatively flat surface, or to the transformation of one or more panoramic images into one or more annular images.

In his 1977 publication of a segmented annular image in the end sheet of a school year book, the applicant has shown the results of, but not the means for, his October 1976 reduction to practice of the incremental conversion of a series of photos which make up a rectangular panorama into a flat annular image. The intensive proof of concept work which preceded the 1977 publication provides for the incremental geometric conversion of a straight panorama into an annular image as well as the incremental conversion of an annular image into a rectangular one. The applicant's subsequent work provided means for continuous and instantaneous conversion of such images and the basis for similar redistribution of elements of an image by electronic means which include digital image processing.

The applicant has shown in his paper of Mar. 9, 1997 entitled "Converting Panoramas to Circular Images and Vice Versa—Without a Computer!" the means he invented in 1976 to convert a rectangular format panorama into a circular (or annular) image, and vice versa. The applicant implemented the described processes and techniques in a photographic darkroom during October, 1976 to incrementally convert a linear series of photographs covering the entire 360 degree horizon into a flat and continuous annular image while maintaining high resolution and providing for the appropriate curvature of the subject matter therein.

These techniques form a part of the present invention and utilize a custom made tilted concave easel which receives unexposed photographic paper or film, said tilted easel being curved according to a conical surface and providing active linear dodging and color filtration means to compensate for reciprocity failure in the photographic paper or film caused by the varying exposure time which is required along the length of the print surface due to the pronounced tilt of said easel. Combined with an enlarger having a wide angle lens and a tiltable lens standard, the concave easel facilitates incremental conversion of an rectangular image to an annular format, or the incremental conversion of an annular image into a rectangular format.

The applicant further described that these basic techniques are applicable to geometric conversion of images by exposing paper or film on a moving flat or curved easel through a slit which is in optical communication with a lens and a moving carrier for the original image.

Additionally, the applicant described that these techniques are applicable to other modes of image manipulation, including digital image processing. Digital image processing is not constrained by the physical size of optics, stiffness of photographic media, or the relative distance between the equivalent of a lens and photographic media. Therefore, it can provide more degrees of freedom and greater extremes of image manipulation than single or multiple stage darkroom based techniques, and it is not limited to incremental or linear image conversion processes. Digital image processing or other image or data manipulation based on the applicant's prior darkroom techniques provide means for the geometric conversion of an annular image such as that produced by the present optical invention into a distorted or undistorted rectangular format and vice versa, said image processing means also providing for the extraction of distorted or undistorted parts of the image.

The applicant has described in his paper of Feb. 14, 1997 entitled "Techniques for Wide Angle Eclipse Photography" (which was renamed as "Techniques for Wide Angle Panoramic Photography of the Lunar Umbra at Total Solar Eclipses" prior to the filing of the present application) concepts, calculations, and methods for active pixel assignment which are primarily used to correct for radial expansion characteristics of a rectilinear wide angle lens when it is used with an incrementally or continuously rotating panoramic camera having a predominantly linear sensor array of substantial width.

These pixel assignment methods may also be used for applications not mentioned in the paper to further enhance the image analysis and processing aspects of the present invention. Therefore, the present invention incorporates the applicant's concepts, calculations, and pixel assignments to the processing and distribution of its images, whereby said concepts, calculations, and pixel assignments provide and enhance means for geometrically or electronically transforming one or more two dimensional annular images or a segment thereof or segments thereof to one or more rectangular images or subsets thereof; or provide means for the reverse, where said images are still images, elements of motion pictures. Further, the present invention applies the concepts, calculations, and pixel assignments to the reduction of distortion in transformed images or segments thereof. These means are also applicable to processing, analysis, or manipulation of rastor sweeps, flashes, or other phenomenon which relate to illumination, switching, or other applications other than aesthetic imaging.

The image processing and manipulation means may be applied to original images produced by optical systems including those of the present invention, as well as to images from other optical systems which may include reflectors, combined refracting and reflecting systems, refracting systems having continuous or hybrid surfaces, and assemblies or elements which include one or more Fresnel optical surfaces. Furthermore, image processing may be applied to the integration and display of images having three dimensional information, as well as to computer generated images; patterns and data of various origins; and to other material which is not necessarily originated, obtained, or modified through the use of wide angle optics.

The invention will be more clearly understood from consideration of the following description in connection with accompanying drawings that form a part of this specification.

BRIEF DESCRIPTION OF THE DRAWINGS

Drawing sheets 1 through 5 show the angular distribution of circular, annular, and sectored virtual images which may be produced with the present invention or by reflection from reflectors having various optical figures or in some cases by refracting systems. Some of the figures also show the imaged appearance of spherical objects or panoramic scenes in the field of view in order to reveal the degree of local distortion in the image. The first few figures are renderings of virtual images which may be produced by simple optical systems such as convex reflectors. A real image of such a virtual image results at a focal surface when said virtual image is imaged by conventional or specialized imaging optics. Other suitable optical systems of varying complexity may obviously be used to provide the same results. The detailed description addresses the specific characteristics of each optical figure.

In the case of each of the first several figures, it is assumed that the optical axis of the reflector or other optical system is pointing straight up. Accordingly, zero degrees in the figure is considered to be the zenith, or straight up, and the angles indicated on the concentric circles are for the included angle of view at each indicated zone of the image. Therefore, for indicated angles of less than 180 degrees, the angle from the optical axis in front of the invention is half of that indicated. For indicated angles larger than 180 degrees, the angle from the optical axis is in relation to an extension of the optical axis behind (or below) the invention. Here, the angle from the optical axis is half of the result of: 360 degrees minus the indicated angle.

FIG. 63 is a side cross sectional view of a Cassegrain telescope in which the secondary reflector is supported by an axial strut.

FIG. 64 is a side cross sectional view of an astrograph in which correcting optics and a focal surface are supported by an axial strut.

FIG. 82 is a top view of a reflector which may be used with a separate camera.

FIG. 83 is a top view of a wide angle reflector, also showing an adjustable clamp.

FIG. 84 is a side elevational view of the apparatus of FIG. 82, also showing a camera.

FIG. 105 is a side cross sectional view of a curved easel which is used to incrementally convert a panoramic image to or from a rectangular or circular format, also showing a film carrier, enlarging lens, and means for active dodging and filtration of the projected image.

FIG. 106 is a side view of the easel of FIG. 105, taken from the right side thereof.

FIG. 107 is a top plan view thereof.

FIG. 108 is a rendering of a rectangular format image which may make up a segment of a panorama.

FIG. 109 is a rendering of the angular distribution of the subject matter of FIG. 108 after it has been re-imaged through the use of the easel shown in FIG. 105.

FIG. 117 is a simplified side cross sectional view of easel having a focal surface like or similar to that in FIGS. 105 or 114, also showing neutral density filtration means which compensate for the varying distances and projection angles of the easel surface.

FIG. 118 is a pictorial view of an apparatus based on the easel of FIG. 105, also showing neutral density filtration, a slit, and means to rotate the annular image and translate photographic media; in which the annular image is rotated and projected through a slit onto the focal surface of the easel. Variations of the focal surface of said easel may be curved in two axes.

FIG. 119 is a rendering of the angular distribution of a circular image captured with a spherical reflector.

FIG. 120 is a pictorial view of an easel having a curved focal surface, a slit, and means to rotate the annular image and translate photographic media, said easel providing for the control and correction of distortion in the subject matter of FIGS. 112, 113, 116, or 119.

FIG. 121 illustrates the concept of utilizing a wide angle reflector to re-image an annular or rectangular image.

FIG. 122 is a rendering of an annular image such as that produced by the optical system of FIG. 51, but in which the optical system was not used in an accurately vertical orientation.

FIG. 123 is a rendering of the subject matter of FIG. 122, also showing references which may be used to minimize distortion when the image is transformed into a rectangular format.

FIG. 124 is a rendering of the significant distortion of a flat horizon in a rectangular image which results from uncompensated photographic or electronic transformation of an annular image.

FIG. 125 is a rendering of the reduced distortion of a flat horizon in a rectangular image which results from partially compensated transformation of an annular image.

FIG. 126 is a rendering of the proper imaging of a flat horizon in a rectangular image which results from compensated transformation of an annular image.

FIG. 127 is a rendering of an annular image such as that produced by the apparatus of FIG. 52, showing means for accurate indication of tilt and of the limits of coverage.

FIG. 128 is a rendering of the vertical angular distribution in a rectangular image which results from transformation of the annular image, also showing the coverage limit information.

FIG. 129 is a rendering of a segment of an annular image such as that produced by the apparatus of FIG. 51, showing means for accurate indication of the limits of coverage.

Figure 130:
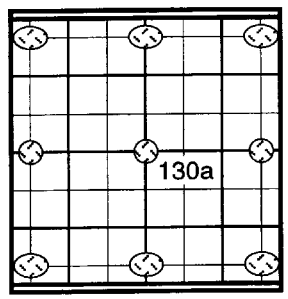

FIG. 130 is a rendering of the vertical angular distribution in a rectangular image which results from transformation of the segment of the annular image, also showing the coverage limit information.

Figure 131:
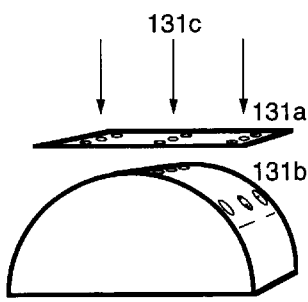

FIG. 131 is an illustration of the concept of projecting a flat image onto a cylindrical surface through the use of a distant light source.

Figure 132:
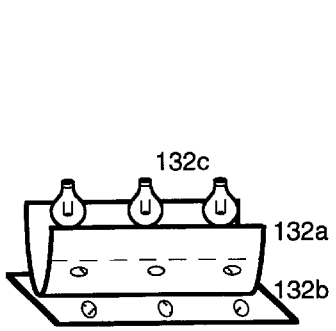

FIG. 132 is an illustration of the concept of projecting a cylindrical image onto a flat surface with a linear light array that is disposed at the cylinder's center of curvature.

Figure 133:
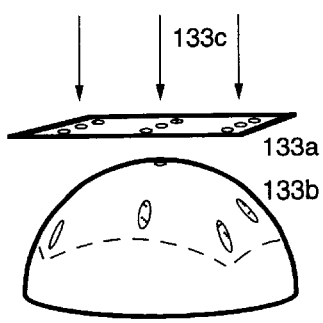

FIG. 133 is an illustration of the concept of projecting a flat image onto a spherical surface through the use of a distant light source.

Figure 134:
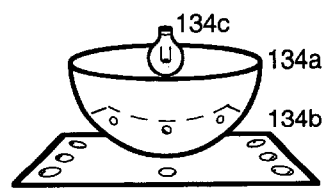

FIG. 134 is an illustration of the concept of projecting a spherical image onto a flat surface through the use of a point light source that is disposed at the sphere's center of curvature.

Figure 135:
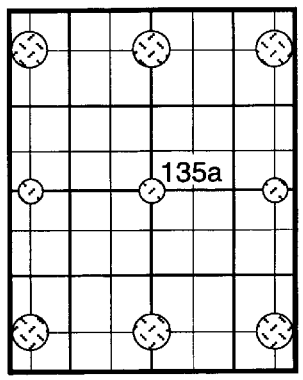

FIG. 135 is a rendering of an image in which the local vertical image scale is increased according to the reciprocal of the cosine of the angle of coverage above and below the center.

Figure 136:
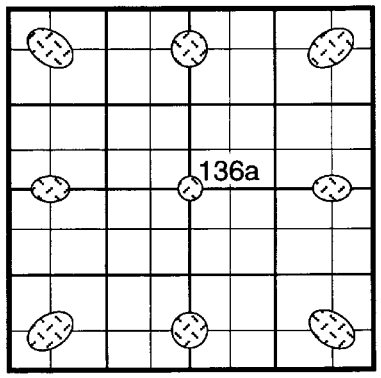

FIG. 136 is a rendering of an image in which the local image scale is increased according to the reciprocal of the cosine of the angle of coverage away from the center.

Figure 137:
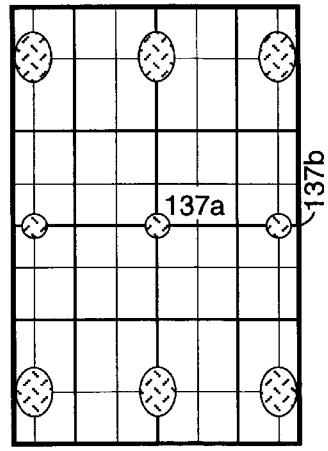

FIG. 137 is a rendering of an image in which the vertical image scale is increased according to the square of the reciprocal of the cosine of the angle of coverage above and below the center.

Figure 138:
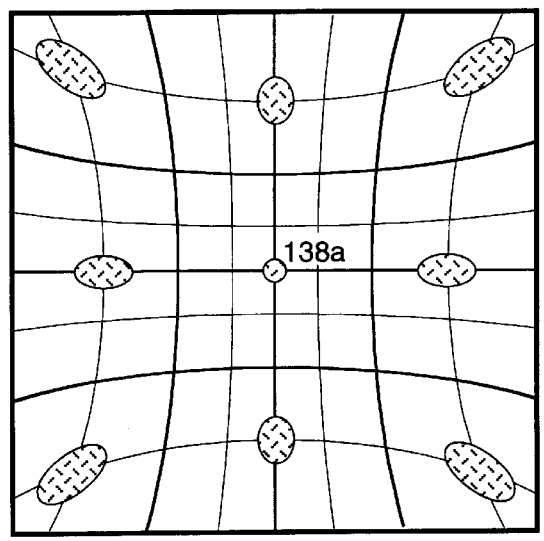

FIG. 138 is a rendering of a segment of an image in which the image scale is increased according to the square of the reciprocal of the cosine of the angle of coverage from a given point.

Figure 139:
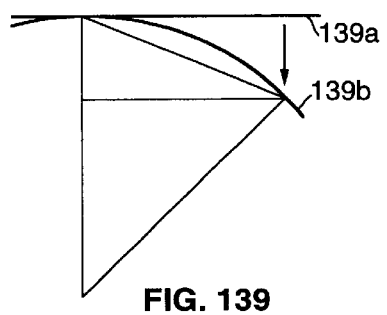

FIG. 139 shows the concept of projecting a flat image onto a cylindrical or spherical surface.

Figure 140:
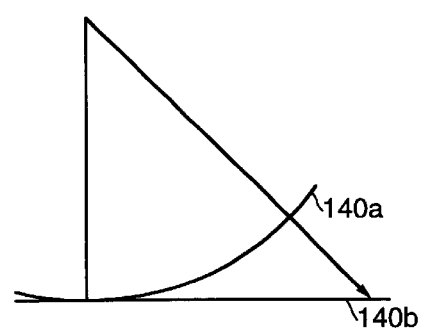

FIG. 140 shows the concept of projecting a cylindrical or spherical image onto a flat surface.

FIG. 141 is a side cross-sectional view of an embodiment of the optical system of the present invention having one reflector surface, subject illumination means, tilt indication means, and a focal imaging optics. Also shown is a video camera having a lens, microphones, and interface means for image distribution.

FIG. 142 is a side view of an embodiment of the optical system of the invention having a flexible fiber optic connection to an image sensor, also showing image displays and interface means for image and data processing and distribution which further comprise part of the invention.

FIG. 143 illustrates the optical system of the invention with image capture and distribution means which further comprise part of the invention. Shown is the association of the invention with articles that facilitate image capture, processing, distribution and display, said articles including computers, intranets, the Internet, closed circuit, cable, and broadcast television, satellites and other spacecraft, aircraft, water and underwater craft, ground vehicles, robotic devices, simulators, games, interactive input devices, goggles, and monitoring, command and control systems.

FIG. 144 is a perspective view of a projection embodiment of the present invention that is interfaces to elements of FIGS. 141, 142, and 143, and which provides an interactive virtual reality display that surrounds participants.

DETAILED DESCRIPTION OF THE PREFERRED EMBODIMENTS

A description of the invention will now be given that references the drawings and reference numbers marked thereon.

Figure 1:
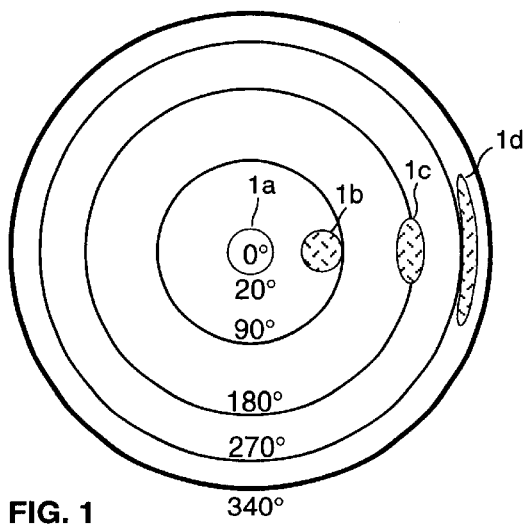
FIG. 1 is a rendering of the angular distribution in a virtual or real image such as that formed by reflection in a convex spherical reflector or an embodiment of the present invention.

Referring to FIG. 1, a rendering of the angular distribution in a virtual or real image such as that formed by means of reflection in a convex spherical reflector or a basic embodiment of the present invention. Also shown is the imaged appearance of spherical objects in the field of view (1a–1d) that each subtend about 20 degrees of angle as seen from the center of the primary wide angle surface of the optical system. The illustration shows that the angular distribution of the virtual reflected image from a spherical reflector provides an image in which the radial scale decreases toward the outer edge, as can be seen by comparing the images of spherical objects which are disposed in the center of the image 1a, the 70 degree zone of coverage (35 degrees off-axis) 1b, the 180 degree zone (90 degrees off-axis) 1c, and the 290 degree coverage zone (145 degrees from the optical axis in front of the optical system and 35 degrees from the optical axis behind the optical system 1d.

Figure 2:
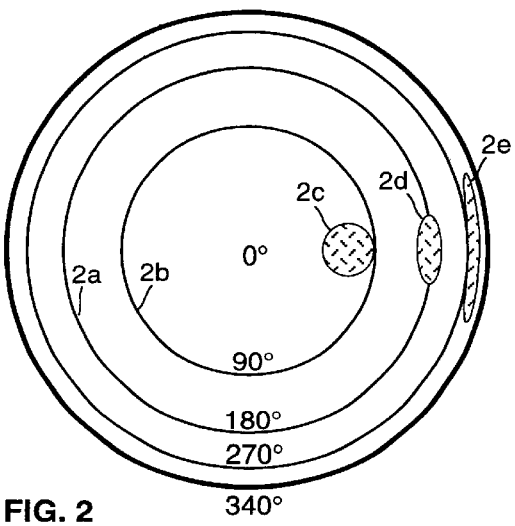
FIG. 2 shows the angular distribution of a virtual image from reflection in a convex oblate aspheric reflector.

FIG. 2 shows the angular distribution of a virtual image from reflection in a convex oblate aspheric reflector, also showing the reflected appearance of spheres that each occupy about 20 degrees. The radial scale decreases substantially toward the outer edge. This optical figure is useful in projection systems where a three dimensional projection surface extends from the perimeter of the reflector and it is desirable to maintain a relatively constant image brightness throughout the projection surface. More particularly, where the reflector is used at the top of a spherical or quasi spherical projection surface and a floor or pedestal mounted projector is directed toward it, the decreasing radial image scale results in greater expansion of the image (and thereby a greater reduction in the image brightness versus distance from the reflector) toward the top of the room, thereby providing relatively consistent brightness throughout the projection surface. The design also permits lower parts of the original projected image or image data to have a greater radial image scale.

Figure 3:
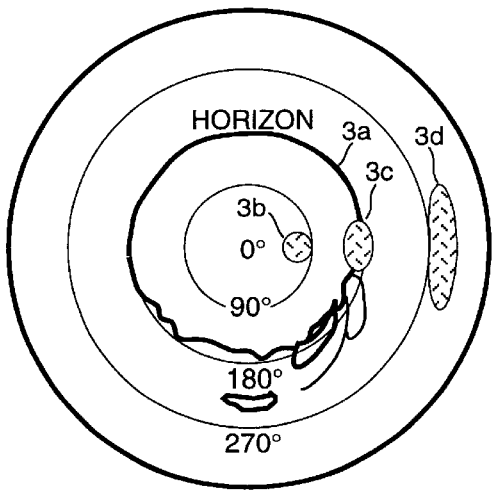
FIG. 3 shows the angular distribution of a theoretical 360 degree virtual image from reflection in a convex prolate aspheric reflector when said reflector is viewed from an infinite distance.

FIG. 3 shows the angular distribution of a theoretical 360 degree virtual image from reflection in a convex prolate aspheric reflector having 180 degrees of included surface curvature when said reflector is viewed from an infinite distance, also shown are major features in a mountain scene and the reflected appearance of spheres in the field of view that each occupy about 20 degrees. In this view, the radial image scale is linear.

Figure 4:
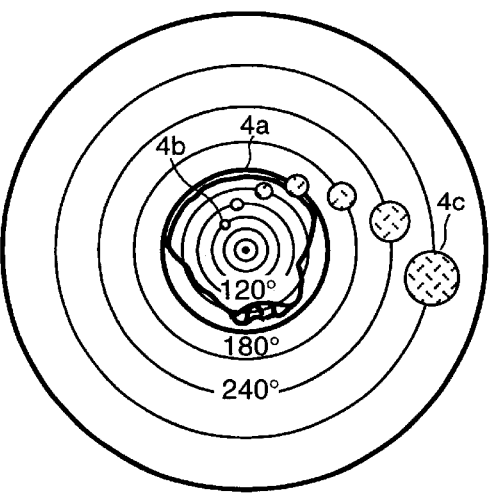
FIG. 4 shows the angular distribution of a virtual image from reflection in a convex reflector having a strong hyperboloidal figure.

FIG. 4 shows the angular distribution of a virtual image from reflection in a convex reflector having a strong hyperboloidal figure, also showing major features of a mountain scene and the reflected appearance of spheres in the field of view that each occupy about 15 degrees. The radial scale increases substantially toward the outer edge of the image, but the spherical subjects are imaged almost as circular regardless of their position in the image. This angular distribution offers the advantage of providing a wide angle view while also providing relatively undistorted images of individual subjects in the field of view.

Figure 5:
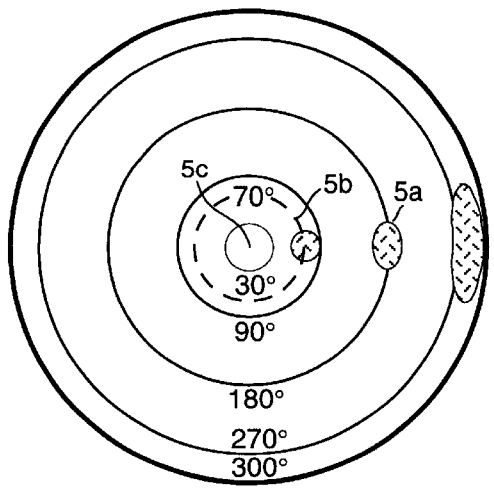
FIG. 5 shows the angular distribution of a virtual image from reflection in a convex prolate aspheric parabolic reflector.

FIG. 5 shows the angular distribution of a virtual image from reflection in a convex prolate aspheric parabolic reflector, also showing the reflected appearance of spheres that each occupy about 20 degrees. In this view, the radial image scale is linear and the circumferential expansion of the image at the 180 degree zone is equal to one half pi relative to the central and radial image scale. A prolate aspheric reflector configuration is obviously applicable to the formation of images having angular distribution characteristics other than those shown.

Figure 6:
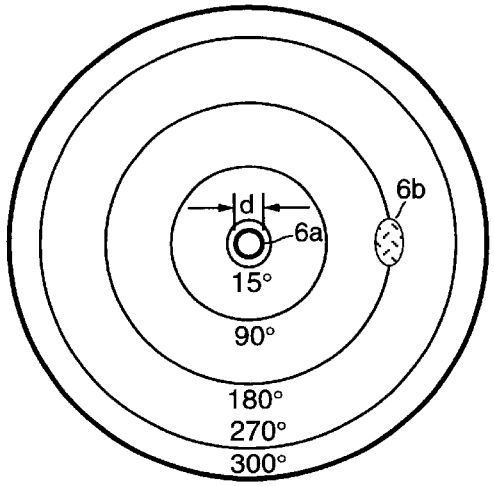
FIG. 6 shows the angular distribution of an annular virtual image from reflection in a convex prolate aspheric reflector in which the figure is radially enlarged to a slight degree, as illustrated by the indication of distance "d".

FIG. 6 shows the angular distribution of an annular virtual image from reflection in a convex prolate aspheric reflector in which the figure is radially enlarged to a slight degree, as illustrated by the indication of distance "d", also showing the reflected appearance of a sphere in the field of view that occupies about 20 degrees.

Figure 7:
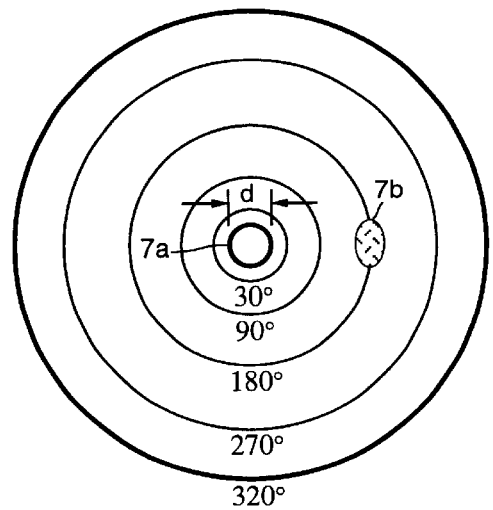
FIG. 7 shows the angular distribution of an annular virtual image from reflection in a convex prolate aspheric reflector having a figure that is radially enlarged to a moderate degree.

FIG. 7 shows the angular distribution of an annular virtual image from reflection in a convex prolate aspheric reflector having a figure that is radially enlarged to a moderate degree, as indicated by distance "d". The inner boundary of the annular image excludes a spatial area equal in size to approximately 30 degrees of radial image scale, yet no subject matter directly in front of the reflector is excluded due to local curvature of the reflector at the inner boundary of coverage.

Figure 8:
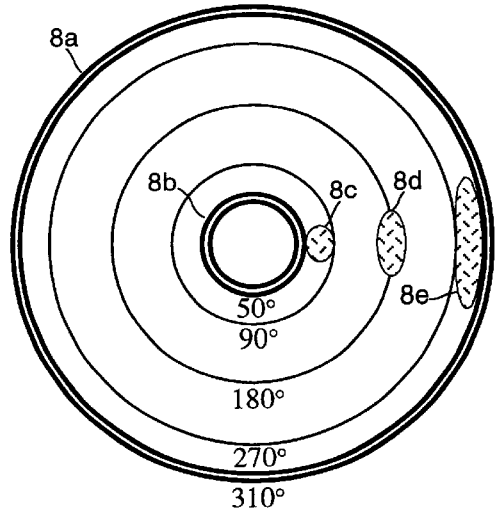
FIG. 8 shows the angular distribution of an annular virtual image from reflection in a convex prolate aspheric reflector in which the figure is radially enlarged to a significant degree.

FIG. 8 shows the angular distribution of an annular virtual image from reflection in a convex prolate aspheric reflector in which the figure is radially enlarged to a significant degree, also showing the reflected appearance of spheres that each occupy about 20 degrees. Also shown are features on the reflector or its mounting which provide means for indicating the limits of coverage at 50 degrees and 310 degrees. In this embodiment, a conical area having an angular diameter of about 50 degrees is excluded, both in front and behind the reflector. Radial enlargement of the reflector figure permits the spatial size of the area inside the annular image to be larger than the relative size of the angular obscuration.

Figure 9:
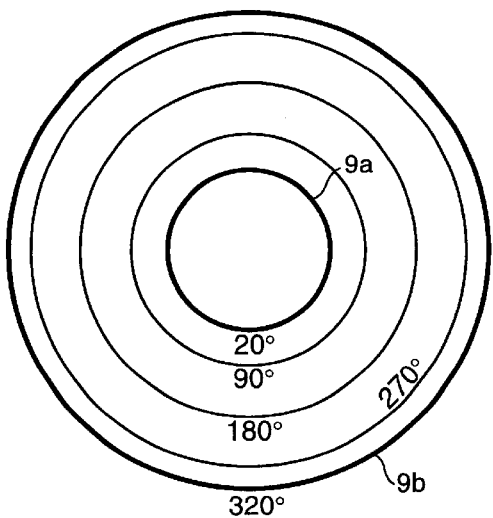
FIG. 9 shows the angular distribution of an annular virtual image from reflection in a convex prolate aspheric reflector in which the figure is radially enlarged to an extreme degree.

FIG. 9 shows the angular distribution of an annular virtual image from reflection in a convex prolate aspheric reflector in which the figure is radially enlarged to an extreme degree, such as may be necessary to permit the use of large aperture imaging or projection optics while minimizing the frontal obscuration angle.

Figure 10:
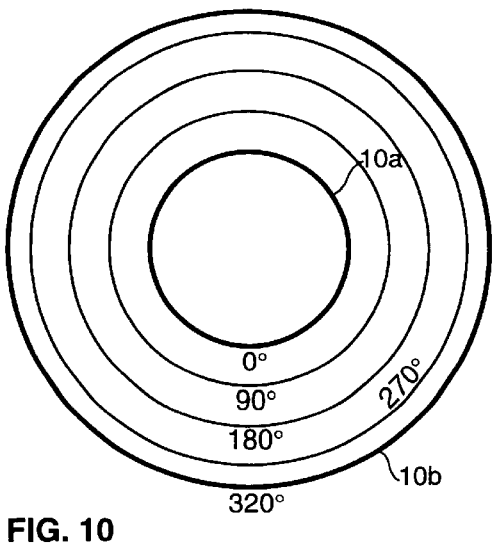
FIG. 10 shows the angular distribution of an annular virtual image from reflection in a prolate aspheric reflector in which the figure is radially enlarged to such an extent that the surface is torroidal when part of its central profile is repeated around the inner zones.

FIG. 10 shows the angular distribution of an annular virtual image from reflection in a prolate aspheric reflector in which the figure is radially enlarged to such an extent that the surface is torroidal when the optical figure is extended toward the center. A torroidal reflector permits imaging all the way to an axial point beyond a camera, secondary reflector, or other article that is smaller than the inwardly curved zone of the primary reflector, thereby eliminating any obscuration angle on one side of the great circle surrounding the invention.

Figure 11:
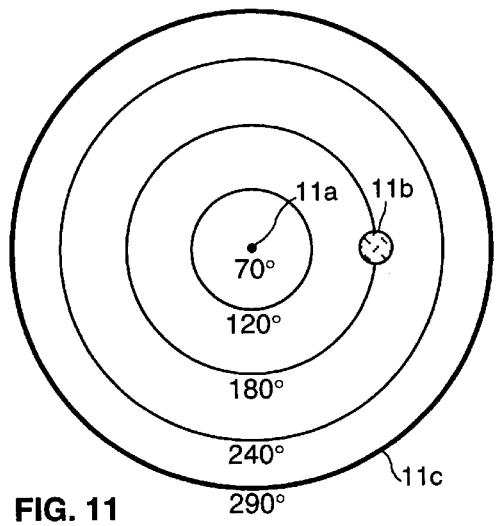
FIG. 11 shows the angular distribution of an annular virtual image from reflection in a convex reflector in which the figure is radially compressed.

FIG. 11 shows the angular distribution of an annular virtual image from reflection in a convex reflector in which the figure is radially compressed, also showing the relatively undistorted reflected appearance of a sphere that occupies about 15 degrees and is imaged at the 180 degree zone (typically on the horizon). The central apex of a convex radially compressed reflector that does not have a central hole forms a point.

Figure 12:
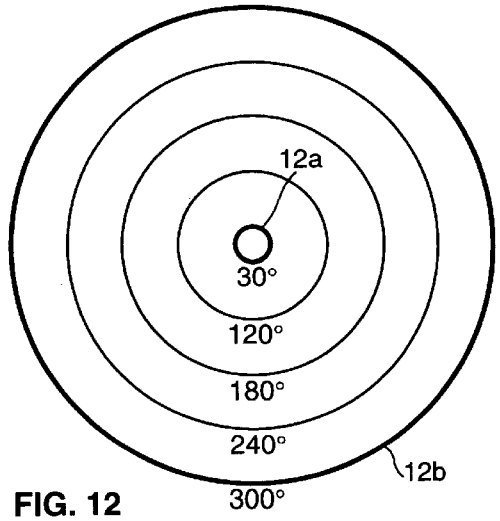
FIG. 12 shows the angular distribution of an annular virtual image from reflection in a Cassegrain wide angle reflector in which the primary reflector has a radially enlarged convex prolate aspheric figure and the secondary reflector is radially compressed.

FIG. 12 shows the angular distribution of an annular virtual image from reflection in a Cassegrain wide angle reflector in which the primary reflector has a radially enlarged convex prolate aspheric figure and the secondary reflector is radially compressed.

Figure 13:
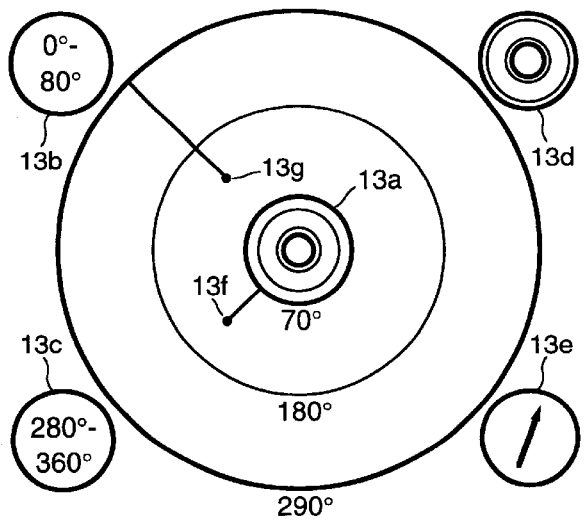
FIG. 13 shows the angular distribution of an annular virtual image from reflection in a convex prolate aspheric reflector, also showing supplemental angular coverage on the same focal surface.

FIG. 13 shows the angular distribution of an annular virtual image from reflection in a convex prolate aspheric reflector, also showing supplemental angular coverage on the same focal surface by means of fixed or steerable periscopic optics, further showing additional instrumentation such as a level, compass, and other articles which are imaged around the perimeter of the reflector.

Figure 14:
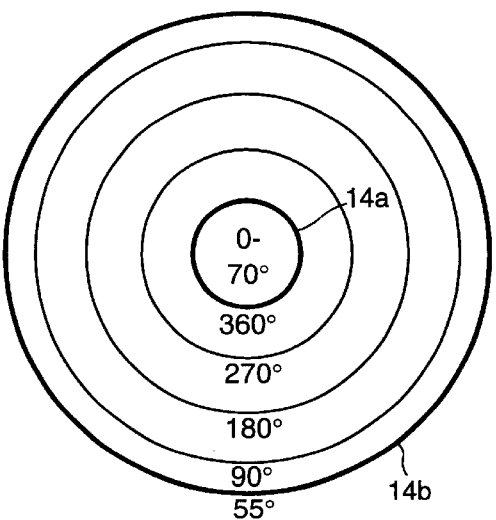
FIG. 14 shows the angular distribution of an annular virtual image from reflection in a torroidal reflector, also showing central coverage provided by a central lens.

FIG. 14 shows the angular distribution of an annular virtual image from reflection in a torroidal reflector, also showing central coverage provided by a central lens that is positioned on the opposing side of said reflector.

Figure 15:
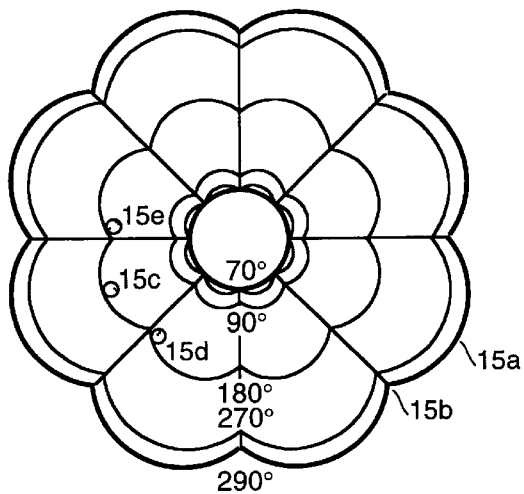
FIG. 15 is a simplified rendering of the redundant angular distribution of an annular virtual image from reflection in a reflector having a scalloped figure. The dashed line at lower right shows the actual contour of the outer zone of coverage of each sector in some scalloped embodiments.

FIG. 15 is a simplified rendering of the redundant angular distribution of a scalloped or sectored annular virtual image that results from reflection in a reflector having a scalloped figure.

Figure 16:
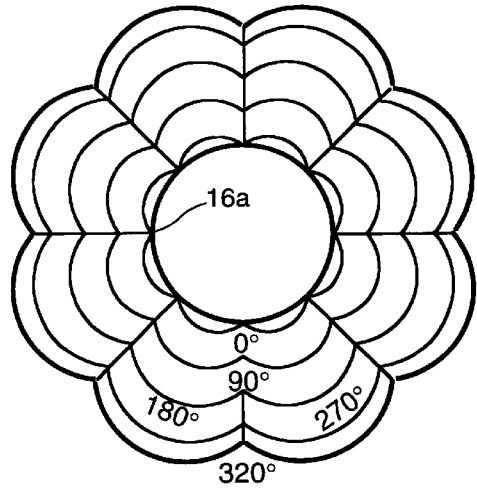
FIG. 16 shows the redundant angular distribution of an annular virtual image from reflection in a torroidal reflector having a scalloped figure.

FIG. 16 shows the redundant angular distribution of an annular virtual image from reflection in a torroidal reflector having a scalloped figure.

Figure 17:
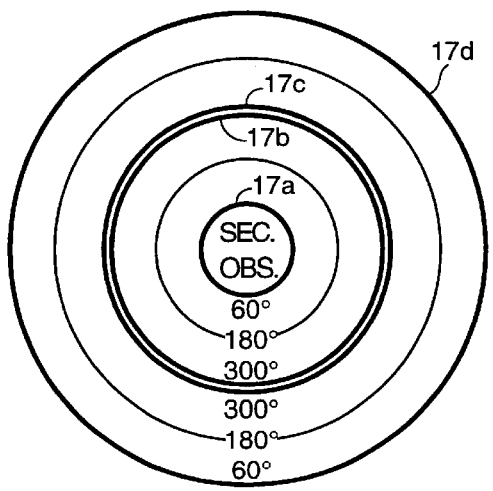
FIG. 17 shows the redundant angular distribution of an annular virtual image from reflection in a Cassegrain wide angle reflector in which the secondary reflector is surrounded by a concentric radially enlarged annular wide angle reflector.

FIG. 17 shows the redundant angular distribution of an annular virtual image from reflection in a Cassegrain wide angle reflector in which the secondary reflector surface is surrounded by a concentric radially enlarged annular wide angle reflector surface to provide redundant imaging and three dimensional information.

Figure 18:
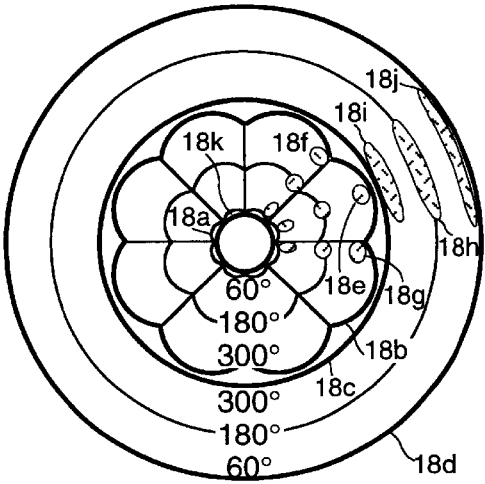
FIG. 18 shows the triple redundant angular distribution and coverage of an annular virtual image from reflection in a Cassegrain wide angle reflector which the primary reflector has a scalloped figure and the secondary reflector is surrounded by a radially enlarged annular wide angle reflector.

FIG. 18 shows the triple redundant angular distribution and coverage of an annular virtual image from reflection in a Cassegrain wide angle reflector which the primary reflector has a scalloped figure and the secondary reflector surface is surrounded by a radially enlarged annular wide angle reflector surface to provide three dimensional information in multiple axes. In other embodiments, the annular reflector may be scalloped instead of or in addition to the primary reflector.

Figure 19:
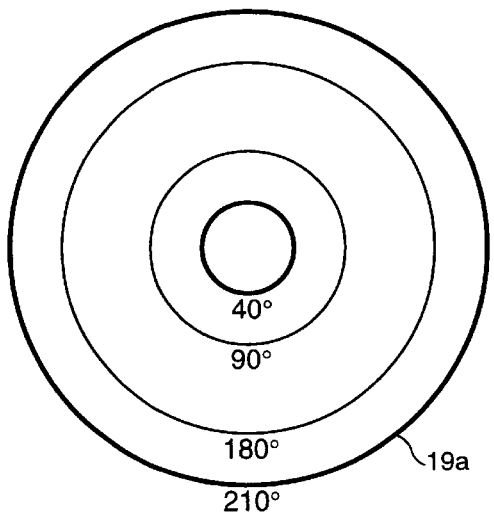
FIG. 19 is a rendering of angular distribution in an annular virtual image from reflection in a shallow parabolic reflector such as that in the presently known Spiratone Birds Eye attachment.

FIG. 19 is a rendering of angular distribution in an annular virtual image from reflection in a shallow parabolic reflector such as that in the presently known Spiratone Birds Eye attachment, an optical system which has been available since the 1970's.

Figure 20:
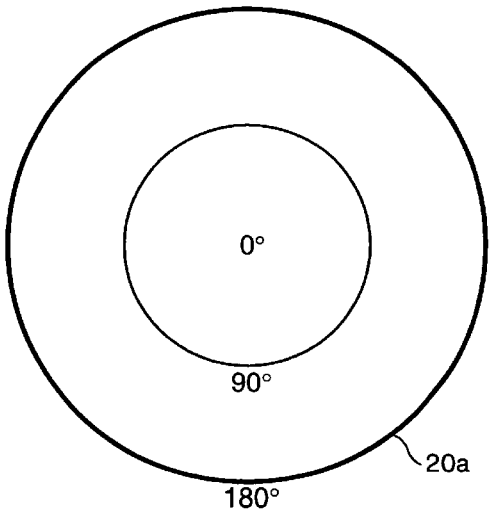
FIG. 20 is a rendering of angular distribution in the image produced by a typical 180 degree fisheye lens having equidistant projection characteristics.

FIG. 20 is a rendering of angular distribution in the image produced by a typical 180 degree fisheye lens having equidistant projection characteristics.

Figure 21:
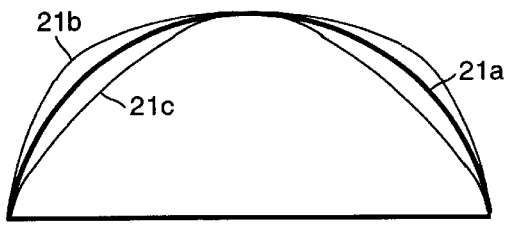
FIG. 21 is a side outline view of a hemispherical reflector 21a, also showing reflector surfaces having discontinuous aspheric figures in which the radius of curvature effectively increases 21c or decreases 21b inside and outside of the zone used to image a great circle that is perpendicular to the optical axis.

FIG. 21 is a side outline view of a hemispherical reflector such as that which may be used to provide the image illustrated in FIG. 1.

Figure 22:
FIG. 22 is a side outline view of an oblate aspheric reflector.

FIG. 22 is a side outline view of an oblate aspheric reflector such as that which may be used to provide the image illustrated in FIG. 2.

Figure 23:
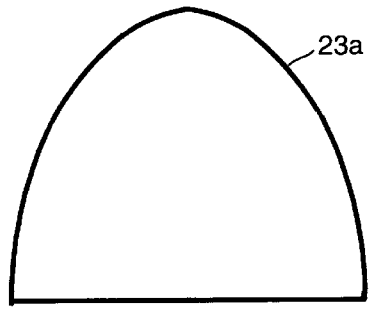
FIG. 23 is a side outline view of a prolate aspheric reflector having a large included angle.

FIG. 23 is a side outline view of a prolate aspheric reflector having a large included angle. Such a reflector is capable of covering almost the entire 360 degree sphere around itself (as illustrated in FIG. 3) when photographed or otherwise imaged from a distance.

Figure 24:
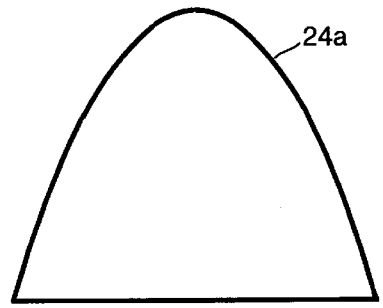
FIG. 24 is a side outline view of a strong hyperboloidal reflector.

FIG. 24 is a side outline view of a strong hyperboloidal reflector such as that which may be used to provide the image illustrated in FIG. 4.

Figure 25:
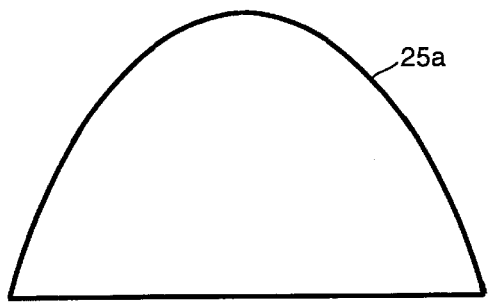
FIG. 25 is a side outline view of paraboloidal reflector.

FIG. 25 is a side outline view of paraboloidal reflector.

Figure 26:
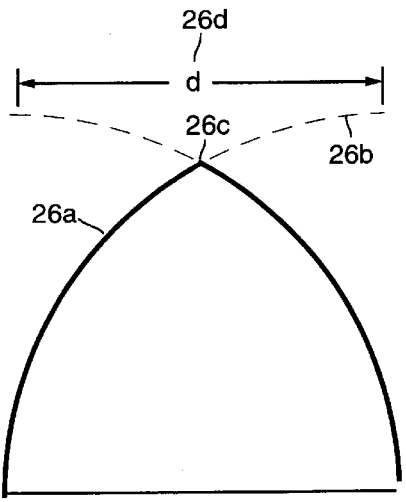
FIG. 26 is a side outline view showing the concept of a radially compressed optical figure. The shown reflector figure is radially compressed by the distance "d".

FIG. 26 is a side outline view showing the concept of a radially compressed optical figure. The shown reflector figure is radially compressed by the distance "d" 26d.

Figure 27:
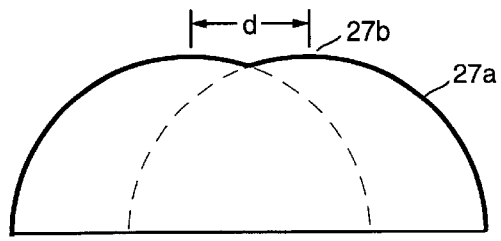
FIG. 27 is a side outline view showing the concept of a radially enlarged optical figure.

FIG. 27 is a side outline view showing the concept of a radially enlarged optical figure. The shown prolate aspheric reflector figure is radially enlarged by the distance "d".

Figure 28:
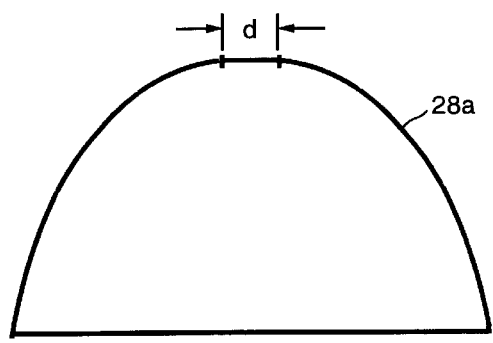
FIG. 28 is a side outline view of a prolate aspheric reflector having a radially enlarged figure.

FIG. 28 is a side outline view of a prolate aspheric reflector in which the figure is radially enlarged to a moderate degree, as shown by the distance "d".

Figure 29:
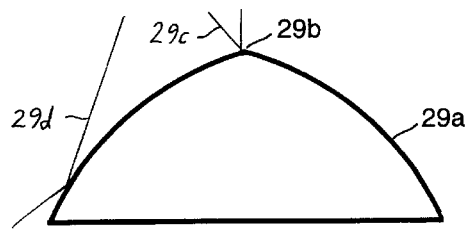
FIG. 29 is a side outline view of a radially compressed reflector.

FIG. 29 is a side outline view of a radially compressed reflector.

The optical system of the present invention is an improved means for imaging or projecting a 360 degree field of view which is omniramic, or nearly omnidirectional. Some embodiments of the optical system of the present invention provide basic circular or annular 360 degree panoramic images (FIGS. 3 and 4) that are similar to polar map projections in substantially the same way as the invention shown in the applicant's prior design patent D312,263; however, the present invention is an improvement of the invention of said patent D312,263 and other prior art. More particularly, preferred embodiments of the optical system of the present invention utilize more optimized or sophisticated optics, components, or configurations to facilitate improved performance, increased off-axis resolution, improved durability, a shorter distance between reflectors, compatibility with a shorter mechanical support structure, a smaller or lighter secondary reflector assembly, greater rigidity, increased vertical coverage, smaller coverage exclusion zones, reduction or elimination of a front exclusion zone through the use of a torroidal reflector or auxiliary optics, elimination of a rear exclusion zone through the use of auxiliary optics, redundant imaging, three dimensional imaging, reduction or elimination of field curvature, reduction of aberrations, tilt indication, accurate indication of image edges, improved reduction of stray light, occultation of an excessively bright light source (such as the sun) to reduce or eliminate flare, improved protection of optical surfaces, improved aperture adjustment means, improved ease of handling, improved ease of use, compatibility with a wider array of storage and transportation means, superior compactness versus performance, compatibility with a wider array of fabrication modes including low cost modes of production, compatibility with fabrication in a wider range of sizes including miniature sizes, superior performance in imaging and projection applications, compatibility with a wider array of cameras, projectors, and other instrumentation, improved usefulness in a wider range of environments, modular construction.

Uses of the invention include simultaneous imaging and projection of an entire 360 degree panorama which includes the great circle of a sphere surrounding the invention, said great circle being perpendicular to the optical axis of the invention. This is typically accomplished by using the invention in a vertical orientation, where it is pointed straight up or straight down. In this case, the great circle 31s would correspond to a flat horizon. The invention may in actuality be used in any orientation and its application need not be limited to optical imaging. However, for clarity, descriptions of the present invention shall apply to its use in a vertical orientation, usually with the reflective surface of its primary reflector is facing up.

FIGS. 51 through 62 and 65 through 71 show embodiments of the optical system of the present invention that each have a primary wide angle reflector and a secondary reflector.

A preferred embodiment of the optical system of the present invention is comprised of a convex primary reflector 57d having radial symmetry, said primary reflector being in optical communication with a great circle surrounding it 57b, said great circle being perpendicular to the optical axis 57t of said primary reflector 57d. The primary reflector 57d has sufficient curvature to be in optical communication with a substantial angular area in front 57a and behind 57c the plane of the great circle 57b surrounding the optical system. The primary reflector 57d has an optically transparent central zone 57p which may consist of a hole 57p through the reflector substrate 57d, a hole in only reflective coating 55c of a transparent reflector substrate 55a or a partially reflective area in the reflective coating on a transparent reflector substrate.

A secondary reflector 57e having radial symmetry is coaxially disposed in front of the primary reflector 57d. The reflective coating on the secondary reflector 57e faces the reflective surface of the primary reflector 57d, whereby said secondary reflector 57e is in optical communication with the great circle 57b surrounding the primary reflector 57d and (by virtue of the primary reflector's curvature) the area in front 57a and behind 57c the plane of said great circle 57b by means of reflection from the primary reflector 57d, whereby the optical system produces an annular virtual image 57u of said great circle 51b and said area above 57a and below 57c its plane.

The annular virtual image 57u typically has a curved surface of best focus and is visible from a vantage point 57q behind the optically transparent central zone 57p of the primary reflector 57d due to said vantage point 57u being in optical communication with the great circle surrounding the invention 57b and the area in front and behind the plane of said great circle by means of reflection from said secondary reflector 57e and said primary reflector 57d.

Mounting means for the primary reflector 57d and secondary reflector 57e provide a protective darkened shield 57j around the perimeter of said secondary reflector 57e, said shield also acting as a light baffle. The mounting means 57u also provide stable support 57dd and alignment of the primary reflector 57d and secondary reflector 57e without causing deformation thereof and provide means for attaching the optical system 70a to an article having a focal surface 57g, 70l, 81k–81n, 81kk, 81ss, 81uu, 81yy, 141k, 142e, or supporting a focal surface 81mm. The mounting means 57w, 57bb, 57dd typically facilitate use of the optical system in any orientation and do not rely on the structure of the primary reflector substrate 57d to support an article having a focal surface.

A preferred embodiment of the optical system also includes a grip surface 55i, 57ff, 57y, 70g, and side projections 57ee, 102b which facilitate handling of the optical system and provide for the attachment of accessories including a protective cover 102c. A central extension 57y of the optical cell 57w having a slot 57x, 103d around its circumference facilitates the attachment of accessories which may include at least one occulting attachment 71d or tilt indicator 72d.

Figure 103:
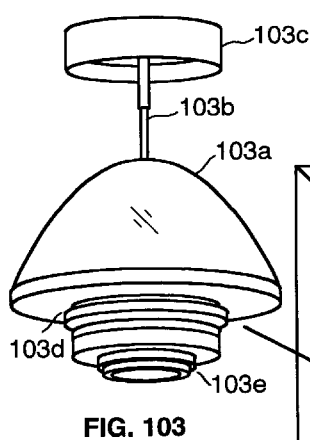
FIG. 103 is an oblique pictorial view of a wide angle reflector, also showing a case.

FIG. 103 shows that the slot 57x in the central cell also serves to secure the optical system in a fitted square, round, or hybrid shape case 103f, with cutout 103g in said case securing the optical system by said slot 57x without requiring any contact with optical surfaces or imposing loads on delicate components.

The reflective elements of the invention 57d and 57e are typically associated with a refracting lens system 57f, or surface (shown toward the rear of item 81aaa) which is disposed coaxial to said reflective elements, with said refracting optics 57f being associated with the formation of a real image 57h of the virtual image provided by said reflective elements 57d and 57e, said real image typically being formed on a focal surface 57g, whereby the overall optical system combined with an article having a focal surface facilitates the geometric conversion of the great circle surrounding the invention 57b and the area in front 57a and behind 57c the plane of said great circle 57b into a real annular image 57h at the focal surface 57g of a camera or other article.

The primary reflector 57d may be a spherical (FIG. 21) or aspheric (FIGS. 22–25) surface of revolution which provides a seamless annular image. In a preferred embodiment, the primary reflector has a prolate aspheric surface such as a paraboloid or hyperboloid in which the effective radius of curvature increases toward the outer zones. In applications where it is desirable to measure angles on the original annular image or use particular methods to transform the image to a rectangular format, the eccentricity (degree of aspheric figure) is such that the virtual image produced by reflection from the primary reflector has a constant radial image scale when said primary reflector is viewed from an axial vantage point disposed at the equivalent optical distance of one-half to four times the diameter of said primary reflector from the apex of said primary reflector. The primary reflector may also have scallops 38d around its circumference to provide a sectored image 18a which covers each part of the subject at least twice and thereby provides three dimensional information.

The primary differences between embodiments of the present invention that have a large or a small conical exclusion zone in front of the primary reflector include the figure of the primary reflector, the size of any central hole in said primary reflector, and the size and proximity of a central obstruction. Embodiments having a small conical exclusion zone typically utilize a radially enlarged 27b primary reflector 31b. Radial enlargement of a reflector figure results in an angle of reflection which is closer to perpendicular with the optical surface, resulting in coverage 31a closer to a point directly in front of the reflector.

The primary difference between embodiments with and without annularly imaged central coverage is the figure of the primary reflector 32a and the relative size of a central obstruction such as a secondary reflector 32b and its baffle 32d or any other article such as a camera 34d, 77b, or camera housing 79c. Most embodiments having central coverage that is imaged as part of the annular image utilize a torroidal primary reflector 32a. The size of the central obstruction 31f, 32d influences the percentage of the image circle which will be obstructed by it and the degree of radial enlargement which must be incorporated into the torroidal reflector in order to image the central subject (or projection area) which is beyond said central obstruction. Where the subject is at infinity, the zone 32e of the primary reflector 32a which is used in imaging the central subject must have a diameter at least as large as the central obstruction 32d. Where the central subject 96d is at a finite distance from the optical system 96b, the zone of the primary reflector imaging it must be larger than the diameter of the central obstruction 96c. Therefore, in a preferred embodiment of the invention having central coverage and a torroidal primary reflector, the zone 32e of the primary reflector 32a, 96b that is utilized in imaging the central subject is larger than the central obstruction caused by an appropriately sized secondary reflector 32d, baffle 32d, 96c, camera 34d, or other article.

The primary differences between embodiments for different applications include overall size; relative sizes of different optical surfaces; materials used; the presence or configuration of moisture and contaminant seals; optimization of the optical figure for immersion, where applicable; and the relative size and longitudinal position of the focal surface.

The applicant has shown in U.S. provisional application Ser. No. 60/043,701 an improved means for imaging a field of view which is omniramic, or nearly omnidirectional. The present invention is applicable to both original imaging of a subject and for projection of photographic or artificially generated (including computer generated) images.

A basic preferred embodiment of the present invention (FIG. 57) utilizes a prolate aspheric reflector 24a, 25a, 57d.

This results in exclusion of a conical area bounded by zone 57a in front of the primary reflector 57d, which is caused by obscuration by a secondary reflector 57e, a baffle 57j, a camera 34d, 77b or a transparent zone 57p in the primary reflector 57d surface.

The front conical exclusion angle 57a is reduced by means of a primary reflector having a FIG. 31b which is enlarged in a direction perpendicular 27a to the optical axis 31t while still retaining rotational symmetry. This causes the zone 31g of the primary reflector immediately surrounding a central hole or obstruction to be closer to perpendicular with the optical axis 31t, thereby resulting in a greater degree of coverage 31a toward the front of the optical system.

A front exclusion zone 57a is completely eliminated by means of a torroidal primary reflector 32a and a small convex secondary reflector 32b and baffle 32d having a diameter less than the diameter of the apex of the toroid of said primary reflector or the smaller utilized zone thereof 32e. Elimination of the front conical exclusion zone is accomplished by redundantly imaging the part of the subject 96d that is a finite distance directly in front of the primary reflector 32a, 96b at the radial zone of the annular image circle 10a, 32n, 57m which is closest to the center by means of a primary reflector having a torroidal FIGS. 32a, 96b combined with a secondary reflector assembly 32d, 96c having a diameter smaller than the torroidal apex or the smaller utilized zone 32e of said primary reflector. The remainder of the subject out to zone 32o or 57c is progressively imaged toward the outer edge 10b, 32p, 57o of the annular image 32g, 57h.

Optical surfaces used to accomplish this in a preferred embodiment consist of a strongly curved torroidal primary reflector 32a, a convex secondar reflector 32b, and rear imaging optics 32f. The secondary reflector 32b is in optical communication 32m with both the primary reflector 32a and the imaging lens system 32f which is located behind a central transparent zone 32q, 57p in the primary reflector 32a, 57d. Additional optics 32j, 57aa may be used in correction of aberrations and field curvature, as can the figures of the reflectors and imaging optics.

If desired, the transparent central zone 55c in the center of the primary reflector surface can have a figure which will act as a refracting lens 57ii. Where an axial strut 31l, 57hh is used, the surface of a transparent optical window 31n, surface 55c, or lens 57ii supporting it can be located at the same longitudinal position 31n, 55c as the surrounding zone 31q, 32q, 55c, 57p, 58d of the primary reflector 31b, 32a, 55a, 57d, 58a or it can be disposed at different longitudinal positions than said zone by means of a cell which is recessed behind 57v or extends in front 32i, 58d of said primary reflector. Where the lens or lens system has negative optical power 57ii, it facilitates optical communication with a relatively large or near secondary reflector 57e, 81b without requiring a larger transparent area 57p in the center of the primary reflector 57d, 81a.

Imaging lenses 31d, 32f, 57f are used to form a real image 57h of the subject by imaging the virtual image 57u at a focal surface 57g, said virtual image 57u being disposed behind the primary reflector 57d. The virtual image is also effectively disposed beyond the surface of the secondary reflector 57e except in some cases where said secondary reflector has a sufficiently strong concave figure.

Means to increase the field of view include radially enlarging the primary reflector FIG. 27b. This permits the primary reflector surface to be closer to perpendicular with the optical axis at a zone 31g, 57k which immediately surrounds its transparent central zone 31q, 57p, whereby a vantage point 57q behind said transparent central zone of said primary reflector surface is in optical communication with a greater angular area toward the front of the primary reflector 31b, 57d, thereby reducing the size of the central angular exclusion zone 31a, 57a in front of said primary reflector surface, said radially enlarged primary reflector surface also permitting said transparent central zone 31q, 57p to be enlarged without affecting the field of view, thereby permitting the use of large aperture refracting optics 31d.

Radial enlargement of the primary reflector surface 27b provides means to increase the field of view all the way up to an axial point which is disposed at a finite distance in front of said reflector. In particular, when the primary reflector surface is radially enlarged a significant degree outward from the optical axis and its new figure is extended inward toward the optical axis, said primary reflector will become torroidal as a result of its surface curving backward in the zones most closely surrounding its optical axis. In embodiments where the secondary reflector surface, any related baffles, and the transparent central zone in the primary reflector are all smaller than the zone on the primary reflector surface that facilitates imaging from light that is parallel to the optical axis, the field of view will be increased all the way up to an axial point 96d which is disposed at a finite distance in front of the primary reflector 32a, 96b, whereby a vantage point behind said transparent central zone 32q, 57p of said primary reflector is in optical communication with the entire angular area in front of a great circle 31s, 57b surrounding the optical system up to an axial point 96d disposed at a finite distance in front of the primary reflector, thereby eliminating any central angular exclusion zone in front of said primary reflector when the optical system is used in air or immersed in a liquid media, the only front excluded area being confined to a narrow conical area extending from the perimeter of said secondary reflector and any associated mounting and shielding 96c, to said axial point 96d disposed a finite distance in front of the primary reflector.

While a torroidal reflector provides coverage all the way up to an axial point in front of itself and may even provide redundant coverage of central subject matter, it does not necessarily reduce the comparative spatial size of the central void 10a in the annular image. In such a system, this central void typically includes an image of the central transparent area 32q, 57p in the primary reflector, as reflected to the focal surface by the secondary reflector. This central void may be reduced or eliminated by utilizing a secondary reflector having a radially compressed FIG. 30b. A simple embodiment of a radially compressed reflector surface 26a, 29a, 30b has a point at its center 26b, 29b, 30g. This provides an image wherein little 12a or none 5c of the central image area is occupied by the image of a central obscuration.

Central or supplemental imaging is also provided by means of a transparent area in the center of the secondary reflector surface 65a and a supplemental lens 65b or camera 65c system. The transparent area may have an optical figure which is used to determine its effective field of view. The transparent area or its figure may also be supplemented by a front central lens system which is positioned in front of the central transparent area in the secondary reflector surface. Where the front central transparent area or lens system has a field of view that is the same or slightly larger than the angular exclusion zone in front of the secondary reflector, the central image therefrom may be merged with the surrounding annular image, providing a continuous field of view in a circular image (FIG. 5) versus an annular one (FIG. 8). The same means are applicable to eliminating the excluded area behind a wide angle reflector 34a (as opposed to being in front of the secondary in a Cassegrain system), only that the central refracting optics 34b are behind the center of said wide angle reflector and provide an image 14a of subject matter behind said reflector.

In cases where it the image from the central optics would be brighter than that from the reflective elements, the central optics 34b (and elements of item 65b when its orientation is reversed and camera 65c is not used) may incorporate neutral density filtration to equalize the brightness of both images. Where is desirable for the images of nearby subject matter to be properly merged, the central optics may include longitudinal positioning means for one or more elements to effectively widen their angle of view to a degree that they image all of the subject matter which is excluded in the image from a wide angle reflector's field of view.

Additional coverage may be provided by off-axis periscopic optics 33a, 33f which utilize reflectors and relay lenses to provide additional images at the focal surface. These images are most easily provided outside the perimeter of the primary image that is provided through the use of the primary reflector; however, such images may be provided at the center of the primary image by means of an axial beamsplitter.

Coverage beyond that of one or more wide angle reflectors may be provided by axial optics 34b or auxiliary periscopic optics that face in the same 33f or the opposite 33a direction as the primary reflector. The area behind a reflector 31b that is typically excluded from coverage is covered by means of auxiliary axial 34b or off-axis 33a optical systems that face in the opposite direction 33a, 34b of the primary reflector 31l, said auxiliary off-axis optical systems having imaging 33b, 33g and relay optics 33h and reflective means 33c, 33i to produce a final image at the focal surface 33e, 33k, said image being on a common focal surface with the annular image 33o, disposed in the center of 33q or outside 33e the perimeter 57o of said annular image. Additional fixed and steerable auxiliary optics may be utilized with single reflector, Cassegrain reflector, or more complex wide angle systems for redundant imaging of the central area and selected off-axis subject areas.

The shape of the primary reflector surface, the secondary reflector surface, and other optical surfaces or elements influence the global and local radial scale of the final image. In order to obtain an image which does not have radial compression toward the outer zones that is excessive for an application, the primary reflector surface may comprise a prolate aspheric FIG. 24a, 25a which may be continuous or radially enlarged 27a or compressed 29a, or otherwise modified 21b, 21c. In principle, a prolate aspheric reflector 24a, 25a, 57d has a radius of curvature which, in effect, progressively increases toward its outer zones. By contrast, a spherical reflector 21a, 77a has a constant radius of curvature. A prolate aspheric figure such as a paraboloid or hyperboloid will provide a constant radial image scale, with the viewing distance determining the figure that will result in a constant radial image scale.

In applications where it is desirable to limit the radial field of view in order to provide more radial image scale on a given format, the primary reflector 29a, 80a or other appropriate optical surfaces 30b are radially compressed inward toward the optical axis. Where the primary reflector 29a, 57d, 80a figure is radially compressed, its surface 29a, 80a is farther from being perpendicular with the optical axis 57t at a zone which immediately surrounds its center 29b or its transparent central zone 57p, whereby a vantage point 80b in front of the reflector 80a or behind 57q said transparent central zone 57p of the primary reflector surface 57d is in optical communication with a smaller angular area in front of 29c, 80m a great circle which surrounds the optical system and is on a plane 80o perpendicular to the optical axis, thereby maintaining or increasing the size of a central angular exclusion zone 29c, 80m in front of said reflector surface 29a, 80a while minimizing the physical imaged size 11a of said obscured area 29c, 80m in the image 11c at said focal surface, thereby increasing radial proportions of the imaged area surrounding the plane of said great circle, thereby resulting in a larger radial image scale for said covered area on a given image format. A radially compressed optical FIG. 29a, 80a increases radial image scale by reducing the imaged size of any central obscuration area. An appropriate increase in radial image scale minimizes local distortion and provides accurate imaged proportions for subject matter on or near the horizon 11b.

In applications including those in which the image is electronically processed or distributed (such processing including but not being limited to computer based digital image processing), it is desirable for the image data to include accurate indication of the limits of coverage 8a, 8b or the location of specified coordinates within the image.

Data related to the limits of coverage is obtained by the imaging attributes of the optical system or by attachments that indicate the limits of coverage. In regard to the outer perimeter of the image, the simplest form of coverage limit information is provided by the absence of imaged subject matter. Such indication may be provided by means which include the perimeter of the optic, a cell which retains the optic 57dd, or by a coating on the perimeter of the optic; however, the absence of subject matter is not a good indication in cases where the subject matter is dark near the perimeter of the invention.

Therefore, the preferred embodiment of the invention includes coverage limit means which do not rely on the presence or absence of subject matter. More particularly, the perimeter of the utilized portion of the optical system includes concentric light 74c (or transparent, in some embodiments) and dark 74d bands (FIGS. 73–75) or colored bands or other indicators which are applied to the optical substrate or incorporated into its mounting. The central limit of the image may also be indicated by similar means 76b which encircle 57i the secondary reflector 57e, its baffle 57j, or the central transparent 57p area in the primary reflector surface.

Figure 122:
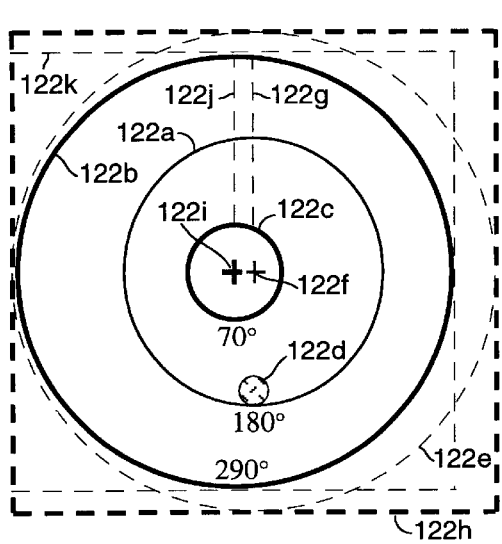

It is further desirable for the image data or related data to indicate whether the optical system of the invention was properly leveled 13a, 13d, 127c, 127d, 128c, 128d when the image was captured. In some cases, it is even more desirable to provide an indication of the degree to which the optical system is tilted (FIG. 122). This is particularly important when seeking to convert an annular or circular image into an undistorted rectangular panorama 126i or to extract undistorted 126a or minimally distorted 125a views therefrom.

In a basic implementation, electronic transformation of an annular or circular image to a rectangular panorama will result in an image in which a flat horizon 122a appears to have a wavelike form 124a if the optical system was not oriented vertically to capture the image and if the center 122i or perimeter 122b, 122k of the overall image is used to establish the point 122*i* or boundary 122*k* of reference. The cause of this is obvious when one considers that, when the optical system is tilted, the image circle of a flat horizon 123*a* must be eccentric with respect to the boundary 123*b* of the image, thereby making it closer to one side than the other. By instead referencing to points on the image which represent the actual imaged location of a flat horizon 122*a*, 123*a* or the centroid thereof 122*f*, 123*f*, or by offsetting from the boundary of the image according to a formula based on the degree of tilt, a basic symmetrical transformation of the image will result in a relatively flat image 125*a* of the horizon. The remaining distortion relates to the fact that the original image of the horizon 122*a* becomes elliptical rather than circular when the optical system is tilted. This may be compensated for by compressing 123*k* or expanding the annular or circular image in one dimension prior to transforming all or part of it to a rectangular format. The result is a straight and flat image 126*a* of a flat horizon.

The present invention further comprises a level or tilt indicator 53*d*, 72*f*, 79*f*–79*k*, 80*e*, 141*p* which is incorporated therein or which may be attached to a variety of locations which include the front of the optical system, where it may be imaged through a central transparent area in the primary or secondary reflector surface. This permits it to be visible in the image 13*a*, 127*d*, 142*r* without obstructing any part of the surrounding annular image 13*a*, 127*a*, 142*q*. Useful off-axis locations include those in close proximity to and slightly behind 53*d*, 71*f*, 77*h* the perimeter of the primary reflector surface 53*a*, 71*a*, 77*a* or anywhere that is within the field of view of the optical system. A preferred embodiment of the level or tilt indicator may include a bubble 53*d*, 79*j*, ball 79*k*, or electronic readout and provide easily distinguished indication means when observed from above 53*d* and below 54*f*, and where the indicator is well off-axis, it may be imaged by means of a secondary reflector surface 57*e* which is larger than what is required to image the primary reflector 57*d* alone, or, in the case of a system having no secondary reflector, the indicator may be imaged by a lens system 77*c*, 79*b* having an angle of view wider than that required to image the wide angle reflector 77*a*, 79*a* alone.

Visibility of a level or tilt indicator right in the image provided by the invention also provides means for its observation in a camera viewfinder, thereby facilitating effective hand held use of the invention. Additional instrumentation which may be so imaged includes a chronometer, compass 13*e*, thermometer or other weather instruments, and other articles. These enhancements may be attachments for the invention, but other applications may indicate that the invention is an attachment or part for other systems. Such applications include weather stations, manned or robotic vehicles, and theaters.

The invention further comprises attachments and other means to reduce flare, including an occulting object 57*jj*, 71*d*, 81*q* for bright sources which is comprised of a small darkened occulting body 52*f*, 57*jj*, 71*g*, 81*q* which is affixed to at least one end of a thin wire or rod 57*ll*, 71*c*, 81*r* of sufficient rigidity to prevent visible oscillation of said occulting body by wind or moderate motion. The wire may be attached in front 57*mm*, 71*b* or behind 71*d*, 81*v* the optical system and provide means 52*e* to adjust the occulting body position 52*h*. An occulting body 81*w* or a plurality thereof may also be temporarily or permanently affixed directly to the outer refracting surface of the optical system by means of an adhesive bond. Each occulting body interrupts specular optical communication between a bright light source which may include the sun and the focal surface of a camera, sensor, or other article.

The occulting body typically has an angular subtense that is larger than the bright light source as seen from the corresponding area of said virtual image provided by said primary reflector surface, thereby causing the image 13*f*, 13*g* of said occulting body to completely cover said bright light source in the image formed by said optical system, said occultation resulting in a substantial reduction in unwanted reflections and flare.

In order to facilitate handling of the optical system of the invention without touching its optical surfaces, its mounting means include a rear cell 57*ff*, 80*t* that protrudes behind the perimeter of the rearmost utilized zone of the largest reflector or structure and which is capable of supporting the weight of the entire optical system assembly. Behind the rear cell 57*ff* is a central cell 57*z*, 81*e* which is also capable of supporting the weight of the entire optical system, said central cell having a slot 57*x*, 81*e* around its circumference which may be used to facilitate storage of the overall optical system in a fixtured case 103*f* without any optical surfaces being in contact with said case, thereby minimizing the risk of damaging the optical surfaces.

The slot of the central cell and other attributes of either cell provide means to attach accessory devices including a solar occulting object 71*d*, level or tilt indicators 72*d*, and data display devices (FIG. 13), said indicators and display devices being directly visible and imaged at the same focal surface 57*g* as the annular image 57*h*. A preferred embodiment of the central cell also has provision to accept filters 57*cc*, house imaging optics 57*f* or interface with interchangeable optical cells 57*bb*, 81*aa*, 81*bb*, 81*mm*.

The invention may incorporate or be associated with refracting optics 101*c* or surfaces which are capable of causing rays from a given point in the subject matter to be parallel where they exit the overall optical system, thereby enabling said optical system to be used in front of the fixed or interchangeable lens 101*d* of a film camera, video camera, or similar article, where said lens is focused at infinity or at a hyperfocal distance closer than infinity. In a simple or familiar form, such refracting optics correspond to a close up lens or an eyepiece.

A preferred embodiment of the optical system of the invention includes means for mounting its components 47*a*, 47*b*, 47*h*, 57*d*, 57*e*, 57*f*, 57*ii*, said means for mounting providing stable support and alignment of the reflector 47*a*, 57*d* and other optical elements without causing deformation thereof, said means for mounting providing for attachment of said optical system to an article having a focal surface 47*c*, 47*g*, 57*g*, 58*h*, 62*m*, 70*l*, 8*b*, 81*kk*, 81*ss*, 81*uu*, 81*yy*, 85*b*, 98*c*, 121*c*, 141*k*, 142*e*, 144*b*, said article being in front of or behind said reflector, said means providing a shielding to preventing stray light from entering, said mounting means facilitating unobstructed optical communication between said article and the utilized radial zones of said convex reflector.

To provide a real image of the virtual image the optical system is associated with a refracting lens system 47*b*, 47*f*, 48*c*, 55*e*, 57*f*, 78*d*, 81*aa*, 81*mm*, 81*jj*, 81*rr*, 81*xx*, 85*c*, 121*e*, 141*f*, 142*b*, 144*e*, said refracting lens system being disposed coaxial to said optical system, both being associated with the formation of a real image 57*h* of the virtual image 57*u* at a focal surface 57*g*, whereby said optical system combined with an article having a focal surface facilitates the geometric conversion of said great circle 57*b* and said area in front 57*a* and behind 57*c* the plane of said great circle into a real annular image 57*h* at the focal surface of said article and the geometric conversion of a two dimensional annular image 122c, 144b into an image which is projected onto a three dimensional surface 91g, 121a, 144h.

Subject matter around the horizon may be emphasized in any embodiment of the invention through utilization of a reflector FIG. 21c in which the effective radius of curvature decreases toward both the central and edge zones. This type of reflector also compensates for any radial compression of the image which may be caused by the annular element of the present embodiment. As with other embodiments, radially compressed and enlarged reflectors may be utilized in correcting aberrations or influencing the field of view or the apparent size of a central obscuration or exclusion zone.

Figure 30:
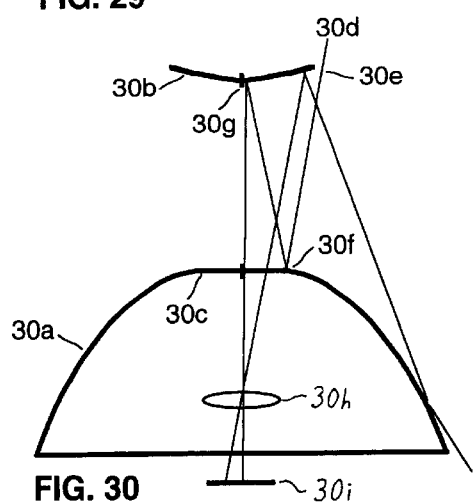
FIG. 30 is a side outline view of reflective elements of a Cassegrain wide angle reflector having a radially enlarged primary reflector figure and a radially compressed secondary reflector figure.

FIG. 30 is a side outline view showing reflective elements of a Cassegrain wide angle reflector having a primary reflector in which the figure is radially enlarged to an extreme degree and a secondary reflector which the figure is radially compressed. This type of system may be used to provide an image like that illustrated in FIG. 12.

Figure 31:
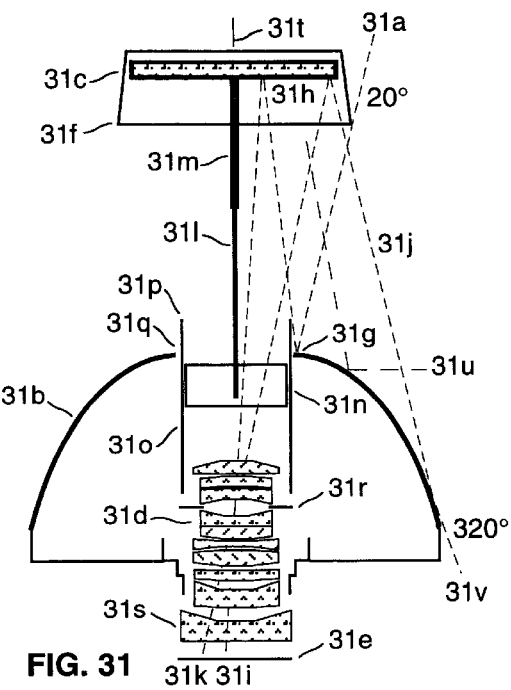
FIG. 31 is a side cross sectional view showing major elements of a Cassegrain wide angle reflector having a convex radially enlarged primary reflector a flat secondary reflector, large aperture or fast f/ratio imaging optics, and a field flattening element near the focal surface.

FIG. 31 is a side cross sectional view showing major elements of a Cassegrain wide angle reflector having a convex radially enlarged primary reflector, a flat secondary reflector, large aperture or fast f/ratio imaging optics, and a field flattening element near the focal surface. This type of system may be used to provide an image like that illustrated in FIG. 9.

Figure 32:
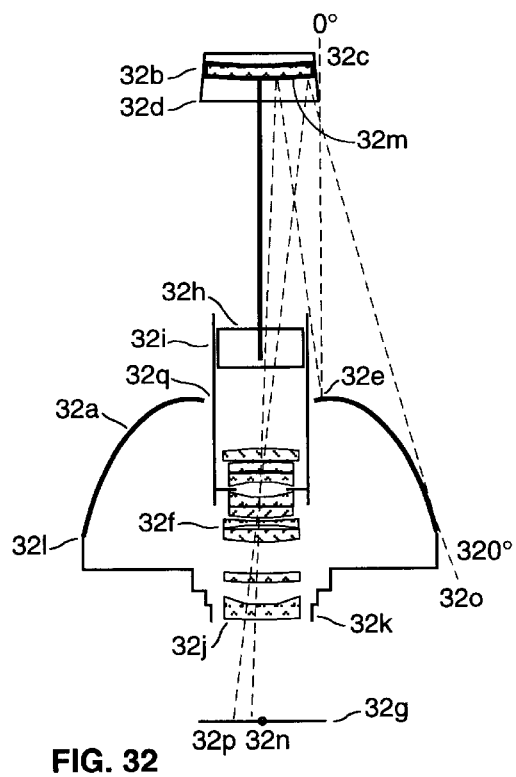
FIG. 32 is a side cross sectional view showing major elements of a Cassegrain wide angle reflector having a torroidal primary reflector, a small convex secondary reflector, and imaging optics.

FIG. 32 is a side cross sectional view showing major elements of a Cassegrain wide angle reflector having a torroidal primary reflector, a small convex secondary reflector, and imaging optics which include means for some correction of aberrations and field curvature. This type of system may be used to provide an image like that illustrated in FIG. 10.

Figures 33, 34:
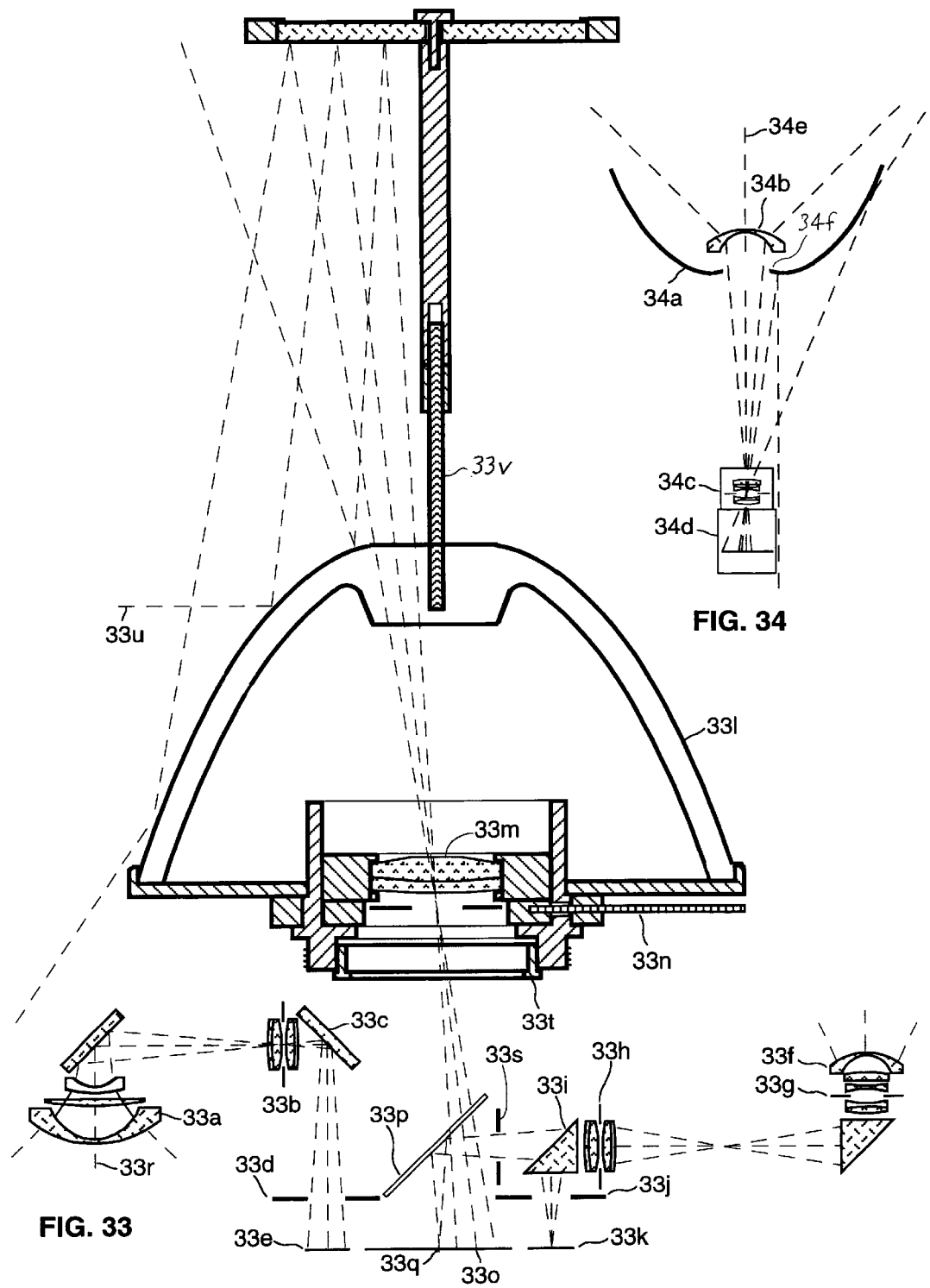
FIG. 33 is a side cross sectional view showing elements of a simplified Cassegrain wide angle reflector similar to that of the applicant's U.S. design Pat. No. D312,263, also showing aperture adjustment means and periscopic optics to cover the front and rear conical zones excluded by the primary reflector.
FIG. 34 is a side cross sectional view of a torroidal reflector having a central hole, also showing a central wide angle lens to cover the conical zone which is excluded by the reflector.

FIG. 33 is a side cross sectional view showing elements of a simplified Cassegrain wide angle reflector similar to that of the applicant's U.S. design patent D312,263, also showing improvements such as reduced obscuration from the lower end of the axial strut 33v, superior aperture adjustment means, and periscopic optics 33a, 33f to cover the front and rear conical zones excluded by the primary reflector. Including the periscopic optics, this system covers the entire sphere around itself in 3 separate images which may be formed on a common focal surface as shown in FIG. 13, or on separate focal surfaces. A Cassegrain system having a torroidal reflector 32a requires only the rearward facing optics 33a to cover a full sphere.

FIG. 34 is a side cross sectional view of a torroidal reflector 34a having a central hole, also showing a central wide angle lens 34b to cover the conical zone which is excluded by the reflector. This system covers the entire sphere around itself in two concentric images, as illustrated in FIG. 14.

FIGS. 35 through 46 show embodiments of the optical system of the invention that provide images having three dimensional information.

Three dimensional imaging means are provided by opposing reflector surfaces 45a, 45b, 46a, 46b, facing reflector surfaces 39a, 39c, 40a, 40c, 41a, 41c, tandem reflector surfaces 42a, 42b, steerable reflector surfaces or lenses 33a, 33f, a reflector surface 43c, 44c nested inside a partially reflective optical surface 43a, 43b, optical clusters 35a, 35b, one or more scalloped optical surfaces 36a, 37a, 38d, 40a, 40c, 41a, 41c which may include the primary reflector 40a, 41a, or a combination thereof. Where clustered or scalloped optics 40a, 41a, and axially separated optics 40c, 41c, are combined, the resulting redundant images 18e, 18f, 18g, 18i include three dimensional information in multiple axes.

Scalloped optical surfaces (FIGS. 36–38, 40–41) may be utilized in many parts of the invention, including the primary reflector 40a, 41a or an annular reflector 40b which surrounds the secondary reflector 40c, 41c. The principles of a scalloped optical surface will be better understood through a more detailed description thereof. In order to provide three dimensional information for the area of coverage, the area of coverage must be imaged at least twice 38a, 38b, 38c, with each image 15c, 15d, 15e being obtained from a different effective vantage point. A simple embodiment of a scalloped reflector (FIGS. 36–38) has a plurality of scallops which form convex protrusions in the perimeter as seen from the front, though the scallops may also be concave as seen from the front.

Where the overall figure of the reflector is convex, its appearance from the side will still be convex regardless of the appearance the scallops have from the front; however, the surface will be interrupted by the lines 37a, 38e which define the edge of each scallop. These lines form the boundaries 15b of sectors 15a, 18b in the image formed by the scalloped optical system.

In order to cover the subject matter at least twice, a relatively simple scalloped reflector comprises a surface having scallops 37b which are convex as seen from the front 38d and which form a plurality of identical convex lobes disposed evenly around its circumference, each lobe 38d having more than twice the included angle of coverage 38f as the angular circumference 38g of the reflector surface it occupies. For example, as seen from the front, each lobe of an eight lobe scalloped reflector surface would occupy 45 degrees 38g of the circumference and each of said lobes would have more than 90 degrees 38f of curvature and coverage.

The scalloped reflector provides a sectored virtual image (FIG. 15), said image having the same number of sectors as said scalloped reflector has lobes, each of said sectors covering a circumferential angle of view of more than twice the circumferential angle occupied by each sector, whereby said virtual image covers each point in a great circle surrounding the optical system and the area in front and behind the plane of said great circle at least twice, thereby providing fully redundant coverage thereof; said redundantly imaged points having circumferentially separated vantage points 38a, 38b, 38c and being circumferentially separated 15c, 15d, 15e, 18e, 18f, 18g in said virtual image. This redundant coverage provides three dimensional information for the entire area of mutual coverage.

Where one or more scalloped optical surfaces are used in conjunction with longitudinally separated reflectors (FIGS. 39–41) the optical system provides images having three dimensional information in all 3 major axes and some intermediate axes.

Fabrication means for embodiments including scalloped systems which are difficult to manufacture by grinding and polishing may be made with means and materials which include precision molded plastic. Molded plastic construction also simplifies fabrication of optical substrate having an integral grip surface 55i to facilitate easier handling.

A scalloped optical system is also applicable to the projection of suitable sectored images, whereby said sectored images overlap in the projection and thereby provide three dimensional information in a projected image. Further, the concepts, principles, and geometry of a scalloped optical system are also applicable to image processing techniques, algorithms, and software which are associated with viewing, analyzing, and otherwise utilizing images or data produced or reproduced by said optical system, or to the processing or analysis of other images having similar characteristics.

Figure 35:
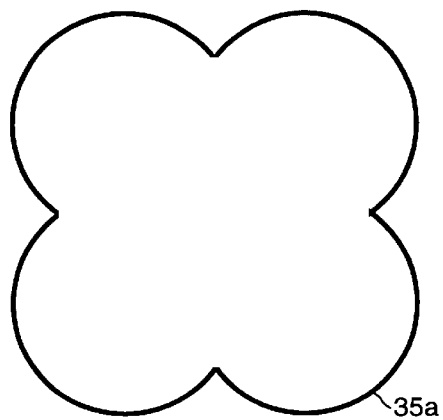
FIG. 35 is a front outline view showing the concept of a simple scalloped optic or merged optical cluster.

FIG. 35 is a front outline view showing the concept of a simple scalloped optic or merged optical cluster.

Figure 36:
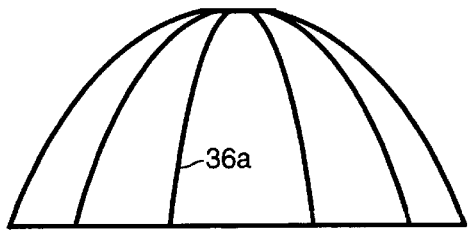
FIG. 36 is a side outline view of a convex reflector having a scalloped figure.

FIG. 36 is a side outline view of a convex reflector having a scalloped figure.

Figure 37:
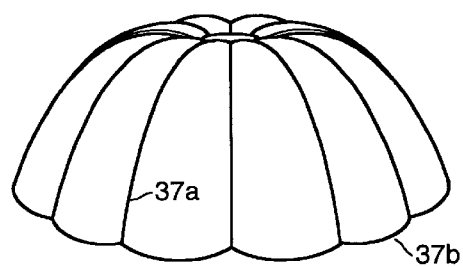
FIG. 37 is a side outline view of a torroidal reflector having a scalloped figure.

FIG. 37 is an oblique pictorial view of a torroidal reflector having a scalloped figure.

Figure 38:
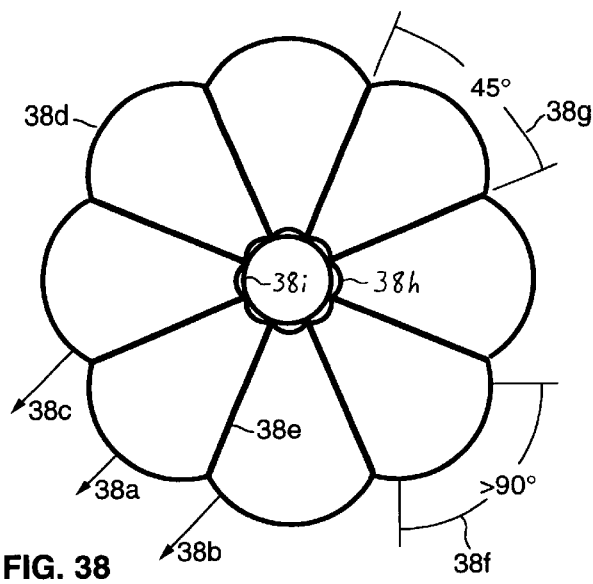
FIG. 38 is a front view of a convex reflector having a scalloped optical figure.

FIG. 38 is a top (or front) view of a convex reflector having a scalloped figure in which each scallop has substantially more than twice as much curvature as the angular circumference it occupies about the perimeter of the element, whereby each part of the surrounding subject matter is imaged (i.e. reflected to the imaging optics and thereby covered in the field of view) at least twice, whereby the virtual and real images provide three dimensional information that may be analyzed, printed, or retained in a projected image which is projected through a like or similar optical system. The scallops may be spherical or aspheric and scallops of differing sizes may be mixed. The sectored images and image data are applicable to optical and electronic distributions that facilitate delayed of real time transformation, viewing, and other utilization of still and full motion omniramic, panoramic, or limited field images and data having three dimensional information and display capability in theaters, computer monitors, and other articles.

Figure 39:
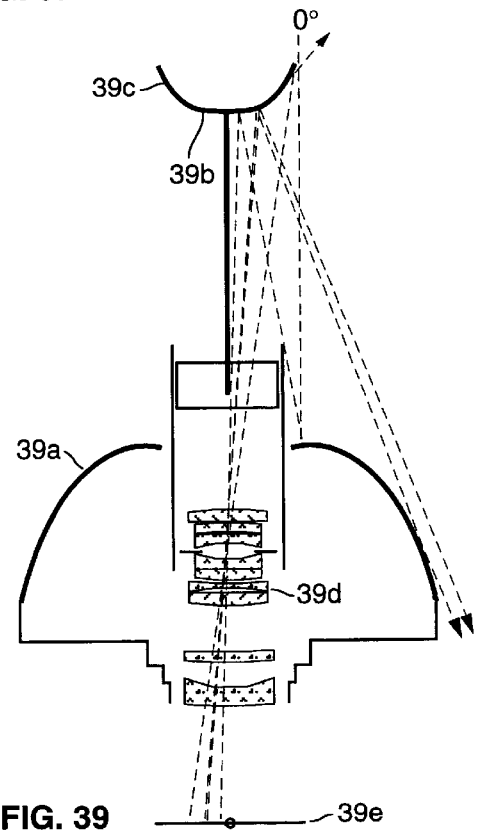
FIG. 39 is a cross sectional view showing major elements of a Cassegrain wide angle reflector in which the secondary reflector surface is surrounded by a concentric radially enlarged annular wide angle reflector surface.

FIG. 39 is a cross sectional view showing major elements of a Cassegrain wide angle reflector in which the secondary reflector surface is surrounded by a concentric radially enlarged annular wide angle reflector surface, whereby the subject matter is covered once in each of two concentric images thereby providing a redundant image having three dimensional information. This type of system may be used to provide an image like that illustrated in FIG. 17.

Figure 40:
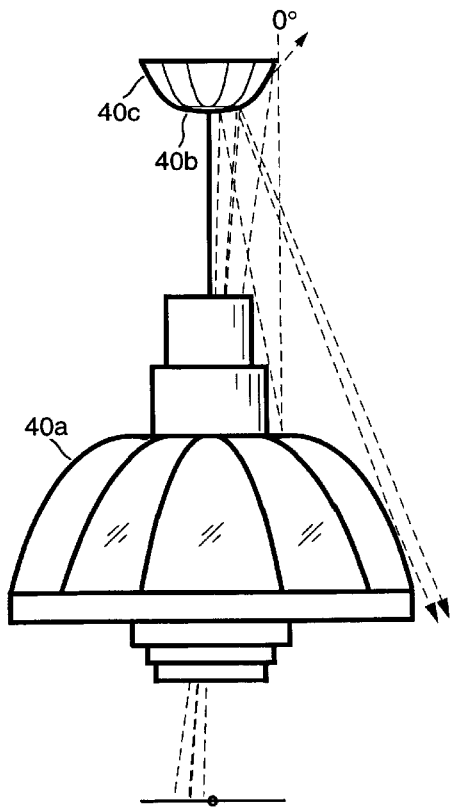
FIG. 40 is a side pictorial view of a Cassegrain wide angle reflector having a scalloped primary reflector and in which the secondary reflector surface is surrounded by a concentric radially enlarged and scalloped annular wide angle reflector surface.

FIG. 40 is a side elevational view showing major elements of a Cassegrain wide angle reflector having a scalloped primary reflector and in which the secondary reflector surface is surrounded by a concentric radially enlarged scalloped annular wide angle reflector surface, thereby providing a quadruple redundant image having three dimensional information in multiple axes. Where each optical scallop has more than three times as much curvature as the angular circumference of the optical system that it occupies, images having even greater redundancy may be obtained.

Figure 41:
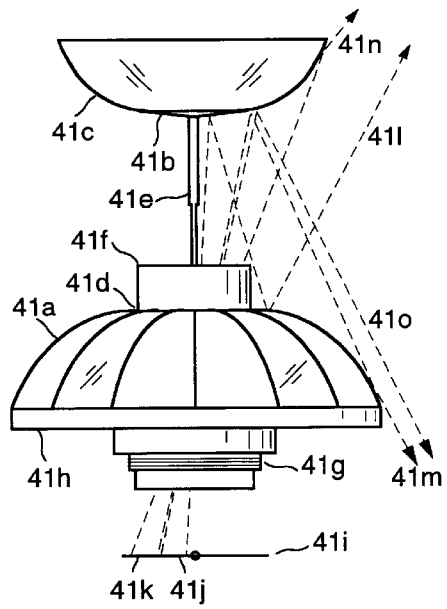
FIG. 41 is a side pictorial view of a Cassegrain wide angle reflector having a scalloped primary reflector and in which the secondary reflector surface is surrounded by a large concentric radially enlarged annular wide angle reflector surface.

FIG. 41 is a side elevational view showing major elements of a Cassegrain wide angle reflector having a scalloped primary reflector and in which the secondary reflector surface is surrounded by a concentric radially enlarged annular wide angle reflector surface, thereby providing a triple redundant image having three dimensional information in multiple axes. Where each optical scallop has more than three times as much curvature as the angular circumference of the optical system that it occupies, even greater redundancy may be obtained.

Figure 42:
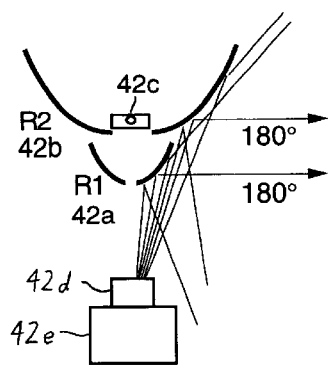
FIG. 42 is a simplified side cross sectional view of two coaxial reflector surfaces which are positioned one in front of the other.

FIG. 42 is a simplified side cross sectional view of two coaxial reflector surfaces which are positioned one in front of the other in order to redundantly image the subject matter from differing vantage points and thereby provide three dimensional information.

Figure 43:
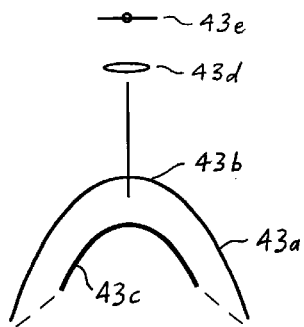
FIG. 43 is a simplified side cross sectional view of a nested pair of reflector surfaces which are imaged from the front.

FIG. 43 is a simplified side cross sectional view of a nested reflector pair (or double sided reflector having a thick substrate) in which the outer surface is partially reflective in order to permit light to reach the inner reflector surface.

Figure 44:
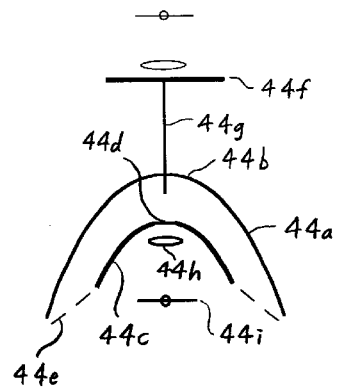
FIG. 44 is a simplified side cross sectional view of a nested pair of reflector surfaces which are integrated into a Cassegrain system.

FIG. 44 is a simplified side cross sectional view of a nested reflector pair (or double sided reflector having a thick substrate) in which the outer surface is partially reflective in order to permit light to reach the inner reflector surface; said reflector pair being combined with a secondary reflector to form a Cassegrain system.

Figure 45:
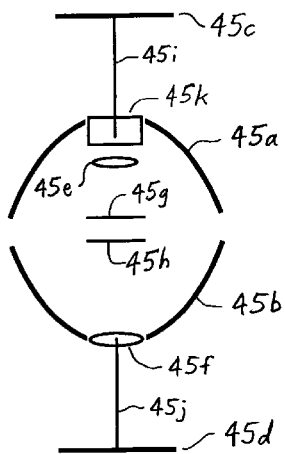
FIG. 45 is a simplified side cross sectional view of two opposing Cassegrain reflectors.
Figure 46:
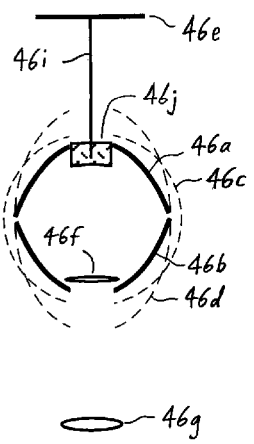
FIG. 46 is a simplified side cross sectional view of two opposing reflectors, one of which is Cassegrain.

FIGS. 45 and 46 show two optical systems of the present invention or components thereof that are incorporated into a single instrument, said optical systems being pointed in opposite directions 45a, 45b, 46a, 46b in order to provide redundant coverage of the entire subject with opposing image projections, resulting in reduced distortion of many parts of the subject without resorting to external image processing, further providing three dimensional information by means of redundant imaging from different vantage points. For additional versatility, the optical systems may be associated with separate instruments or or one or more of said optical systems may be independently positionable in order to provide redundant coverage of selected parts of the subject with configurable image projections, resulting in reduced subject distortion without resorting to external image processing, further providing three dimensional information within the redundantly imaged area by means of imaging from different vantage points.

FIG. 45 is a simplified side cross sectional view of two opposing Cassegrain wide angle reflectors that provide coverage of nearly the full sphere in two separate images in which the great circle perpendicular to the optical axis and a substantial angular area on either side thereof being covered redundantly, thereby providing three dimensional information. Full sphere coverage is possible through the se of torroidal primary reflectors or auxiliary optics.

FIG. 46 is a simplified side cross sectional view of two opposing reflectors, one of which is Cassegrain, that provide coverage of nearly a full sphere in two concentric images which may be imaged on a common focal surface and in which with a great circle perpendicular to the optical axis and a substantial angular area on either side thereof is covered redundantly, thereby providing three dimensional information. Dashed lines show an alternate aspheric figure as well as the outline of a single spherical reflector which provides the wide angle reflector surfaces for both parts of the system.

Figure 47:
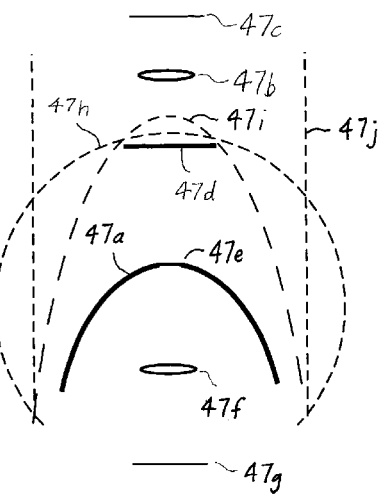
FIG. 47 is a simplified side cross sectional view of a convex reflector, also showing profiles for an outer lens or Fresnel lens or other optical substrate which surrounds said reflector.

FIG. 47 is a simplified side cross sectional view of a convex reflector, also showing profiles for an outer lens or Fresnel lens which surrounds the reflector and may be used to influence coverage and correction of aberrations. The same profiles are also applicable to a simple transparent housing.

Most embodiments of the invention have optical surfaces which each comprise a surface of revolution. Other applicable optical surfaces include surfaces having characteristics like those of a formed Fresnel lens. Some embodiments of the invention utilize a separate refracting optical system or element 47h, 47i, 47j that surrounds a wide angle lens (FIG. 50) or reflector 47a and which is utilized in modifying the effective field of view thereof. Optical systems or elements of this type include strong hollow convex elements 47h, 47i or annular elements 47j which may have continuous surfaces or formed Fresnel surfaces.

Figure 50:
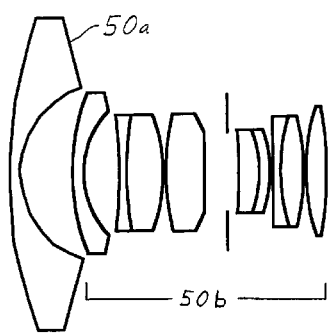
FIG. 50 is a cross section view of a typical 180 degree fisheye lens which is well known in the prior art.

In some embodiments, an optical substrate 47h, 47i, 47j surrounds a wide angle optical system 47a, FIG. 50, said substrate acting as a refracting element or support means for a secondary reflector 47d, sensor, camera 47c, projector, or other article. This embodiment may consist of a convex specular reflector 47a having radial symmetry, said reflector being in optical communication with a great circle surrounding it, the plane of said great circle being perpendicular to the optical axis of said reflector said reflector having sufficient curvature to be in optical communication with a substantial area in front and behind the plane of said great circle, said reflector being surrounded by a cylindrical 47j, annular, or other optical element, whereby said optical system produces a virtual image of the said great circle and said area above and below its plane, said virtual image being annular.

The virtual image is visible from a vantage point 47b in front of the wide angle reflector by means of said vantage point being in optical communication with said great circle and said area in front and behind the plane of said great circle by means of reflection from said convex reflector 47a and transmission or refraction through said hollow or annular optical element 47h, 47i, 47j.

Figure 48:
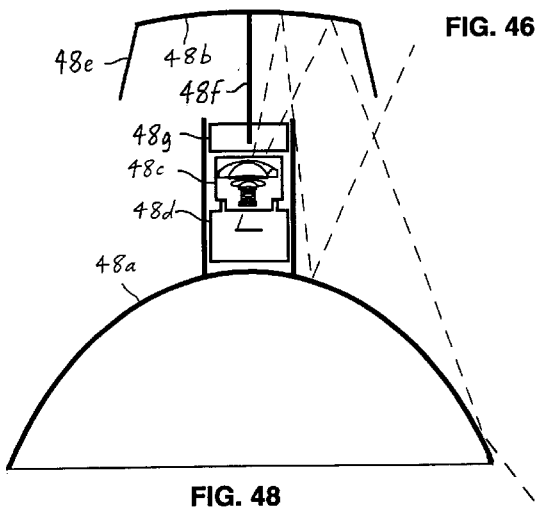
FIG. 48 is a simplified side cross sectional view of a convex reflector having a camera and secondary reflector positioned in front.

FIG. 48 is a simplified side cross sectional view of a convex reflector having a camera and secondary reflector positioned in front.

Figure 49:
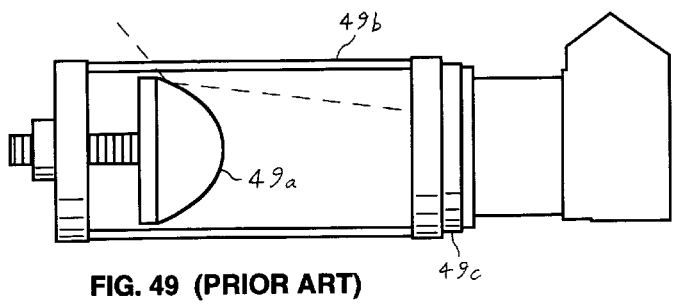
FIG. 49 is a side view of the presently known Spiratone Birds Eye attachment; prior art that has been on the market since the mid 1970's.

FIG. 49 is a side view of the presently known Spiratone Birds Eye attachment, prior art that has been on the market since the mid 1970's and which comprises a convex reflector 49a, a hollow glass cylinder 49b, and a removable close up lens 49c.

FIG. 50 is a cross section view of a typical 180 degree fisheye lens which is well known in the prior art and which has a strongly curved front element 50a having negative optical power and rear element groups 50b that have a positive optical power and correct for aberrations.

Figure 51:
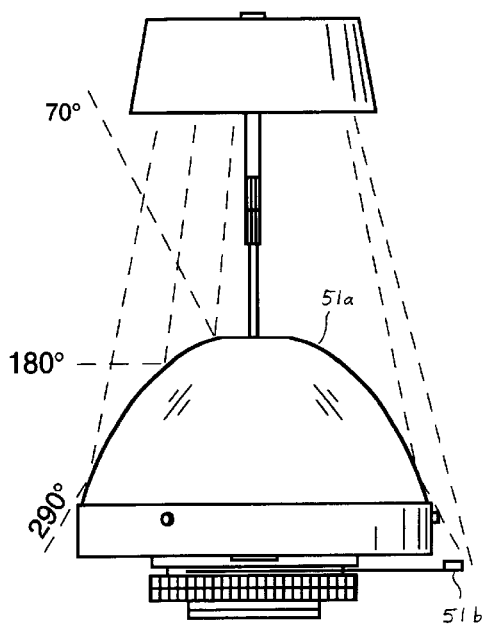
FIG. 51 is a side pictorial view of a Cassegrain wide angle reflector in which the secondary reflector is supported by an axial strut.

FIG. 51 is a side pictorial view of a Cassegrain wide angle reflector in which the secondary reflector is supported by an axial strut. Also shown is a tilt indicator attachment which is imaged at the focal surface by means of the secondary reflector.

Figure 52:
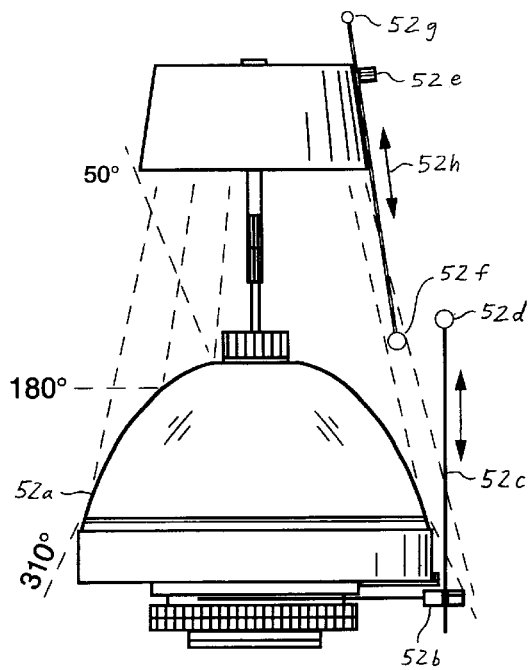
FIG. 52 is a side pictorial view of a Cassegrain wide angle reflector having a radially enlarged primary reflector and in which the secondary reflector is supported by an axial strut.

FIG. 52 is a side pictorial view of a Cassegrain wide angle reflector having a radially enlarged primary reflector and in which the secondary reflector is supported by an axial strut. Also shown is an adjustable occulting object which can cover bright light sources such as the sun in order to reduce flare FIG. 53 is a top (or front) view of an apparatus such as that in FIG. 51, also showing means for accurately indicating the outer boundary of the field of view.

Figure 54:
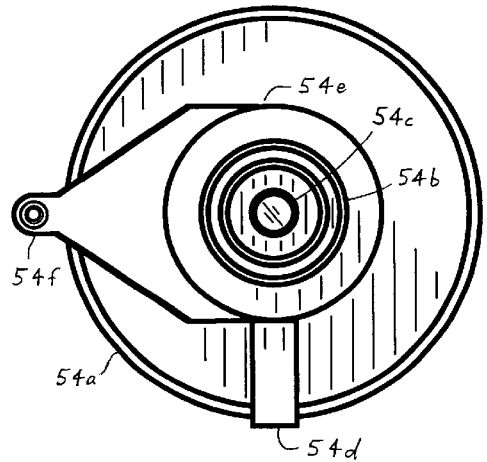
FIG. 54 is a bottom (or rear) view of an apparatus such as that in FIG. 51.

FIG. 54 is a bottom (or rear) view of an apparatus such as that in FIG. 51.

Figure 53:
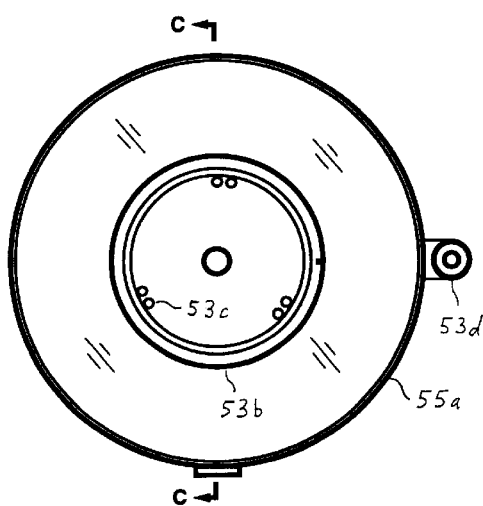
FIG. 53 is a top (or front) view of an apparatus such as that in FIG. 51, also showing means for accurately indicating the outer boundary of the field of view.
Figures 55, 56:
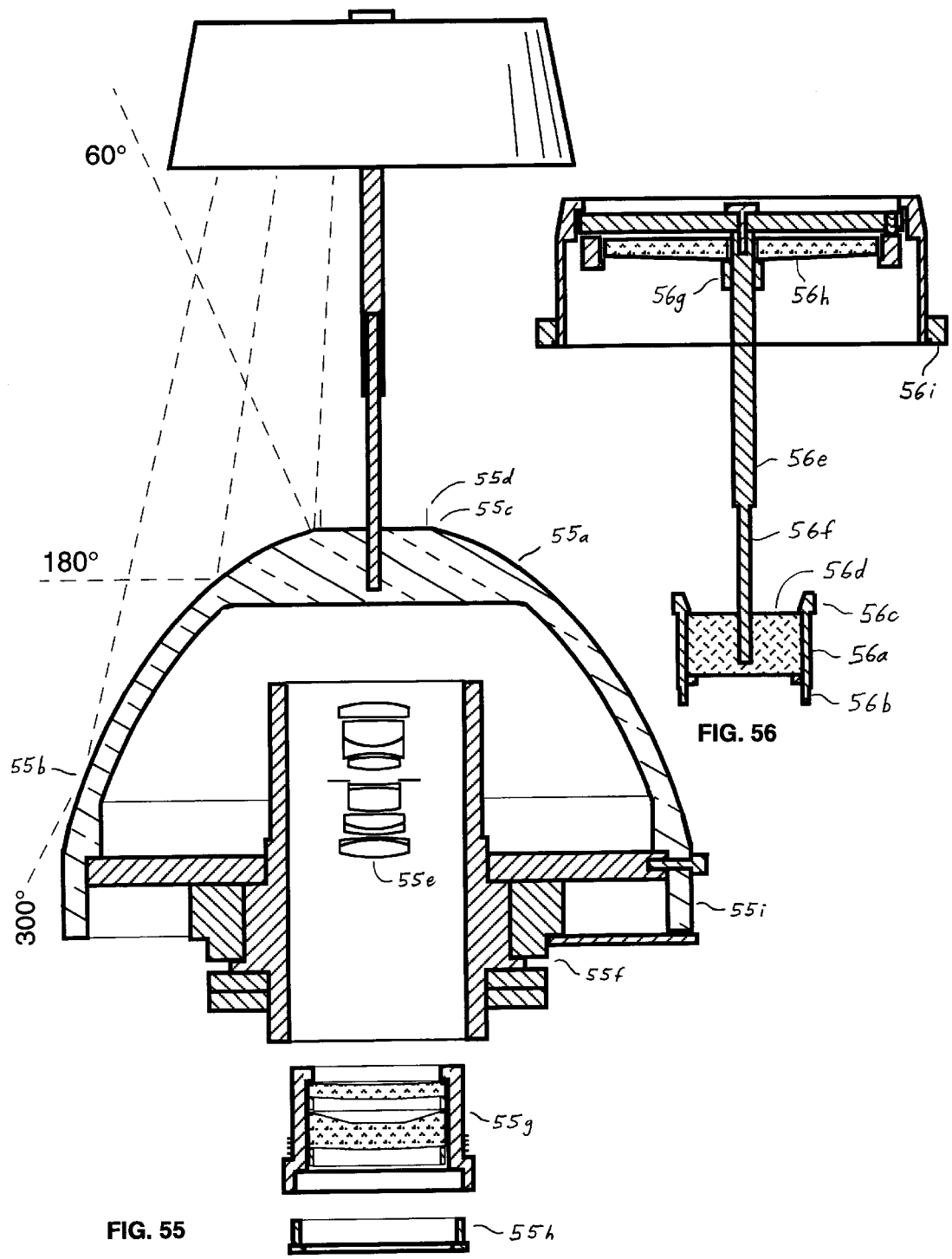
FIG. 55 is a side cross sectional view of a Cassegrain wide angle reflector, taken along line C—C of FIG. 53, showing a primary reflector and integral grip surface.
FIG. 56 is a side cross sectional view of a secondary reflector and baffle.

FIG. 55 is a side cross sectional view of a Cassegrain wide angle reflector, taken along line C—C of FIG. 53, showing a primary reflector and integral grip surface made of material which may include plastic, also showing imaging and astigmatism correcting optics similar to those used in the rear of a fisheye lens. The bottom of the figure shows an interchangeable rear lens cell having optics to optimize the system for a particular image size and back focal distance and means for holding threaded and disk type (e.g. Series V, etc.) filters.

FIG. 56 is a side cross sectional view of a removable or interchangeable secondary reflector and baffle, axial strut, and optical window such as that which may be implemented in the apparatus of FIG. 52.

Figure 57:
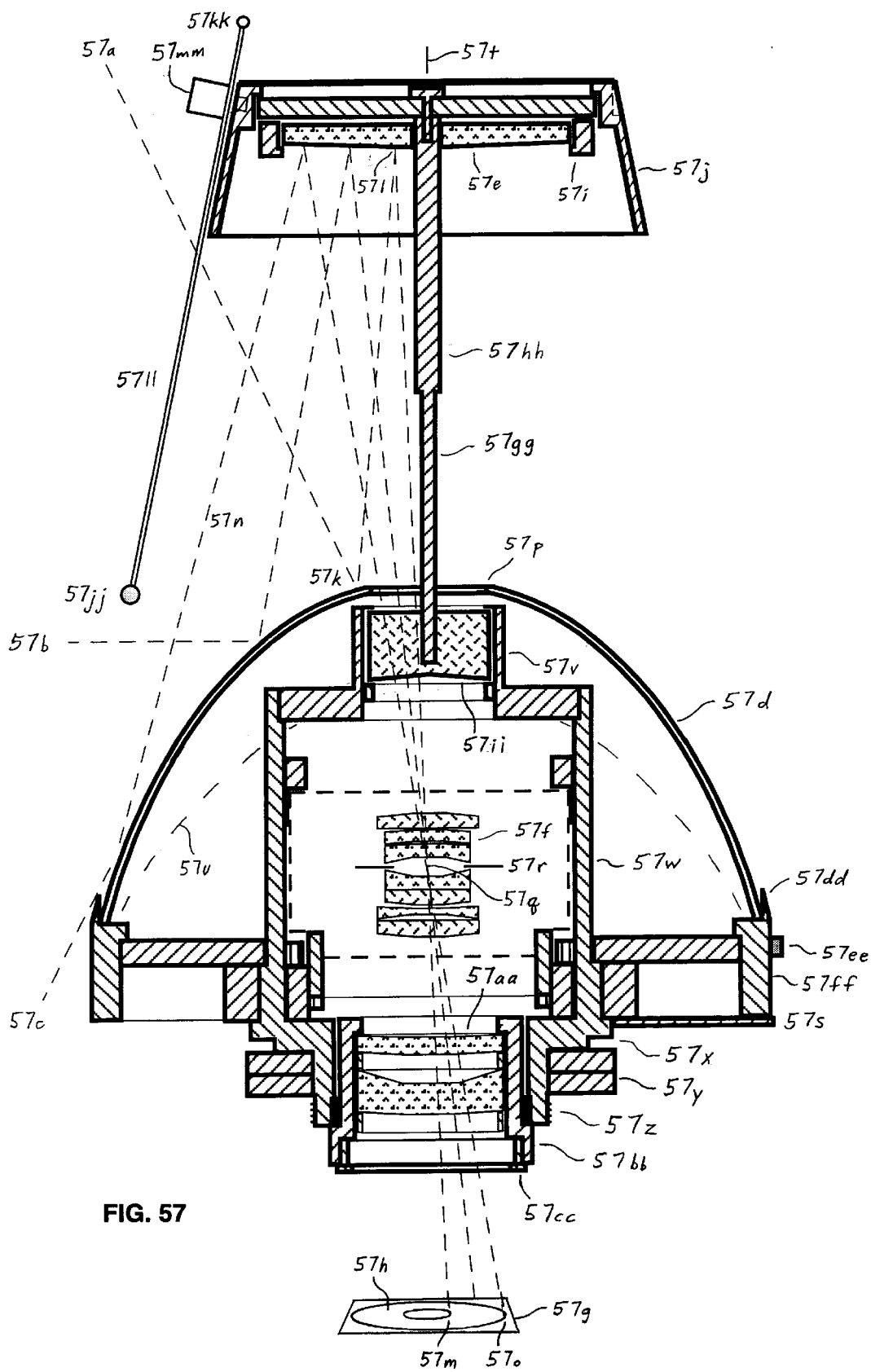
FIG. 57 is a side cross sectional view of a Cassegrain wide angle reflector, taken along line C—C of FIG. 53, also showing an adjustable occulting object attachment.

FIG. 57 is a side cross sectional view of a Cassegrain wide angle reflector, taken along line C—C of FIG. 53, also showing a negative lens in longitudinal proximity to the central hole in the primary reflector, further showing an adjustable occulting object attachment. The negative lens facilitates full coverage of even a large secondary reflector without increasing the size of the transparent area or hole in the center of the primary reflector.

Figure 58:
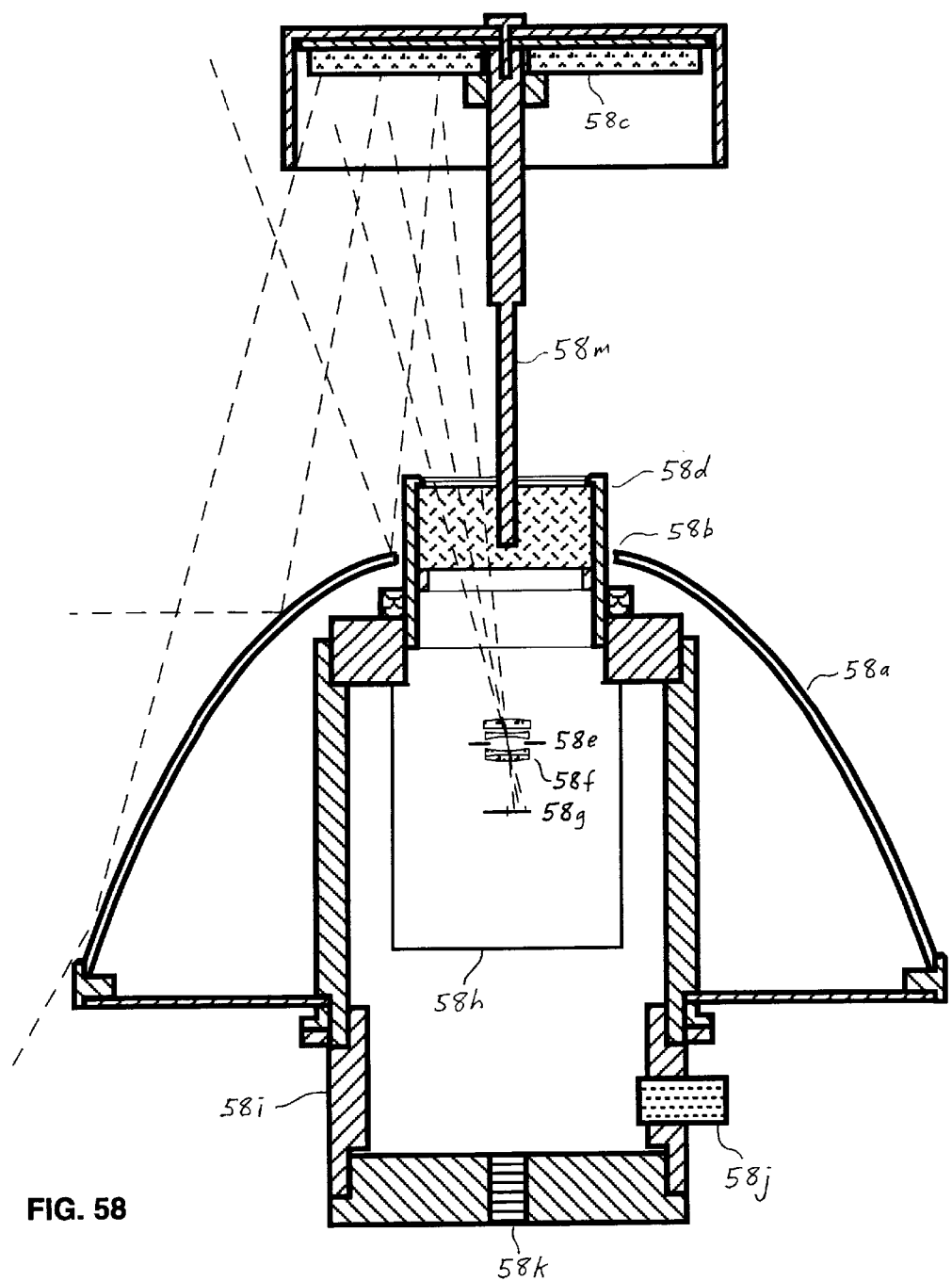
FIG. 58 is a side cross sectional view of a Cassegrain wide angle reflector, taken along line C—C of FIG. 53, also showing a recessed focal surface for a relatively small electronic imager.

FIG. 58 is a side cross sectional view of a Cassegrain wide angle reflector, taken along line C—C of FIG. 53, also showing a recessed focal surface for a relatively small electronic imager that permits the use of shorter focal length imaging optics and thereby a smaller measured aperture diameter for a given fraction, which in turn reduces visible astigmatism without the use of special correcting optics.

Figure 59:
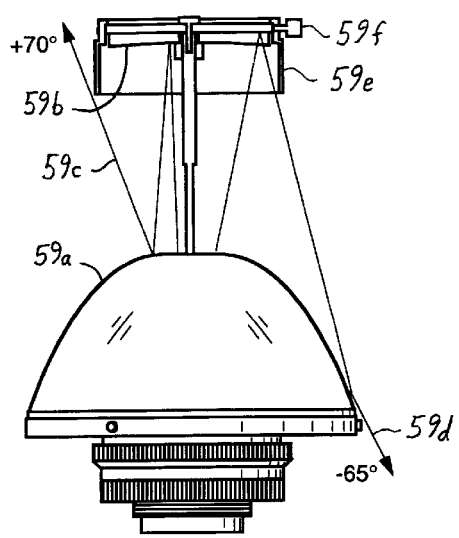
FIG. 59 is a side view of a Cassegrain wide angle reflector which includes a cross section view of a second surface (mangin) secondary reflector and its removable baffle.

FIG. 59 is a side view of a Cassegrain wide angle reflector having a radially enlarged primary reflector figure in order to reduce the angular size of the front exclusion zone. The top of the figure is a cross section view of a second surface (mangin) secondary reflector and its removable baffle.

Figure 60:
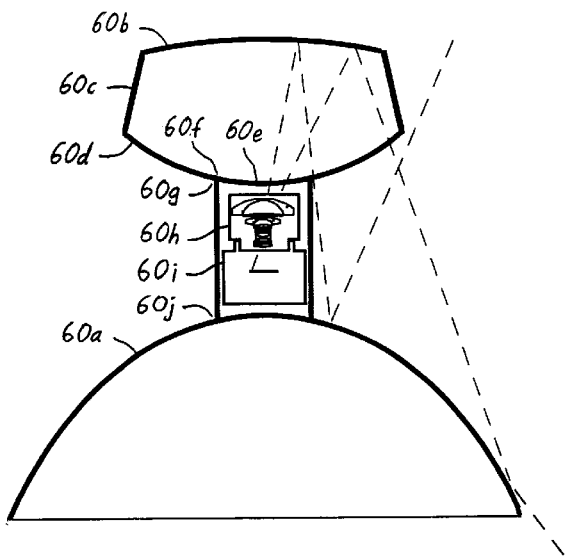
FIG. 60 is a side view of a Cassegrain wide angle reflector which includes a cross section view of a solid second surface secondary reflector, also showing a camera in an axial position.

FIG. 60 is a side view of a Cassegrain wide angle reflector which includes a cross sectional view of a solid second surface secondary reflector, also showing a camera in an axial position between the primary and secondary reflectors. Surfaces of the solid secondary reflector are used to facilitate the camera position and in the correction of aberrations. Where the camera is located behind the primary reflector, the central strut may be hollow or transparent. Where the strut is transparent, it may be an extension of the transparent secondary reflector substrate.

Figure 61:
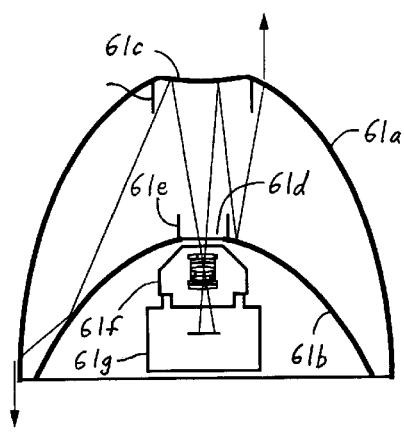
FIG. 61 is a side cross sectional view of a Cassegrain wide angle reflector in which an optical substrate occupies the area between the reflector surfaces.

FIG. 61 is a side cross sectional view of a Cassegrain wide angle reflector in which an optical substrate occupies the area between the reflector surfaces, said substrate being utilized to influence the field of view and thereby providing means for full sphere coverage.

Figure 62:
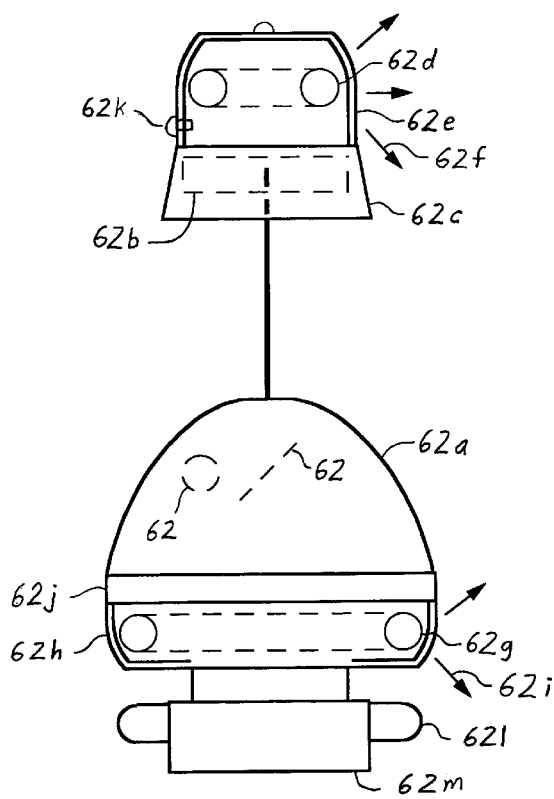
FIG. 62 is a side view of a Cassegrain wide angle reflector having illumination means behind the primary reflector and in front of the secondary reflector.

FIG. 62 is a side view of a Cassegrain wide angle reflector having illumination means behind the primary reflector and in front of the secondary reflector. Illumination can be constant, flash, or a combination of both. In the case of flash being used with an electronic image sensor, the incorporation of appropriate sensors and circuitry facilitates range gated illumination (by initiating the exposure at or near the end of the flash) to minimize the effects of brightness versus distance from the light source. Shown in dashed lines are illuminators and beamsplitter surfaces which each provide means to illuminate a scene by reflection from the wide angle optics. Illumination means are also applicable to a non-Cassegrain system.

A preferred embodiment of the invention further comprises means for illuminating 62d, 62g, 141q, 142c surrounding subject matter when the optical system thereof is utilized as an image capture system. Such an embodiment of the invention may be attached to, incorporated into or otherwise associated with a film or electronic imaging camera, photographic optical system, electronic image system, motion picture system, surgical instrument, endoscope, bore scope, surveillance instrument, robotic device, sensor, or similar article, said article incorporating means for providing illumination of the subject, said illumination means being located behind said primary reflector surface and in front of said secondary reflector surface, said lighting means being shielded 62c, 62j so as not to directly illuminate the optics in order to reduce flare. In cases where electronic flash is used in lieu of or in addition to continuous lighting, a flash in front of said secondary reflector surface is triggered by a photosensitive or radio frequency slave sensor 62k in order to eliminate wiring. Continuous illumination or suitable flash illumination is compatible with both still and motion panoramic images.

The invention may be further associated with an electronic imaging sensor and provide subject illumination which employs range gated illumination and imaging by means of a sensor exposure of up to only a few to a few dozen nanoseconds, whereby a shorter effective exposure is provided for objects nearest the optical system, said illumination being compatible with a system in which illumination is actually directed through said optical system by means of a beam splitter or partially transmissive reflector or reflector surface prior to the initiation on an exposure. Depending on the subject distance and the embodiment of the invention, the flash illumination ceases at the time the exposure is initiated or up to a few nanoseconds thereafter. Light traveling to nearby subject matter is reflected therefrom and returns to the optical system sooner than the light that travels to and reflects from distant subject matter, thereby resulting a period of illumination that is of a shorter relative duration than that for distant subject matter.

Where the invention is associated with an electronic imaging sensor capable of exposure and readout without mechanical shuttering, the optical system being capable of imaging up to the entire sphere area around itself; said imaging being accomplished without any moving parts.

Preferred motion picture embodiments of the invention having electronic imaging sensors or being associated therewith may have the provision and interface means to facilitate real time digital processing of more than 24 images per second, whereby the invention may also be associated with an integral or separate motion picture imaging system to provide immersive panoramic motion pictures.

The invention may further comprise or be incorporated into or attached to articles which include medical instrumentation, said articles providing illumination means for the subject matter. The image from such articles may be locally captured with a sensor or be relayed with fiber optics. Where the invention is not physically connected to an outside imager, the image may also be relayed by means of electromagnetic signals.

FIGS. 63 and 64 show embodiments of the optical system of the invention that are applicable to telescopes and long distance microscope objectives.

Embodiments of the present invention including those having an axial strut 63f, 64g are applicable to telescopes (FIGS. 63, 64) and long distance microscopes when the primary reflector surface 63a, 64a is made to be concave, whereby an axial point beyond the front of the primary reflector is in optical communication with an axial point 63e behind said primary reflector by means of reflection from said primary reflector and reflection from a secondary reflector surface 63b, and transmission through a transparent area 63i in the center of the primary reflector surface, whereby the optical system functions as a telescope or long distance microscope objective which may be used in association with an eyepiece, camera, correcting optics, or similar articles. In other embodiments of the present invention, an axial point beyond the front of the primary reflector is in optical communication with another axial point 64f in front of said primary reflector by means of reflection from the primary reflector 64a.

FIG. 63 is a side cross sectional view of a Cassegrain telescope in which the secondary reflector is supported by an axial strut which is in turn supported by transparent optics in the primary baffle tube.

FIG. 64 is a side cross-sectional view of an astrograph in which correcting optics and a focal surface are supported by an axial strut.

Figure 65:
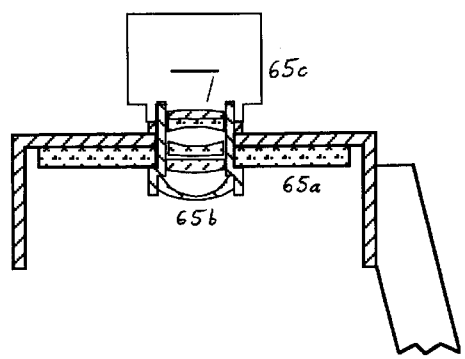
FIG. 65 is a side cross sectional view of a baffled primary, secondary, or auxiliary reflector having a central hole in which a camera lens is mounted.

FIG. 65 is a side cross section view of a baffled primary, secondary, or auxiliary reflector having a central hole in which a camera lens is mounted. The camera may be pointed as shown or in the opposite direction or have means for independent pointing. This or a similar reflector and camera assembly may be used in the apparatus of FIG. 66.

Figure 66:
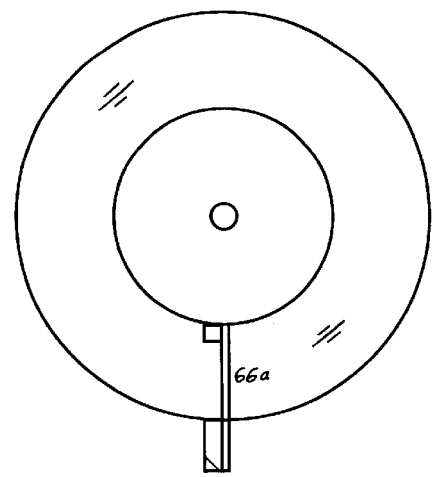
FIG. 66 is a top pictorial view of a Cassegrain reflector in which the secondary reflector and its baffle are supported by a single side strut having a thin profile as seen from the optical axis.

FIG. 66 is a top pictorial view of a Cassegrain reflector in which the secondary reflector and its baffle are supported by a single side strut having a thin profile as seen from the optical axis. The side strut can be used for running cables without further obstructing the image.

Figure 67:
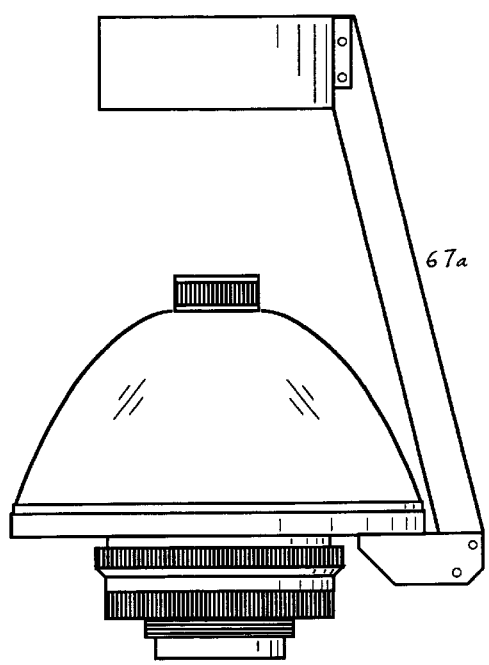
FIG. 67 is a side pictorial view of the optical system of FIG. 66.

FIG. 67 is a side pictorial view thereof.

Figure 68:
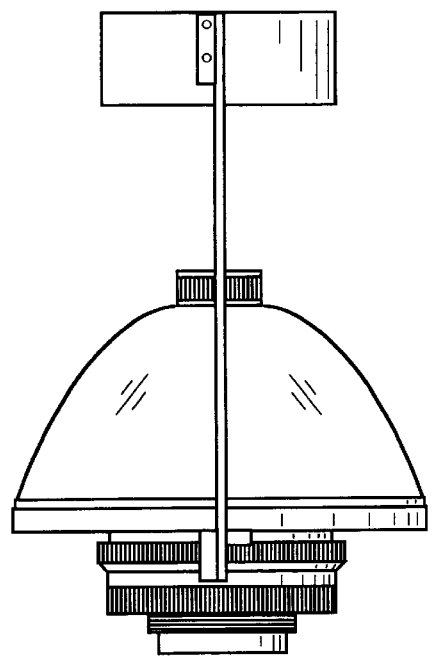
FIG. 68 is a side pictorial view of the optical system of FIG. 66, taken from the right of FIG. 67.

FIG. 68 is a side pictorial view thereof, taken from the right of FIG. 67.

Figure 69:
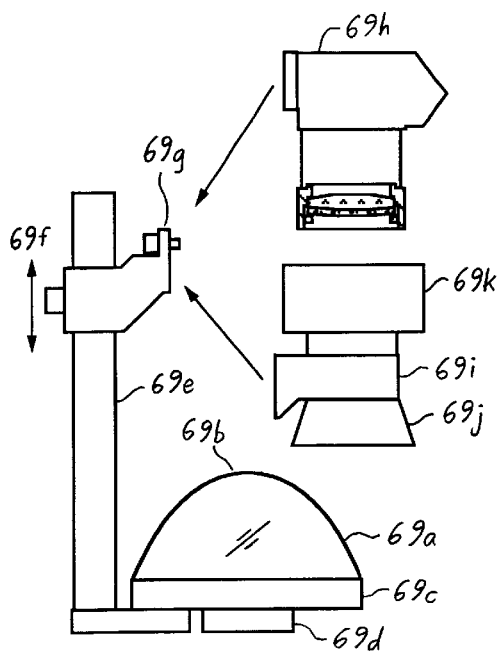
FIG. 69 is a side pictorial view of a wide angle reflector having a central hole and removable side vane assembly that is low profile when seen from the optical axis.

FIG. 69 is a side pictorial view of a wide angle reflector having a central hole and removable side vane assembly that is low profile when seen from the optical axis, said vane assembly providing adjustable means to support a camera, secondary mirror, or other article at different distances from the reflector.

Figure 70:
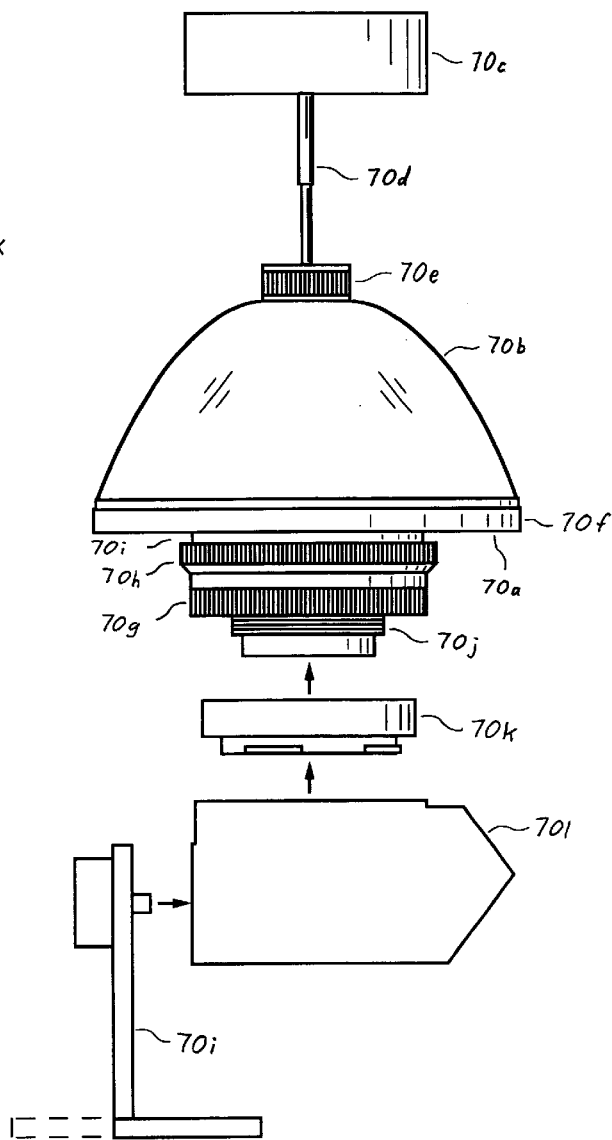
FIG. 70 is a side pictorial view of a Cassegrain wide angle reflector having a rear interface which is compatible with popular cameras and adapters, also showing a camera, camera adapter, and right angle bracket.

FIG. 70 is a side pictorial view of a Cassegrain wide angle reflector having a rear interface which is compatible with popular cameras and adapters, also showing a right angle bracket for positioning the camera and reflector in a vertical orientation on a tripod while keeping elements of the tripod head close enough to centered under the optical system so as to prevent imaging said tripod head in the resulting annular panoramic image.

Figure 71:
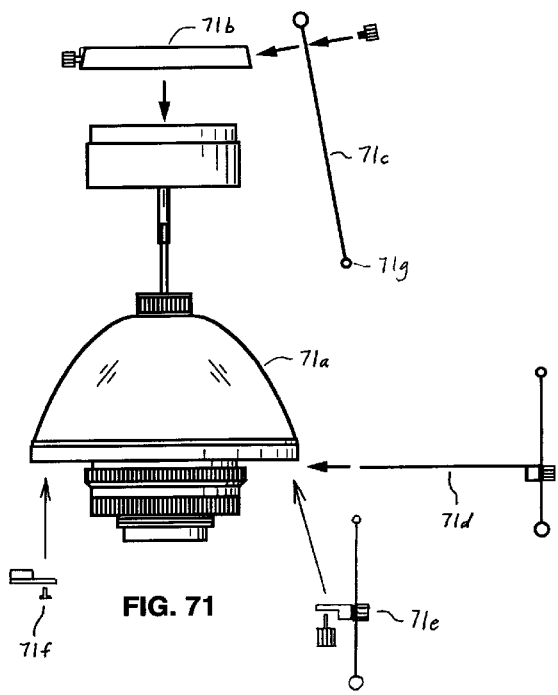
FIG. 71 is a side pictorial view of a Cassegrain wide angle reflector, also showing side and top views and means for attaching an occulting object, tilt indicator, or other article.

FIG. 71 is a side pictorial view of a Cassegrain wide angle reflector, also showing means for attaching an occulting object, tilt indicator, or other article.

Figure 72:
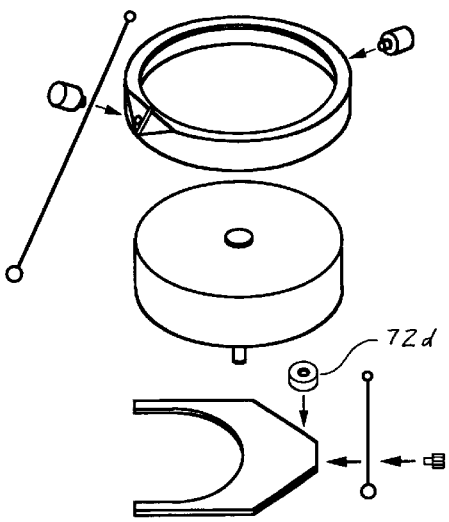
FIG. 72 is a side pictorial view of a set of occulting objects, also showing attachment means.

FIG. 72 is an oblique pictorial view of occulting objects and a tilt indicator, also showing means by which they or other articles may be attached to an optical system.

Figure 73:
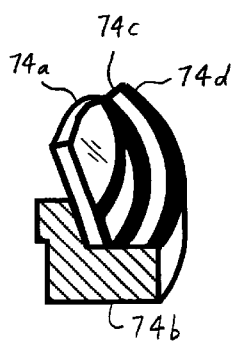
FIG. 73 is a side cross sectional view of the perimeter of a wide angle reflector showing means for accurately indicating the edge of the field of view by means of a covering or over the inner or outer boundaries of the reflector.

FIG. 73 is a side cross sectional view of the perimeter of a wide angle reflector showing means for accurately indicating the edge of the field of view by means of a covering or over the inner or outer boundaries of the reflector.

Figure 74:
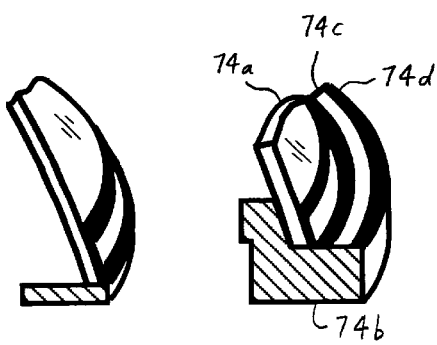
FIG. 74 is a side cross sectional view of the perimeter of a wide angle reflector showing means for accurately indicating the edge of the field of view by means of colored or light and dark radial zones on a relatively flat surface behind the reflector.

FIG. 74 is a side cross sectional view of the perimeter of a wide angle reflector showing means for accurately indicating the edge of the field of view by means of colored or light and dark radial zones on a relatively flat surface behind the reflector.

Figure 75:
FIG. 75 is a side cross sectional view of the perimeter of a wide angle reflector showing means for accurately indicating the edge of the field of view by means of colored or light and dark zones on a rim which borders the reflector.

FIG. 75 is a side cross sectional view of the perimeter of a wide angle reflector showing means for accurately indicating the edge of the field of view by means of colored or light and dark zones on a rim which borders the reflector.

Figure 76:
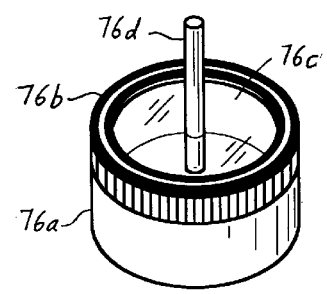
FIG. 76 is a pictorial view of a transparent support for an axial strut, also showing its cell and means for accurately indicating the inner boundary of the field of view.

FIG. 76 is an oblique pictorial view of an optical cell such as that which may be used to house a lens or optical window for a wide angle optical system, said cell providing accurate indication of the inner boundaries of an annular image by means of colored or light and dark zones on its front side.

FIGS. 77 through 84 show embodiments of the optical system of the invention that do not have secondary reflectors.

The foregoing optical systems and concepts are also applicable to optical systems that have no secondary reflector surface. In this case, the vantage point from which the virtual image is observed or captured is typically at a axial position in front of the primary reflector surface. This axial position may include that which would otherwise have been occupied by a secondary reflector surface or secondary reflector substrate, though in most embodiments, the optimum vantage point is farther from the primary reflector. In most embodiments having no secondary reflector surface, the "primary reflector" or "primary reflector surface" will typically be referred to as simply the "reflector".

Embodiments not having a secondary reflector (FIGS. 34, 42, 43, 77–80, 81k, 82–86, 91, 92, 94, 97–100, 121, 141, 143, 144) tend to be simpler than those having a secondary reflector. Furthermore, the size of the imaging optics 78d, 84*d*, 144*e* can typically be larger than they could on a system having a secondary reflector. This more easily facilitates the use of imaging lens elements in correcting aberrations.

Imaging of a zone 79*m* at an angle that is well in front of the reflector surface or even of an axial point 96*d* in front of the reflector surface may be facilitated through any of the means utilized with a system having a secondary reflector, so long as said means rely on auxiliary optics or the attributes of the primary reflector surface and the central obstruction. In embodiments utilizing the attributes of a wide angle reflector and a front obstruction to influence coverage, imaging of an axial point in front of the reflector surface requires that the utilized zones on said reflector surface 34*a* are larger than any camera 34*d*, projector, or instrumentation which is used in front of said reflector. These limitations are overcome when a camera 84*c*, projector 85*b* or similar article are used at a relatively long distance in front of the reflector surface 84*a*, 85*a*, making them appear insignificantly small in the reflected image. In such cases, the article does not necessarily have to be attached to the optical substrate.

Imaging of a zone well behind 79*a* the reflector or even of an axial point 33*r*, 34*e* behind the reflector is accomplished by means of auxiliary optics 33*a*, 34*b* or imagers. A central image 14*a* of subject matter 34*e* behind the reflector surface 34*a*, 141*a* is provided by means of a transparent area 34*f*, 141*b* in the center of said reflector surface. Further, means used in a system having a secondary reflector surface to manipulate the field of view of central optics or to image instruments, indicators, or displays may also be used with embodiments not having a secondary reflector by means of utilizing a transparent area in the center of the reflector surface, imaging optics 77*c*, 79*b* which cover subject matter 77*h*, 79*f* beyond the perimeter 79*n* of the wide angle reflector, or the placement of instrumentation 79*i*, 79*j*, 79*k*, 80*e* to facilitate its imaging through reflection from the wide angle reflector 79*a*, 80*a*.

Figure 77:
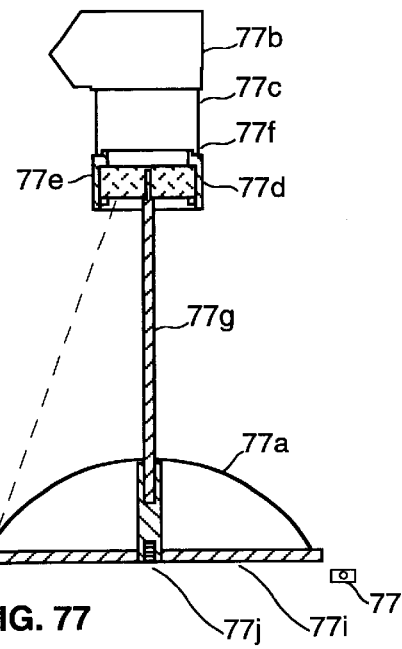
FIG. 77 is a side cross section view of a convex reflector in which the camera or reflector is supported by an axial strut and transparent substrate.

FIG. 77 is a side cross section view of a convex reflector in which the camera is supported by an axial strut and transparent substrate, also showing the location for a tilt indicator or other article.

Figure 78:
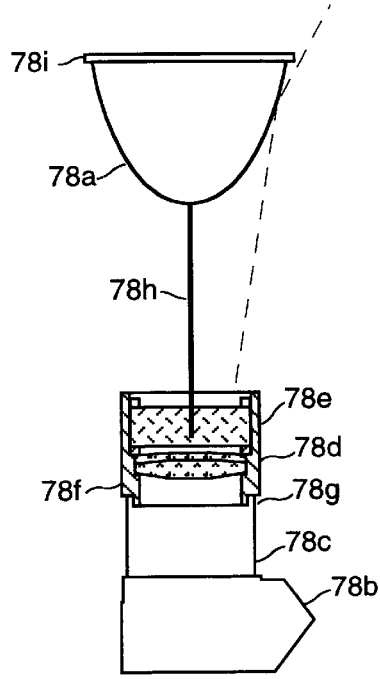
FIG. 78 is a side view of a wide angle reflector which is supported by an axial strut, also showing a close up lens and means for indicating the limit of coverage.

FIG. 78 is a side view of a wide angle reflector which is supported by an axial strut, also showing means for indicating the limit of coverage, further showing a cross sectional view of the optical cell which houses a close up lens and support means for an axial strut.

Figure 79:
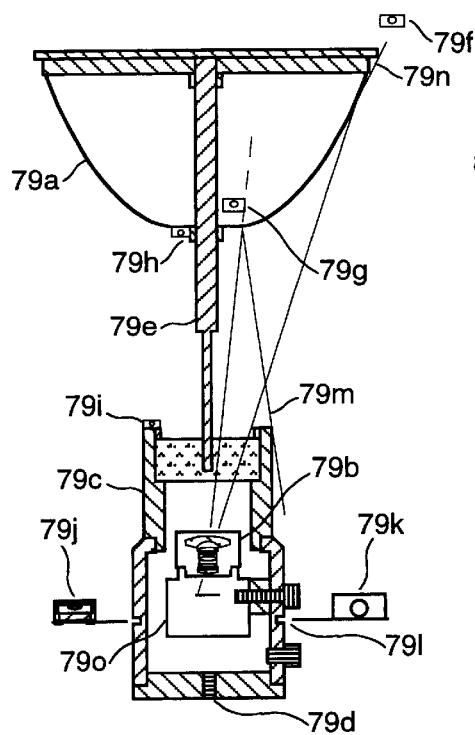
FIG. 79 is a side cross section view of a torroidal wide angle reflector which is supported by an axial strut, also showing an electronic imaging camera and locations for tilt and other indicators.

FIG. 79 is a side cross section view of a radially enlarged torroidal wide angle reflector which is supported by an axial strut, also showing an electronic imaging camera in a housing and various locations where a tilt indicator or other object may be imaged with the subject matter.

Figure 80:
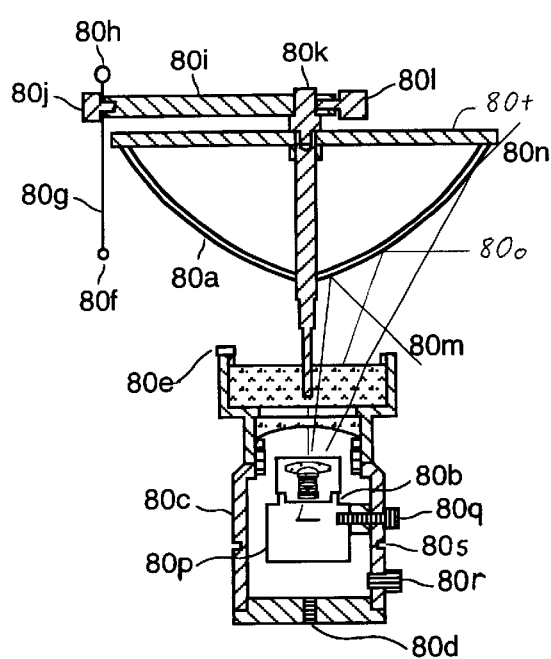
FIG. 80 is a side cross section view of a convex radially compressed wide angle reflector, also showing a weather resistant camera housing and an adjustable occulting object.

FIG. 80 is a side cross section view of a convex radially compressed wide angle reflector which is supported by an axial strut, also showing an electronic imaging camera in a housing, further showing an adjustable occulting object and tilt indicator.

Figure 81:
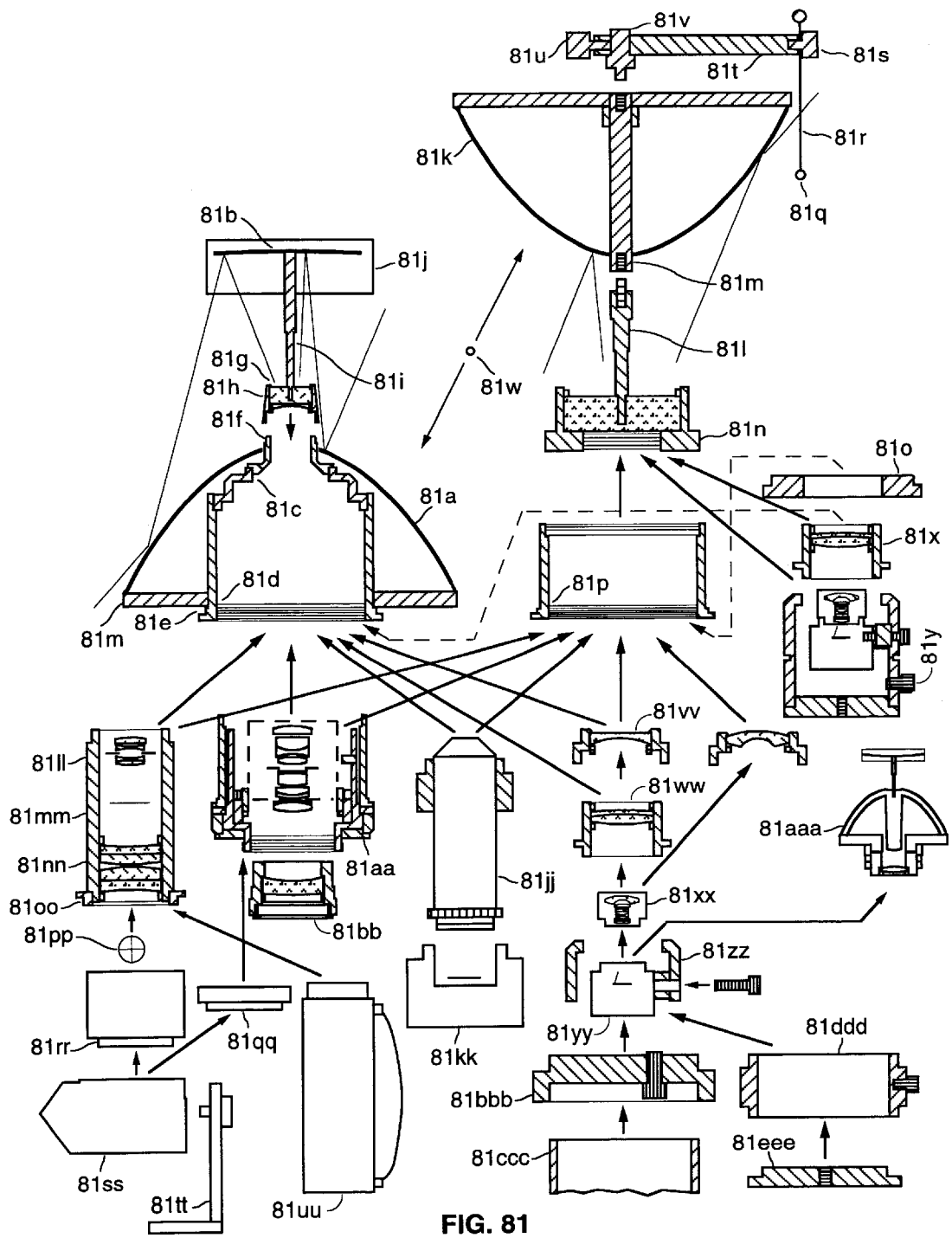
FIG. 81 is an exploded view showing a modular reflector system consisting of a convex wide angle reflector, a Cassegrain wide angle reflector, and a variety of interchangeable lens cells, occulting objects, and cameras which may be used therewith.

FIG. 81 is an exploded view showing a convex wide angle reflector, a Cassegrain wide angle reflector having a removable axial strut, a non-Cassegrain wide angle reflector, a small wide angle reflector, and a variety of interchangeable occulting objects, tilt indicators, lens cells, adapters, and cameras which may be used with it. The lens cells provide means for adaptation of the reflector assembly to cameras of various film or sensor format sizes. The fixed and interchangeable imaging lens systems provide means for adaptation to interchangeable lens cameras. A focal and relay lens systems provide means for adaptation to either fixed lens or interchangeable lens cameras.

FIG. 82 is a top view of a reflector which may be used with a separate camera to provide wide angle images which cover nearly 360 degrees, also showing an adjustable stand to support and position the reflector.

FIG. 83 is a top view of a wide angle reflector, also showing an adjustable clamp for attaching the reflector to the edge of a door or similar article.

FIG. 84 is a side elevational view of the apparatus of FIG. 82, showing a break in the tall vertical member for purposes of fitting the view onto the drawing sheet. The right side of the figure is a side elevational view of a camera and telephoto lens such as that which may be used with or without a close up and correcting lens to photographically or electronically image a reflector such as that shown in the figure.

FIGS. 85 through 100 show immersive projection embodiments of the invention.

The invention is further applicable to means to sense motion, or to record 62*l*, 62*m*, 141*k*, 141*m*, 141*n*, transmit 141*l*, 143*i*, or distribute 99*a*, 99*s*, 142*l*, 142*p*, 143*c*, 144*a*, 144*n* actual or artificially generated environmental phenomena which include images 99*m*, 142*q*, 142*s*, 142*u*, 143*j*, 144*b* and sound 99*s*, 142*cc*, 144*n* or sound data.

When used in the local projected presentation of various subject matter, a basic embodiment of the invention comprises the optical system 91*a*, 144*e*, 144*f*, support means 91*c*, 91*d*, and association with or incorporation into a projector 91*b*, 98*c*, 144*b*, and a surrounding projection surface 91*g*, 98*l*, 144*h*. Such a system facilitates the geometric conversion of an annular image into a cylindrical 121*a*, 144*h*, spherical 85*h*, 91*g*, semi spherical, conical, or hybrid 97*j*, 98*l*, 99*j* projection around said optical system, whereby the convex reflector surface 85*a*, 91*a*, 97*a*, 98*a*, 99*a* of the invention has a strong aspheric FIG. 24*a*, 25*a* which facilitates correct image proportions and substantially constant projection brightness throughout the projection area, said cylindrical projection being applicable to display 144*h* and printing 121*a* of an image.

A different embodiment is one in which the optical system is associated with a projector and a spherical or semi spherical projection surface to facilitate the geometric conversion of an annular image into a projection onto a three dimensional projection surface (which may include a spherical surface) or into three dimensional media around said optical system, whereby said convex reflector surface 85*a*, 86*a*, 87*f* is at the center of said spherical projection surface, said reflector surface having an aspheric figure which facilitates correct image proportions and constant projection brightness throughout the projection area 85*h*, 86*h*, 87*e*.

The optical system of the present invention 99*a*, 99*b*, 141*b*, 144*e*, 144*f* or another wide angle optical system 93*a*, 99*c* may be associated with a projector 91*a*, 99*d*, 99*e*, 99*f*, 144*b* and a three dimensional projection surface 91*g*, 99*j*, 99*k*, 99*l*, 144*h* or three dimensional media which surrounds up to the entire area around said optical system. This facilitates the geometric conversion of an annular image 144*b* into a three dimensional projection 144*h* which surrounds the optical system. The projection surface or surfaces may be a spherical, semi spherical, quasi spherical, conical, cylindrical, or hybrid. The optical system 91*a*, 92*a*, 97*a*, may be disposed at a point other than the center of the projection area 91*g*, 92*i*, 97*h* in order to provide more space for participants 91*j*, 92*l*, 97*m*. In a preferred embodiment, this location is facilitated by means of an optical system having a reflector surface with a strong aspheric FIG. 24a which facilitates correct image proportions and constant projection brightness throughout the projection area 91g, 92i, 97h in spite of the varying distances to said projection area.

The invention further comprises means to reproduce, simulate, or generate real or fictional environmental effects including sound 92v, 97p, 99s, 1421cc, 144n, wind 92t, 99t, 144p, and odor 99u, said apparatus facilitating the geometric conversion of an annular image 57h, 121c, 144b into a three dimensional projection 92i, 97h, 99j, 121a, 144h around the optical system thereof, said invention being applicable to association with or incorporation into articles including virtual reality headsets 143p, games (FIGS. 98, 99, 143), rides (FIGS. 85, 92), simulators (FIGS. 97, 143), vehicles or robotic devices 143r, 143v, command and control systems 143e, 143g, 143n, 143o, booths, suites (FIGS. 98, 99), home entertainment systems (FIGS. 91, 94, 142), conference rooms, and theaters (FIGS. 86–88, 95–96, 144).

A plurality of the optical system of the present invention 89a, 89b, 92a, 92e, 99a, 99b or a combination of wide angle optical systems 88a, 99c which may include said optical system 89a, 89b, 92a, 92e, 99a, 99b may be utilized to project images into multiple rooms, including multiple portal virtual reality suites (FIGS. 98, 99) and theaters, said invention providing for the active masking 98e of projection onto doorways 98o. Masking may be accomplished by the manipulation of projection image data 142q, 144b or with actual masks 98e which are appropriately positioned in order to obstruct optical communication between an open doorway 98o and the projection source 99d, said masking means having provision to be synchronized with the opening and closing of doors 98r and portals 98t between different rooms; further, a fixed mask may be used where a doorway is always open, said fixed mask being either a separate part or a coating which is applied to an optical surface 98a of the invention.

Figure 92:
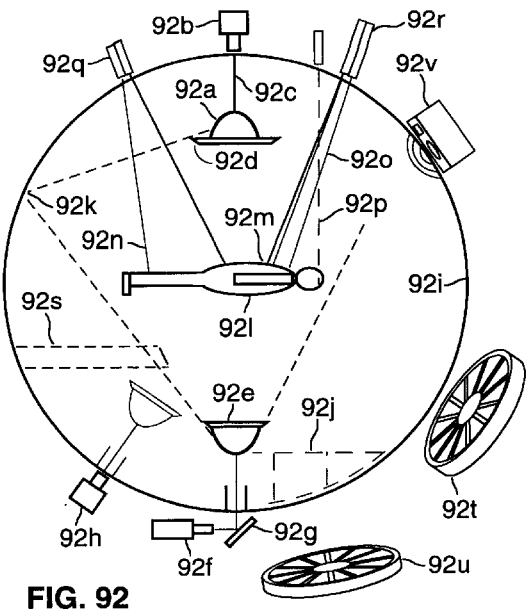
FIG. 92 is a simplified side cross sectional view of an immersive projection system which utilizes one or more reflectors, also showing means for suspending a participant.

Two or more optical systems of the invention 92a, 92e, 92h, 93b, 99a, masked refracting optical systems 93a, 99c, other optical systems 97f, 98x or a combination thereof 98x, 99a, 99b, 99c may be associated with projectors 98x, 99d, 99e, 99f and cylindrical, spherical, or other three dimensional projection surfaces 92i, 98n, 99j, 99k, 99l. FIG. 92 shows optical systems 92a, 92e, 92h, said optical systems having masks 92d. Two of these optical systems (92a and 92e or 92h) are utilized and disposed off center and at or near opposing ends of the projection area 92i, said arrangement facilitating the geometric conversion of two annular images (or different parts of identical annular images) into a projection which covers the entire inside of said projection area 92i without obstructing the center of said projection area or requiring projector light to pass through the center of said projection area, thereby permitting members of an audience 92l to be positioned at or near the center of said projection area, said optical system also having provision for rear projection 100j onto an area 91f, 92e, 100k surrounding the back surface of its perimeter 100e.

The invention may further comprise means to suspend 92n, 92o, 92p one or more members of an audience 92l at and near the center of a projection area 92i, said suspension means having provision 92q, 92r for lowering and raising an audience member to and from the floor 92j or a raised platform or ledge 92s, the surface of said projection area 92i under an audience member 92l being comprised of inexpensive modular sections 92j which can be replaced if soiled by a participant's feet or the results of motion sickness.

The invention may be embodied in any size laparascopic medical or observation instrument, endoscope, sigmoidoscope, bore scope, camera, projector, home entertainment system, conference infrastructure, surveillance instrument, flight control system, robotic device, sensor, microphone, speaker, or similar article, and, where appropriate, said article or apparatus incorporating means to provide illumination 62d, 62g, 141q, 142c and imaging of the subject and to record 141k and transmit 141l, 143i or otherwise distribute information including the images and recoreded 62l, 141m, 141n, and artificially generated sound 92v, 99s, 144n. Where electronic imaging means 34d, 58h, 80b, 81kk, 81uu, 81xx, 141k, 142g, 142q are provided, the invention may incorporate or provide means to interface with systems 142l, 143f that facilitate substantial real time or delayed digital or other processing of the images produced therewith.

Figure 85:
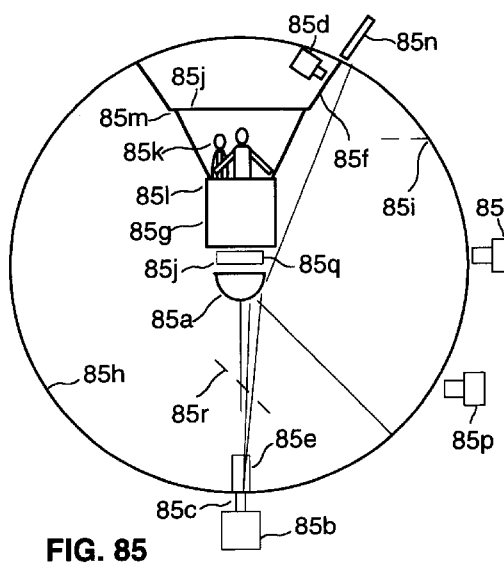
FIG. 85 is a simplified side cross sectional view of an immersive projection system which may be used in the simulation of balloon rides, cruises at sea, and other events or occurrences.

FIG. 85 is a simplified side cross sectional view of an immersive projection system which uses a convex reflector, also showing fixtures which may be used in the simulation of balloon rides, cruises at sea, and other events or occurrences. The relative sizes of optics and fixtures are scaled or exaggerated for clarity.

Figure 86:
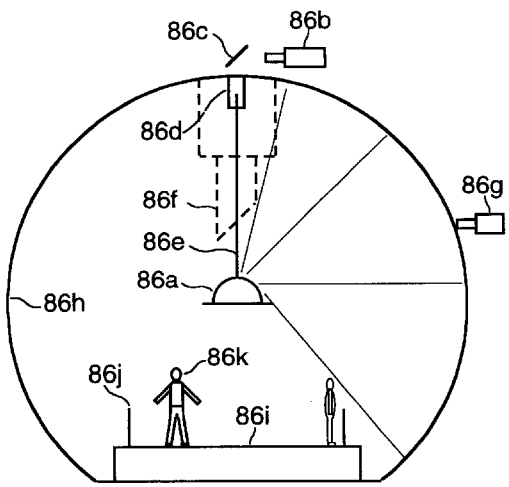
FIG. 86 is a simplified side cross sectional view of an immersive projection system which uses a convex reflector, also showing a participant platform at the bottom.

FIG. 86 is a simplified side cross sectional view of an immersive projection system which uses a convex reflector, also showing a participant platform at the bottom, an alternate or secondary projector position at the right, and a supplemental projector housing and reflector in dashed lines.

Figure 87:
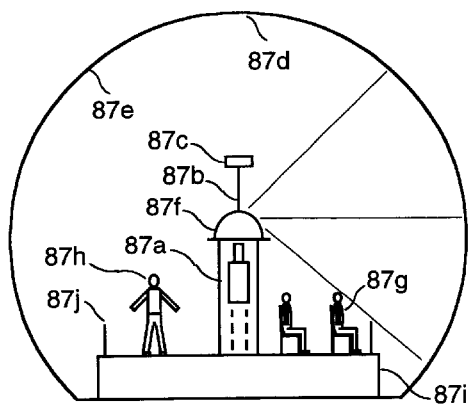
FIG. 87 is a simplified side cross sectional view of an immersive projection system which utilizes a Cassegrain reflector.

FIG. 87 is a simplified side cross sectional view of an immersive projection system which utilizes a Cassegrain reflector.

Figure 88:
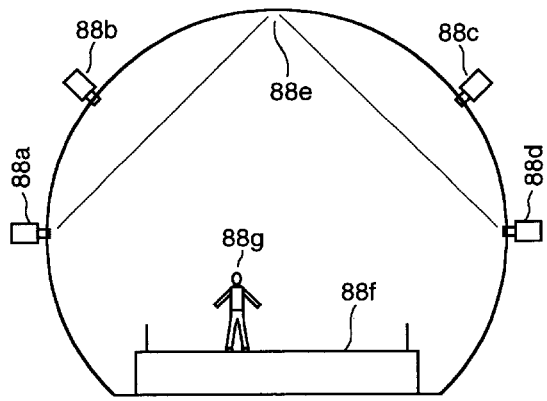
FIG. 88 is a simplified side cross sectional view of an immersive projection system having multiple projectors.

FIG. 88 is a simplified side cross sectional view of an immersive projection system having multiple projectors, also showing alternate or supplemental projector and solar simulator positions near the top of the projection area.

Figure 89:
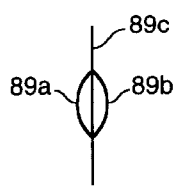
FIG. 89 is a simplified side view of opposing reflectors and a central baffle plate.

FIG. 89 is a simplified side view of opposing reflectors and a central baffle plate which may be suspended in a projection area such as that in FIG. 88 to provide projection coverage of the entire inside surface of the room from two projectors.

Figure 90:
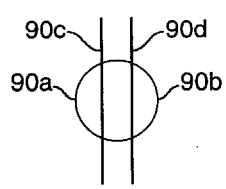
FIG. 90 is a simplified side view of a spherical reflector and two baffle plates.

FIG. 90 is a simplified side view of a spherical reflector and two baffle plates which may be suspended in a projection area such as that in FIG. 84 to provide projection coverage of the entire inside surface of the room from two projectors.

Figure 91:
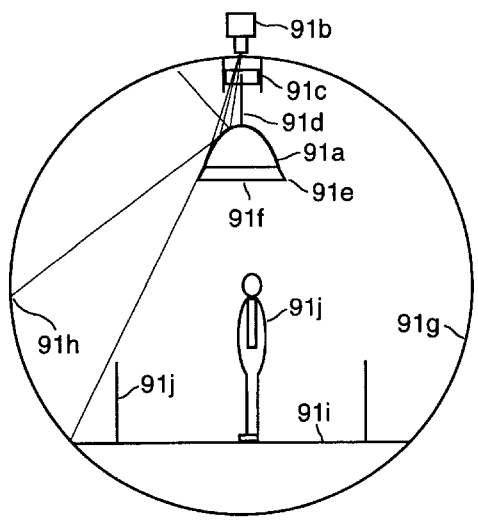
FIG. 91 is a simplified side cross sectional view of an immersive projection system which utilizes a reflector and a single projector.

FIG. 91 is a simplified side cross sectional view of a small immersive projection system which utilizes a reflector and a single projector. The concept is applicable to projection surfaces of various sizes.

FIG. 92 is a simplified side cross sectional view of an immersive projection system which utilizes one or more reflectors, also showing means for suspending a participant at or near the center of the projection area and a retractable ledge on which the participant or participants may begin and end the immersive experience. The projection surface under the participant may be changed in the event that it is soiled by a participant's feet or by motion sickness. Also shown are sound and wind generation means. When more than one projector is used, each projector may be positioned opposite from the other if a rotationally symmetrical baffle is used, or at other locations if an asymmetrical baffle is used.

Figure 93:
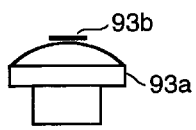
FIG. 93 is a simplified side view of a fisheye lens which may have a central mask.

FIG. 93 is a simplified side view of a fisheye lens 93a having central mask 93b and which may be used in place of one or more of the reflectors in the projection apparatus of FIGS. 91–92 and 94–99.

Figure 94:
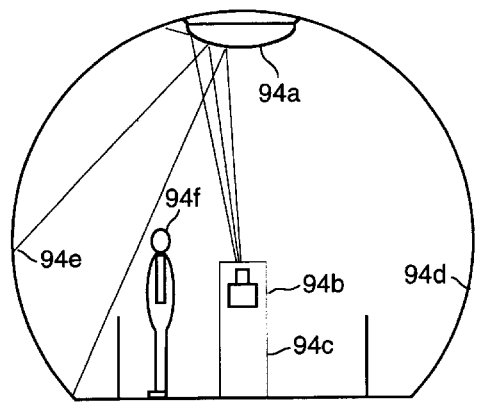
FIG. 94 is a simplified side cross sectional view of an immersive projection system which utilizes an oblate aspheric reflector.

FIG. 94 is a simplified side cross sectional view of an immersive projection system which utilizes a ceiling mounted oblate aspheric reflector.

Figure 95:
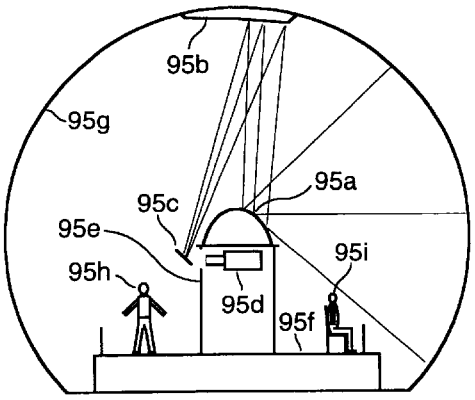
FIG. 95 is a simplified side cross sectional view of an immersive projection system which utilizes reflectors above the floor and on or near the ceiling.

FIG. 95 is a simplified side cross sectional view of an immersive projection system which utilizes reflectors above the floor and on or near the ceiling.

Figure 96:
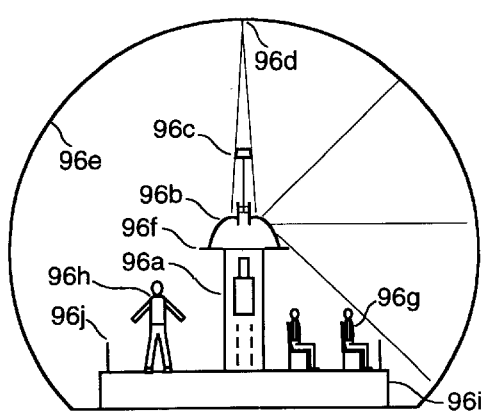
FIG. 96 is a simplified side cross sectional view of an immersive projection system which utilizes a Cassegrain reflector having a torroidal primary reflector and a small central baffle.

FIG. 96 is a simplified side cross sectional view of an immersive projection system which utilizes a Cassegrain reflector having a torroidal primary reflector and a small convex secondary reflector in order to provide unobstructed overhead coverage. Adjusting the diameter or longitudinal position of the secondary reflector baffle provides proper merging for central parts of the image.

Figure 97:
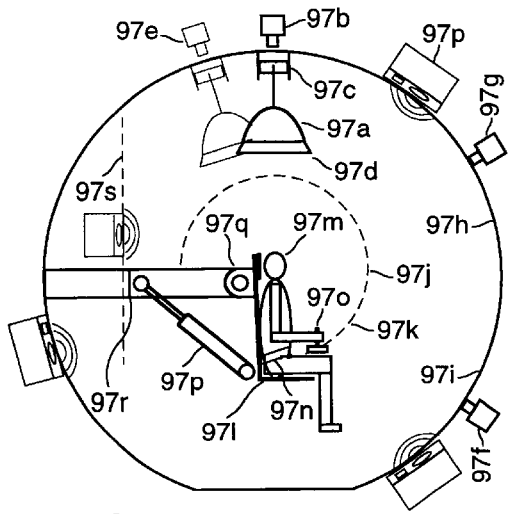
FIG. 97 is a simplified side cross sectional view of an immersive projection system which utilizes a reflector, also showing a seat having actuators to physically move a participant.

FIG. 97 is a simplified side cross sectional view of an immersive projection system which utilizes a reflector, also showing a seat having actuators to physically move a participant in applications including flight or driving simulation, command and control, etc. Concept also applicable to systems in which a group of participants or an entire room or suite is moved by actuators.

Figure 98:
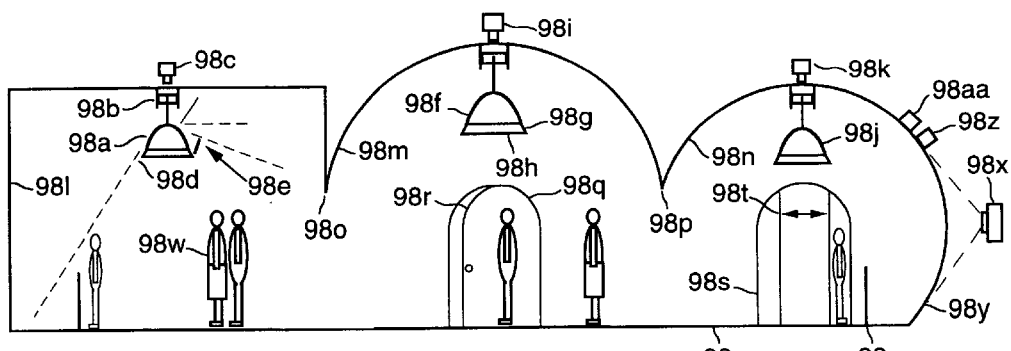
FIG. 98 is a simplified cross section view of a row of rooms from a matrix which comprises a virtual reality projection suite, also showing participants, portals, and optics, and projection surfaces.

FIG. 98 is a cross section interior view of a virtual reality projection embodiment of the invention, showing one row of rooms 98$l$, 98$m$, 98$n$ from a matrix which comprises a multiple portal virtual reality projection suite, also showing participants 98$q$, 98$s$, portals 98$o$, 98$p$, 98$q$, 98$s$ square, hybrid, or cylindrical rooms 98$l$, 98$m$, 98$n$, and simplified views of reflective elements 98$a$, 98$f$, 98$j$ of projection 98$c$, 98$i$, 98$k$ optics. The doors 98$r$, 98$t$ in a row or matrix may be opened or closed, and the image projection apparatus may provide means for the active masking 98$e$ of projection into open doorways 98$o$. Also shown are means for interactive motion sensing and imaging 98$z$ of participants 98$w$ or related subject matter.

Figure 99:
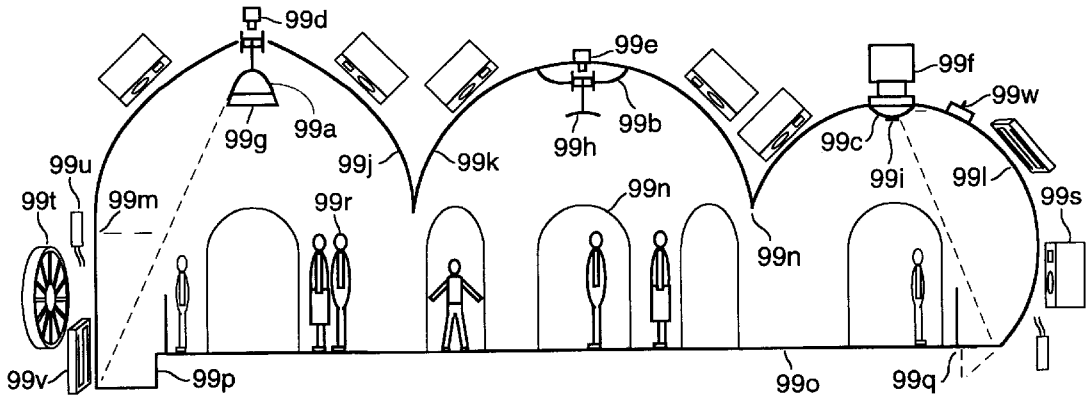
FIG. 99 is a simplified cross section view of a row of rooms from a matrix which comprises a virtual reality projection suite, also showing participants, portals, optics, and projection surfaces.

FIG. 99 is a cross section view of one row of rooms 99$j$, 99$k$, 99$l$ from a matrix which comprises a multiple portal virtual reality projection suite, also showing participants 99$r$, doorway portals 99$n$, and simplified views of projection optics. Also shown are means for sound 99$s$, and wind 99$t$ generation, said wind generation means also being applicable to the distribution of odors 99$u$ and temperature 99$v$.

Figure 100:
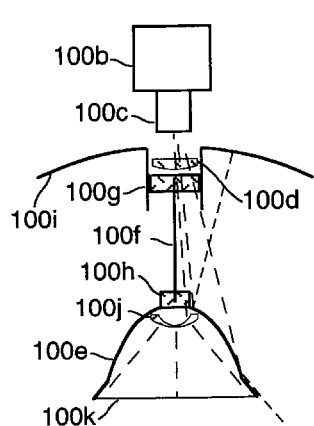
FIG. 100 is a simplified cross-sectional view of a wide angle reflector and related optics which are associated with a projector, also showing means for localized rear projection.

FIG. 100 is a simplified cross-sectional view of a wide angle reflector and related optics which are associated with a projector, also showing means for localized rear projection to cover the area obstructed by the wide angle reflector and its baffle.

Figure 101:
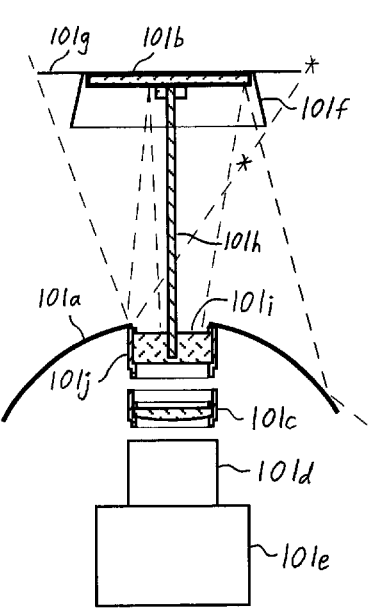
FIG. 101 is a simplified cross-sectional view of a Cassegrain wide angle reflector and related baffles which are associated with a camera, projector, or similar article.

FIG. 101 is a simplified cross-sectional view of a Cassegrain wide angle reflector and related baffles which are associated with a camera, projector, or similar article, also showing a close up lens which may have correction means.

Figure 102:
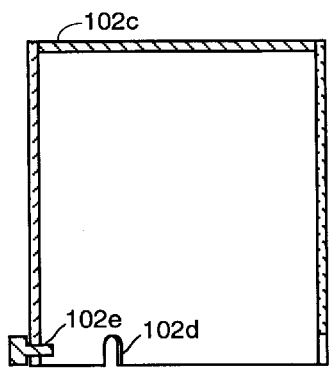
FIG. 102 is a side pictorial view of a wide angle reflector, also showing a cylindrical cover which may be transparent.
Figure 102:
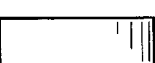
Figure 102:
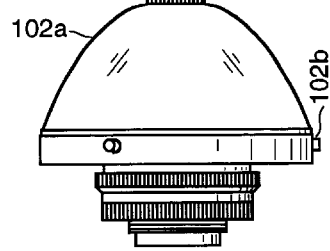

FIG. 102 is a side pictorial view of a wide angle reflector, also showing a cylindrical cover which may be transparent. Said cover may provide support means for the overall optical system, a secondary reflector, occulting object, tilt indicator, camera, or other article.

FIG. 103 is an oblique pictorial view of a wide angle reflector, also showing a case. The rear cell of the optical system of the intention has a slot which fits a fixture in the case and secures the optical system without contacting any optical surfaces. This means of securing the optical system also minimizes stress on a structure such as an axial or side strut.

The invention may further comprise axial expansion optics 104$e$, 104$f$ in front of or behind its reflector surface, said expansion optics expanding the coverage of a lasers 104$g$ or other light sources to cover the entirety of its wide angle reflector surface, thereby providing omnidirectional expansion of said light source for applications including holographic imaging and projection. Embodiments of the invention having at least one radially compressed optical surface 29$a$, 30$b$, 80$a$, 104$c$ typically provide the most efficiency in this type of application.

Figure 104:
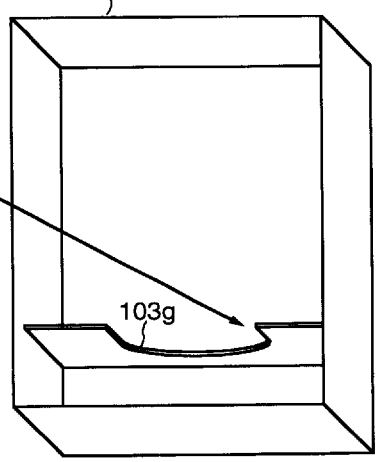
FIG. 104 is a simplified cross-sectional view of a wide angle reflector having a radially compressed secondary reflector, also showing a laser and beam expansion optics.
Figure 104:
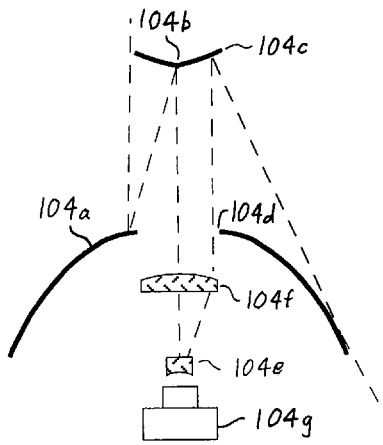

FIG. 104 is a simplified cross-sectional view of a wide angle reflector having a radially compressed secondary reflector, also showing a laser and beam expansion optics, said optical system being applicable to the distribution of laser or other light for imaging, switching, communication, and other applications.

FIGS. 105–144 illustrate the conversion of panoramic images to or from annular or rectangular formats and show related instrumentation, methods, and image characteristics. FIGS. 105–120 illustrate easels and instrumentation for the incremental or linear conversion of panoramic images to or from rectangular or circular formats. FIG. 121 illustrates the use of a wide angle reflector to project an annular image onto the inside of a cylindrical surface. FIGS. 122–126 illustrate the correction of distortion when converting of panoramic images to or from annular or rectangular formats. FIGS. 127–130 illustrate the conversion of panoramic images or segments thereof to or from annular or rectangular formats. FIGS. 131–140 illustrate image processing equivalent to projecting images from or onto three dimensional surfaces. FIGS. 141–144 illustrate the capture, processing, distribution, and viewing of images captured with the present invention or other optical systems.

Manipulation of a real or simulated annular image is necessary for some applications. Annular images such as those produced with the present optical invention may be viewed directly; however, said images may seem distorted to most observers. Therefore, it is typically desirable to transform some or all of the annular image to a more conventional rectangular format. The applicant first reduced this type of image transformation to practice in a photographic darkroom. The principles of the darkroom process and the principles relating to original imaging or projection with a wide angle optical system are applicable to the manipulation of computer readable images or other electronic images and to their use or display.

The applicant's photographic process utilizes a tilted easel apparatus 105$a$ which receives unexposed photographic paper or film, said tilted easel having tilt adjustment means 105$e$, 114$h$ and a focal surface 105$b$ that is curved 106$c$ according to a concave conical surface, said conical surface having a smaller radius of curvature 106$d$ at the end 105$d$ closest to an enlarging lens 105$f$, said easel apparatus providing active linear dodging 105$j$ and color filtration means 105$k$ to compensate for reciprocity failure in the photographic paper or film caused by the variable exposure time 105$l$ which is required due to the pronounced tilt 105$b$ of said easel 105$a$. The active dodging 105$j$ and filtration 105$k$ are not required where a predominantly linear gradient neutral density filter 117$d$ is used.

Combined with an enlarger 105$i$ having a wide angle lens 105$f$ and a tiltable lens standard 105$g$, the easel 105$a$ facilitates incremental conversion (redistribution) 106$e$ of a rectangular image which may include a 360 degree panorama (FIG. 110) or one or more subsets thereof 105$h$ to an annular format 111$a$ or one or more segments thereof, as well as providing for the incremental conversion of an annular image 111$a$, 114$c$, 114$f$ or one or more segments thereof 111$b$, 114$d$ into a rectangular image (FIG. 110) or one or more subsets thereof 116$a$, and the extraction and conversion of subsets thereof; said images being static or part of a motion picture sequence which may be utilized or viewed through means of a print, camera, computer, television, theater, command and control system, robotic system, or other article.

Projection onto the correctly shaped and tilted concave conical surface easel 105a converts each rectangular image segment or frame 108a into a shape resembling a truncated pie slice 109a and curves the horizon 109b and other image elements of to the degree appropriate for the conical or flat annular image 111a which results from assembling the individual prints of incrementally transformed images. if the top end 108c of the original rectangular image is projected toward the top of the easel, the sky 109c will be toward the central part of the resulting annular image.

The entire process is also compatible with conversion of an annular image 111a, 114c, 114f into a rectangular one (FIG. 110) by implementing the process in reverse (the enlarger being a camera) 114f or by projecting the part of the annular image which is toward the center 114e onto the bottom end 114a of the tilted concave easel.

These processes and techniques are applicable to geometric conversion of an image by exposing paper or film 118a, 120a on a moving flat 118b or curved 120b easel through a slit 118c, 120c which is in optical communication with a lens 118g, 120g and a moving carrier 118e, 120e for the original image 118d, 120d.

These processes and techniques are also applicable to other modes of image manipulation, including the use of an electronic image sensor at the focal surface or by digital image processing. Digital image processing offers more degrees of freedom and greater extremes of image manipulation than a single stage of the described darkroom based technique can provide, and need not be relegated strictly to an incremental or linear conversion process.

Digital or other electronic image manipulation based solely or in part on the applicant's prior darkroom techniques provide means for the geometric conversion of an annular or circular image (FIGS. 122, 127) such as that produced by the optical system of the present invention into a distorted or undistorted rectangular format (FIG. 128) and vice versa, said manipulation means also providing for the extraction of distorted 112a, 115a or undistorted 116a parts of the image. As in the described photographic process, conversion of the image is based on progressive circumferential expansion of the annular image data (FIG. 127) from the outer circumference 127a toward the center 127b, expanding the inward part of the image 127b until its circumference matches that of the outer circumference 127a, thereby resulting in a rectangular image (FIG. 128), or, more precisely, the equivalent of a three dimensional cylindrical image or a cut 121b and flattened 111a cylindrical 121a image. This expansion of the image can be accomplished by adding pixels which repeat or interpolate the data of those immediately surrounding them. The expansion can be accompanied or replaced by progressive circumferential compression of the outer zones of the image.

Assuming that the original annular image (FIG. 127) is recorded with the primary wide angle reflector 57d, 121d facing directly upward, the great circle of the horizon 57b will be imaged as a circle 127e at a given radial zone of said annular image. Using the described image conversion process, an annular image such as that in FIG. 127 may be converted in whole or in part to a flat rectangular format (FIG. 128) or other desired forms (FIG. 130) which may include a cylindrical 121a or spherical 85a, 91a, 133b, or hybrid (FIGS. 98, 136, 138) image.

Where the resulting rectangular image (FIG. 128) is oriented with its long dimension extending horizontally, the horizontal image scale is constant and the field of view can [even] exceed 360 degrees when the image is made long enough to facilitate redundant horizontal coverage. Where the original annular image has a constant radial image scale (FIGS. 3, 8, 127), the resulting rectangular image (FIGS. 110, 126, 128, 130) may have a constant vertical image scale, though the vertical image linearity can be manipulated by processes analogous to tilting the easel 105e, 114h, translating the easel, warping the easel 105a, 120a, and utilizing an enlarging or imaging lens 105f, 118g, 120g, 121e having projection characteristics other than rectilinear.

Proportions of the subject matter in or near the vertical center of the resulting rectangular image 128a are determined by the selected radial zone of unity expansion 127f in the annular image. Where it is desirable for the horizontal image scale to match the vertical image scale, the selected zone of unity expansion may include the radial zone of the annular image having a diameter equal to the relative length of the transformed horizontal image divided by pi. Selecting a zone of unity expansion farther from the center will typically retain more resolution, but it may be necessary to effectively scale the resulting transformed image in one axis to restore normal proportions.

Digital image processing based on this principle is also capable of converting a contiguous circular image (FIG. 3) having true omnidirectional coverage (as opposed to an annular one) into a rectangular format, since this is simply a matter of enlarging the inner zones of the image to a progressively greater degree, with the central pixel data being repeated across the entire top pixel row 128b of the resulting rectangular image.

Where a tilt indicator which is imaged near the outer limit of an annular or circular image 127c, it will appear above or below the body of a transformed rectangular format image 128c. Where a circular tilt indicator such as a bubble or ball level is imaged at the center of an annular image 127d, it will appear to be a series of lines 128d above or below the body of a transformed rectanglar format image. If the optical system is level, the lines will be parallel and extend all the way across the image. If the optical system is significantly out of level, its ball or bubble will be imaged as an elongated oval.

In cases where an image is redistributed according to pixel mapping, the process is very straight forward for digital processing if the original image pixels are of a polar pixel format; however, since such pixel arrays are not usually used, pixel remapping must compensate for the relative pixel distribution in the image. Particularly, pixels along a diagonal from the center of the annular image will each occupy a larger radial distance than those directly above or below the center. This increase is equal to the reciprocal of the cosine of the angle of divergence from the pixel rows or columns.

Further appropriate modification of the rectangular image (FIGS. 128, 130) is accomplished by implementing techniques analogous to projecting an original cylindrical 132a or spherical 134a image surface onto a flat surface 132b, 134b with a single point light source 134c or a linear array of point light sources 132c.

The cylindrical to planar conversion (FIG. 132) results in a rectangular image or image segment (FIG. 137) having increasing image scale above and below a specified horizontal central line 137b (typically the horizon), said expansion being equal to the square of the reciprocal of the cosine of the angle above and below the effective center of the image 137a, resulting in an image having the same geometrical characteristics as an image produced by a rotating panoramic camera having a rectilinear lens.

The spherical to planar conversion (FIG. 134) results in a rectangular image or image segment (FIG. 138) having increasing image scale in all directions from a specified center point 138a, said expansion being equal to the square of the reciprocal of the cosine of the angle from said specified center point 138a, resulting in an image of limited coverage having the same characteristics as an image produced by a rectilinear lens or a pinhole camera having a flat focal plane.

Photographic, digital, or other image processing according to any subset or combination of the above image conversion processes and techniques can be used to influence the image in whole or in part. Additionally, software applications effectively facilitate the simultaneous implementation of these processes. In the case of intensive image manipulation such as may be required for full motion digital display, active pixel reassignment may be implemented.

FIG. 105 is a side cross sectional view of a curved easel which is used to incrementally convert a panoramic image to or from a rectangular or circular format, also showing a film carrier, enlarging lens, means for tilting, and means for active dodging and filtration of the projected image.

FIG. 106 is a side view of the easel of FIG. 105, taken from the right side thereof.

FIG. 107 is a top plan view of the easel of FIG. 105.

FIG. 108 is a rendering of a rectangular format image which may make up a segment of a panorama.

FIG. 109 is a rendering of the angular distribution of the subject matter of FIG. 108 after it has been re-imaged through the use of the easel shown in FIG. 105.

Figure 110:
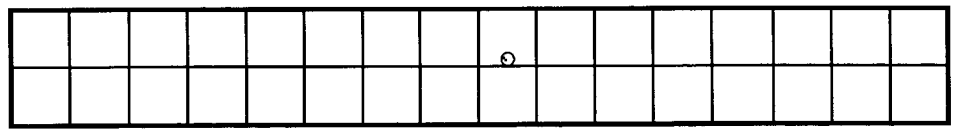
FIG. 110 is a rendering of the angular distribution in a 360 degree panoramic image which may be made up of separate images.

FIG. 110 is a rendering of the angular distribution in a 360 degree panoramic image which may be made up of separate images.

Figure 111:
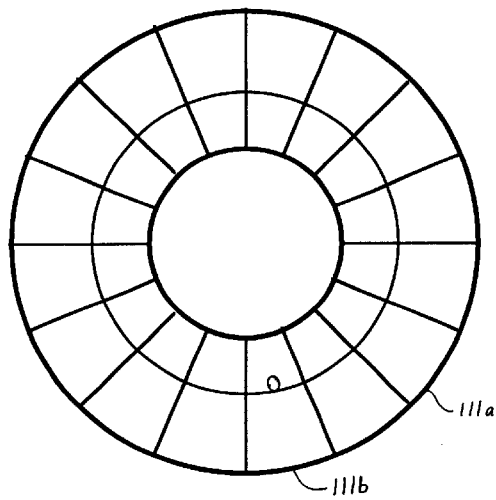
FIG. 111 is a rendering of the angular distribution of the subject matter of FIG. 110 after it has been incrementally re-imaged through the use of the easel shown in FIG. 105.

FIG. 111 is a rendering of the angular distribution of the subject matter of FIG. 110 after it has been incrementally re-imaged through the use of the easel shown in FIG. 105.

Figure 112:
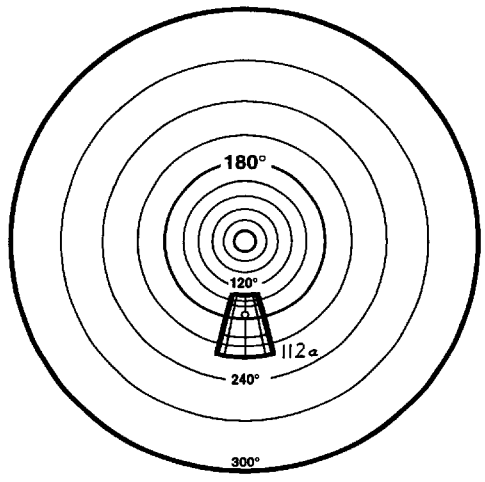
FIG. 112 is a rendering of the angular distribution of a circular image captured with a prolate aspheric reflector having a figure such as that in FIG. 24; or that is captured by other means and incrementally re-imaged; said image having minimal local distortion.

FIG. 112 is a rendering of the angular distribution of a circular image captured with a prolate aspheric reflector having a figure such as that in FIG. 24, or that is captured by other means and incrementally or globally re-imaged, said image having minimal local distortion.

Figure 113:
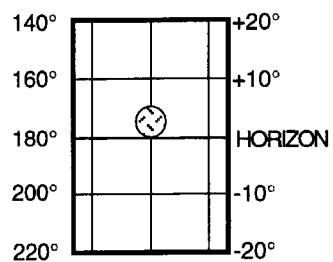
FIG. 113 is a rendering of the angular distribution of the subject matter of a part of FIG. 112 which has been re-imaged through the use of the easel shown in FIG. 105.

FIG. 113 is a rendering of the angular distribution of the subject matter of outlined area 112a which has been re-imaged through the use of the easel of FIG. 105.

Figure 114:
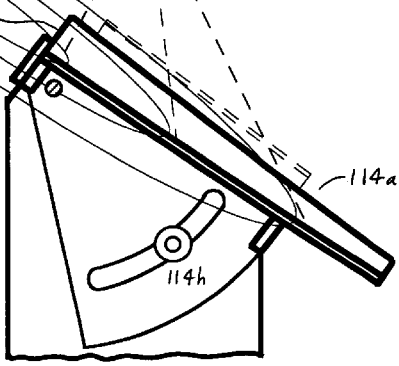
FIG. 114 is a rendering of an easel having a curved focal surface, said easel being used in the transformation of an annular image to a rectangular image; where a segment of the annular image is positioned on the easel and a camera is used in place of the enlarger; or, where the image segment is positioned in the enlarger and projected onto the easel with its center toward the bottom of the easel.

FIG. 114 is a simplified side cross sectional view of an easel having a curved focal surface and integral tilt adjustment means, said easel being used in the transformation of an annular image to a rectangular image; where a segment of the annular image is positioned on the easel and a camera is used in place of the enlarger; or, where the image segment is positioned in the enlarger and projected onto the easel with its center toward the bottom of the easel.

Figure 115:
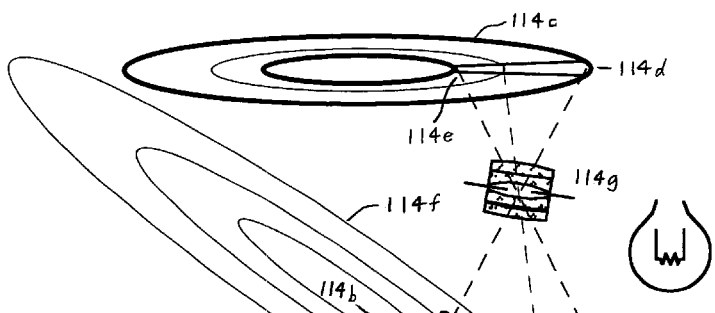
FIG. 115 is a rendering of the angular distribution in a segment of an annular image captured with a prolate aspheric reflector.
Figure 115:
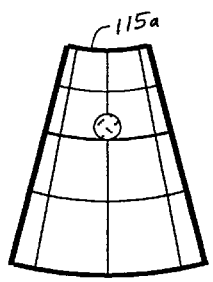

FIG. 115 is a rendering of the angular distribution in a segment of an annular image captured with a prolate aspheric reflector.

Figure 116:
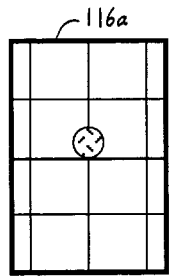
FIG. 116 is a rendering of the angular distribution of the subject matter of FIG. 115 which has been re-imaged through the use of the easel shown in FIG. 105 or 114.

FIG. 116 is a rendering of the angular distribution of the subject matter of FIG. 115 which has been re-imaged through the use of an easel such as that shown in FIGS. 105 or 114.

FIG. 104 is a rendering of the angular distribution in a rectangular print made with the easel shown in FIG. 97, where the annular image segment is positioned on the easel and a camera is used in place of the enlarger.

FIG. 117 is a simplified side cross sectional view of an easel having a focal surface like or similar to that in FIGS. 105 or 114, also showing neutral density gradient filtration means which compensate for the varying distances and projection angles of the easel surface.

FIG. 118 is a pictorial view of an apparatus based on the easel of FIGS. 105, 114 or 117, also showing neutral density gradient filtration, a slit, and means to rotate the annular image and translate photographic media, said means providing for rotation of the annular image, its projection through a slit onto the focal surface of the easel, and the synchronized translation of photographic media in a direction that matches the motion of the projected segment of the rotating annular image; whereby the rotating annular image is projected through a slit and onto the moving focal surface, thereby being translated from an annular to a rectangular format image. Where the original image and illumination means are located behind the slit, the apparatus provides means to transform a rectangular image into a circular or annular one. Variations of the focal surface of the easel may be curved in two axes or the slit and the focal surface behind said slit may be replaced with a predominantly linear electronic image sensor.

FIG. 119 is a rendering of the angular distribution of a circular image captured with a spherical reflector.

FIG. 120 is a pictorial view of an easel having a curved focal surface, a slit 120c, and means to rotate 120e an annular image 120d, translate 120g original or transformed (from annular, etc. images) rectangular images 120f and translate 120b photographic media 120a, said easel providing for control and correction of distortion in the subject matter of FIGS. 1–20, 112, 113, 116, or 119 or its transformation to a rectangular format. The shown geometry and orientation corrects radial compression in an annular images such as those of FIGS. 1 or 2.

FIG. 121 illustrates the concept of utilizing a wide angle reflector 121d and imaging optics 121e to re-image an annular image 121c onto the inside of a cylindrical surface 121a to provide a rectangular image or to re-image a rectangular image 121a as an annular image 121c. The vertical dashed line 121b toward the right represents one of many places a cylindrical image may be cut in order to facilitate its display on a flat surface.

FIG. 122 is a rendering of an annular image such as that produced by an optical system which may include that shown in FIG. 51, but in which said optical system was not used in an accurately vertical orientation. References which may be used to minimize distortion when the image is optically or electronically transformed to a different distribution include those shown in broken lines.

Figure 123:
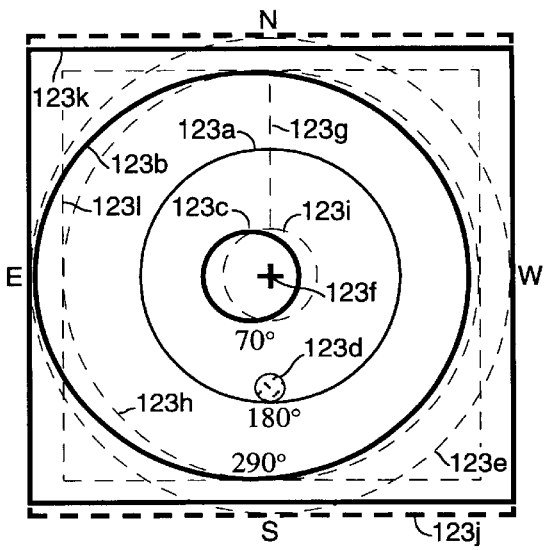

FIG. 123 is a rendering of the subject matter of FIG. 122, also showing references in broken lines which may be used to minimize distortion when the image is transformed into a rectangular format. Compression of the image in one axis as shown, or expansion thereof in the perpendicular direction transforms the elliptical horizon image into a circular one. The vertical compression may be linear or nonlinear, according to the desired result.

Figure 124:
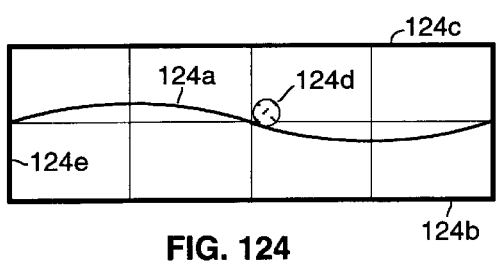

FIG. 124 is a rendering of the significant distortion of a flat horizon in a rectangular image which results from optical or electronic transformation of the annular image of FIG. 122 without compensating for the tilt of the optical system, the central reference for said transformation being the center of the annular image.

Figure 125:
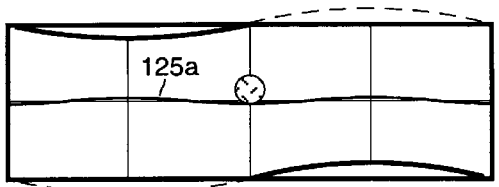

FIG. 125 is a rendering of the reduced distortion of a flat horizon in a rectangular image which results from transformation of the annular image of FIG. 122, whereby distortion is reduced by having the central reference for said transformation at the center of the elliptical horizon image or the center of the outer circle or square which are shown in broken lines.

Figure 126:
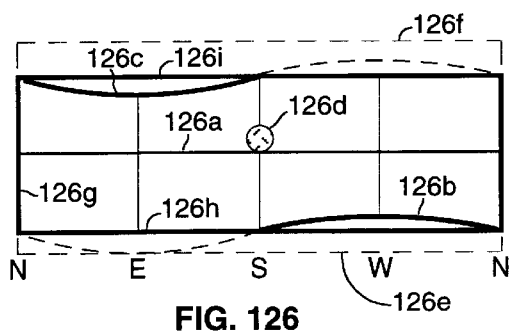

FIG. 126 is a rendering of the proper imaging of a flat horizon in a rectangular image which results from transformation of the annular image of FIG. 122, whereby distortion is reduced through using the same central reference for said transformation as that for FIG. 125, with further correction being provided by scaling of the original annular image in one direction according to FIG. 123. The image or a subset thereof may be photographically, lithographically, optically, or electronically displayed flat as shown or on or in three dimensional surfaces or media.

Figure 127:
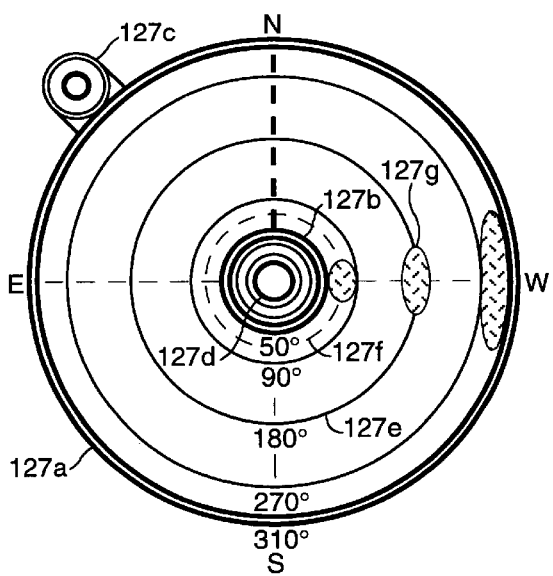

FIG. 127 is a rendering of an annular image such as that produced by an apparatus which may include that of FIG. 52, also showing the imaged appearance of means for accurate indication of tilt 127c, 127d according to FIGS. 51, 71 and 141, and of the limits of coverage 127a, 127b according to FIGS. 52 and 73 through 76.

Figure 128:
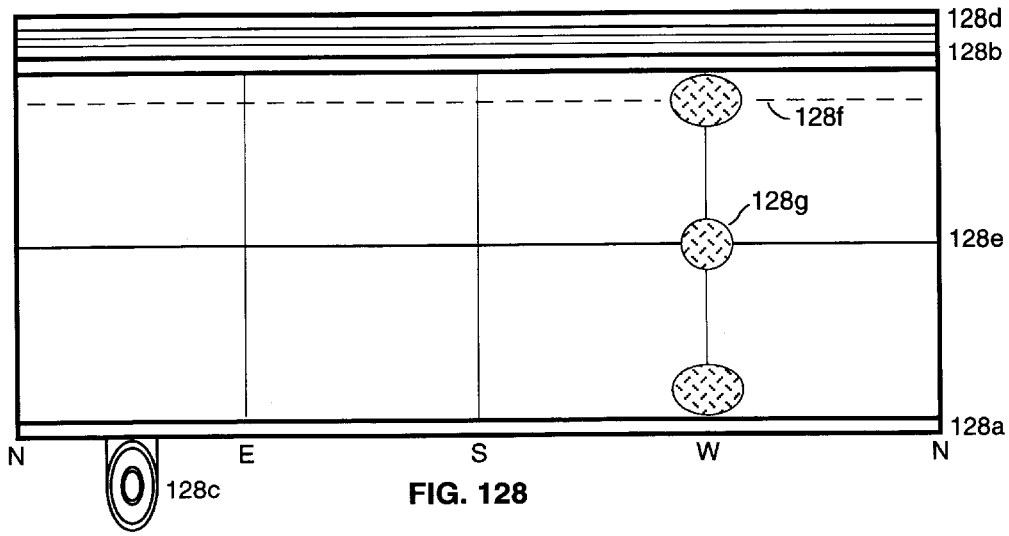

FIG. 128 is a rendering of the vertical angular distribution in a rectangular image which results from transformation of the annular image, also showing the coverage limit information. The thin dashed horizontal line near the top represents an arbitrarily selected imaginary zone of unity expansion, said zone of unity expansion being shown as a thin dashed circle 127b near the center of FIG. 127.

Figure 129:
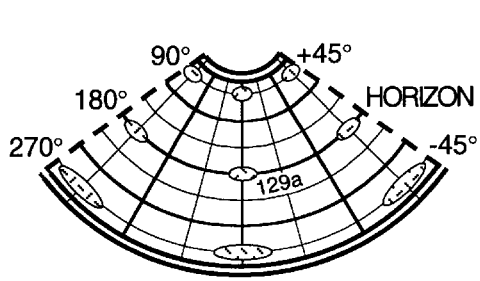

FIG. 129 is a rendering of a segment of an annular image such as that produced by the apparatus of FIG. 51, showing means for accurate indication of the limits of coverage.

FIG. 130 is a rendering of the vertical angular distribution in a rectangular image which results from transformation of the segment of the annular image shown in FIG. 129, also showing the appearance of the same coverage limit information.

FIG. 131 is an illustration of the concept of projecting a flat image onto a cylindrical surface through the use of a distant light source. Where the cylinder has a constant radius, the local image scale in one axis increases according to the reciprocal of the cosine of the off-axis angle.

FIG. 132 is an illustration of the concept of projecting a cylindrical image onto a flat surface with a linear light array that is disposed at the cylinder's center of curvature. Where the cylinder has a constant radius, the local image scale in one axis increases according to the square of the reciprocal of the cosine of the off-axis angle.

FIG. 133 is an illustration of the concept of projecting a flat image onto a spherical surface through the use of a distant light source. In the case of a spherical surface, the local image scale in all axes increases according to the reciprocal of the cosine of the off-axis angle.

FIG. 134 is an illustration of the concept of projecting a spherical image onto a flat surface through the use of a point light source that is disposed at the sphere's center of curvature. In the case of a spherical surface, the local image scale in all axes increases according to the square of the reciprocal of the cosine of the off-axis angle.

FIG. 135 is a rendering of an image in which the local vertical image scale is increased according to the reciprocal of the cosine of the angle of coverage above and below the center.

FIG. 136 is a rendering of an image in which the local image scale is increased according to the reciprocal of the cosine of the angle of coverage away from the center.

FIG. 137 is a rendering of an image in which the local vertical image scale is increased according to the square of the reciprocal of the cosine of the angle of coverage above and below the center. This distribution is like that provided by a film or electronic rotating panoramic camera a rectilinear lens.

FIG. 138 is a rendering of a segment of a rectangular image in which the local image scale is increased according to the square of reciprocal of the cosine of the angle of coverage from a given point. This distribution is like that of a rectilinear lens.

FIG. 139 shows the concept of projecting a flat image 139a onto a cylindrical or spherical surface 139b.

FIG. 140 shows the concept of projecting a cylindrical or spherical image 140a onto a flat surface 140b.

FIG. 141 is a side cross-sectional view of an embodiment of the optical system of the present invention having one reflector surface 141a, subject illumination means 141q, tilt indication means 141p, and afocal imaging optics 141f. Also shown is a video camera 141k having a lens 141j, microphones 141m, 141n, and interface means 141l for image distribution.

FIG. 142 is a side view of an embodiment of the optical system 141a of the invention having a flexible fiber optic 142f connection to an image sensor 142g, also showing image displays 142h, 141n and interface means 142k, 142o, 142p for instrumentation 142l, FIGS. 143, 144, that facilitates image and data processing and distribution which further comprises part of the invention.

The present invention is also applicable to and comprises electronic image processing including computer 142l, 143b, 143f based digital image processing and presentation. Software routines can be used alone or in conjunction with popular image processing software to essentially automate the process of converting annular or circular panoramic images 142q to or from a rectangular format 142s or otherwise modifying them. Image processing steps developed by the applicant to reduce distortion in an image which is transformed from polar to rectangular coordinates through the use of a basic polar coordinates filter include cropping the image to square proportions (or selecting the equivalent image area 123l) that completely encompass the utilized part of the that the circular or annular image 123b, then centering the circle 123a in the circular or annular image image which corresponds to a flat horizon in said square image area. This permits the horizon 125a in a final transformed square or rectangular image to be almost straight. Slightly scaling the image in one dimension 123k to change a slightly elliptical horizon circle to a true circle in the circular or annular image prior to conversion to rectangular coordinates facilitates a completely straight image of a flat horizon 126a. After the image is converted from polar to rectangular coordinates, it is scaled in one axis in order to provide normal proportions for at least objects at the horizon.

Image processing analogous to the applicant's printing and viewing instrumentation and techniques including those for transformation of an annular or circular image 142q to or from a rectangular format 142s or for viewing segments 142j of an annular image may be used to actively correct and view localized areas of annular or circular panoramas, thereby eliminating the need to transform the entire panoramic image and facilitating real time viewing of undistorted sections 142t, 142u of panoramic motion picture or still images. This is useful in virtual reality applications including those where looking straight "up" at the zenith 5c would be desirable.

FIG. 143 illustrates the optical system of the invention 143r, 143w, 143bb, 143dd, 143ee, with image capture and distribution means that further comprise part of the invention. Shown is the association of the invention with articles that facilitate image capture, processing, distribution and display, said articles including computers 143b, 143d, 143e, 143f, 143g, terminals 143y, intranets, the Internet 143c, closed circuit, cable, and broadcast television 143j, satellites and other spacecraft 143s, aircraft 143t, water and underwater craft 143aa, ground vehicles 143cc, terrestrial and spaceborne robotic devices 143v, stationary fixtures 143ff, simulators, games, interactive input devices 143m, 143o, goggles 143p, and monitoring, command and control systems.

The present invention is applicable to videography 141k and live or delayed broadcast of motion picture and still images and other data via means including radio carrier waves 143i, 143s, closed circuit systems 143k, cable systems, or the Internet 143c.

FIG. 144 is a perspective view of a projection embodiment of the present invention that is interfaces to elements of FIGS. 141, 142, and 143, and which provides an interactive virtual reality display that surrounds participants in a home, theater, amusement park, or other setting.

This disclosure is considered as illustrative of the principles of the invention. Further, since numerous modifications and changes will readily occur to those skilled in the art, it is not desired to limit the invention to the exact construction, operation, and appearance as shown and described, and accordingly all suitable modifications and equivalents may be resorted to without thereby departing from the basic principles of the invention. It will be further understood that the invention is susceptible of embodiment in many various forms, some of which are illustrated in the accompanying drawings, and that structural details and modes of fabrication herein set forth may be varied and interchanged to suit particular purposes and still remain within the applicant's inventive concept. It will be still further understood that pixel assignment, image processing, image display, and image and data distribution according to the sum of or any part of the foregoing disclosure can be used separately or in combination to sequentially or simultaneously influence still and motion picture images in whole or in part without departing from the applicant's inventive concept.

What is claimed is:

1. An optical system comprising:
    a convex primary reflector having radial symmetry,
        said primary reflector being in optical communication with a great circle surrounding it, said great circle being perpendicular to the optical axis of said primary reflector,
        said primary reflector having sufficient curvature to be in optical communication with a substantial area in front and behind the plane of said great circle,
        said primary reflector having an optically transparent central zone,
    a secondary reflector having radial symmetry,
        said secondary reflector being coaxially disposed in front of said primary reflector,
        said secondary reflector having its reflective surface facing the reflective surface of said primary reflector,
        said secondary reflector being in optical communication with said great circle surrounding said primary reflector and said area in front and behind the plane of said great circle by means of reflection from said primary reflector,
    whereby said optical system produces a virtual image of said great circle and said area above and below its plane, said virtual image being annular,
        said virtual image being visible from a vantage point behind said optically transparent central zone of said primary reflector due to said vantage point being in optical communication with said great circle and said area in front and behind the plane of said great circle by means of reflection from said secondary reflector and said primary reflector,
    means for mounting said secondary reflector and said primary reflector,
        said means providing a protective darkened shield around the perimeter of said secondary reflector, said shield also acting as a light baffle,
        said means for mounting providing stable support and alignment of said primary reflector and said secondary reflector without causing deformation thereof,
        said means for mounting providing for attachment of said optical system to an article having a focal surface,
        said mounting means not relying on the structure of said primary reflector surface substrate to support said article,
        said mounting means facilitating use of said optical system in any orientation,
        said article being associated with a refracting lens system, said refracting lens system being disposed coaxial to said optical system, both being associated with the formation of a real image of said virtual image at said focal surface,
    whereby said optical system combined with said article facilitates the geometric conversion of said great circle and said area in front and behind the plane of said great circle into a real annular image at the focal surface of said article and the geometric conversion of a two dimensional annular image into a three dimensional projected image.

2. Apparatus according to claim 1 in which said primary reflector comprises a surface of revolution, said surface of revolution having a prolate aspheric figure.

3. Apparatus according to claim 1 in which said primary reflector comprises a surface of revolution, said surface of revolution having a prolate aspheric figure, the virtual image produced by said primary reflector having a constant radial image scale when said primary reflector is viewed from an axial vantage point having an equivalent optical distance of one to four times the diameter of said primary reflector from the apex of said primary reflector.

4. Apparatus according to claim 1 in which said primary reflector comprises a surface of revolution, said surface of revolution having a prolate aspheric figure, said prolate aspheric figure also being radially compressed inward toward the optical axis, whereby the surface said primary reflector is farther from being perpendicular with the optical axis at a zone which immediately surrounds said transparent central zone, whereby said vantage point behind said transparent central zone of said primary reflector is in optical communication with a smaller angular area in front of said great circle, thereby increasing the size of the central angular exclusion zone in front of said primary reflector while increasing the radial proportions of the area immediately surrounding the plane of said great circle, thereby resulting in a larger radial image scale for said area covered on a given image format, owing to the virtual absence of an imaged central obscuration area.

5. Apparatus according to claim 1 in which said primary reflector comprises a surface of revolution, said surface of revolution having a prolate aspheric figure, said prolate aspheric figure also being radially enlarged outward from the optical axis, whereby the surface said primary reflector is closer to perpendicular with the optical axis at a zone which immediately surrounds said transparent central zone, whereby said vantage point behind said transparent central zone of said primary reflector is in optical communication with a greater angular area in front of said great circle, thereby reducing the size of the central angular exclusion zone in front of said primary reflector, radially enlarged primary reflector also permitting said transparent central zone to be enlarged without affecting the field of view, said enlarged transparent zone permitting the use of large aperture refracting optics such as those associated with a camera or a projector, said secondary reflector with its associated mounting and shielding being relatively small in order to minimize obscuration of subject matter in front of said primary reflector, whereby said combination of attributes typically result in a conical obscuration having a diameter of less than 60 degrees.

6. Apparatus according to claim 1 in which said primary reflector comprises a surface of revolution, said surface of revolution having a prolate aspheric figure, said prolate aspheric figure also being torroidal as a result of being radially enlarged outward from the optical axis, whereby the surface of said primary reflector curves backward in the zone immediately surrounding said transparent central zone, whereby the radial zone of said primary reflector by which the inner zone of said secondary reflector is in optical communication with an axial point disposed at a finite distance in front of said optical system by means of reflection from said zone of said primary reflector has a larger diameter than said secondary reflector with its associated mounting and shielding, whereby said vantage point behind said transparent central zone of said primary reflector is in optical communication with the entire area in front of said great circle up to said axial point disposed at a finite distance in front of said primary reflector, thereby eliminating the central angular exclusion zone in front of said primary reflector, the only excluded area being confined to a narrow conical area extending from the perimeter of said secondary reflector with its associated mounting and shielding to said axial point disposed a finite distance in front of said primary reflector, said torroidal primary reflector also permitting said transparent central zone to be enlarged without affecting the field of view, said enlarged transparent zone permitting the use of large aperture refracting optics such as those associated with a camera or projector.

7. Apparatus according to claim 1 in which said primary reflector has a scalloped surface resulting in more than three identical convex lobes disposed evenly around its circumference, each lobe having more than twice the included angle as the angular circumference of the reflector body it occupies; for example, as seen from the front, each lobe of an eight lobe reflector would occupy 45 degrees of the circumference; therefore, each of said lobes would have more than 90 degrees of curvature as seen from the front; said primary reflector providing a sectored virtual image, said image having the same number of sectors as said primary reflector has lobes, each of said sectors covering a circumferential angle of view of more than twice the circumferential angle occupied by each sector, whereby said virtual image covers each point in said great circle and said area in front and behind the plane of said great circle at least twice, thereby providing fully redundant coverage thereof; said twice imaged points having circumferentially separated vantage points and being circumferentially separated in said virtual image, said redundant coverage providing three dimensional information for the entire area of coverage; said optical system also being applicable to the projection of sectored images whereby said redundant images overlap and include three dimensional information; the geometry of said optical system also being applicable for the basis of image processing techniques, algorithms, and software which are associated with viewing, analyzing, and otherwise utilizing images produced and reproduced by said optical system.

8. Apparatus according to claim 1 in which said primary reflector is made of optically transparent material, said optically transparent central zone of said primary reflector consisting of a hole in its reflective coating, the surface of said substrate being radially symmetrical within said hole in reflective coating.

9. Apparatus according to claim 8 in which said primary reflector substrate is plastic, said substrate also extending behind the perimeter of the reflecting surface and providing a protective rim behind said reflecting surface and providing a grip surface to facilitate handling without marring said reflective surface.

10. Apparatus according to claim 1 in which said optically transparent central zone of said primary reflector consists of a hole through said primary reflector substrate.

11. Apparatus according to claim 10 in which said primary reflector consists of a metal substrate having an electrolytically replicated figure.

12. Apparatus according to claim 6 further comprising a round baffle which may be attached to said secondary reflector with its associated mounting and shielding, said round baffle having longitudinal positioning means, whereby the shadow of said round baffle changes the distance of said axial point disposed a finite distance in front of said primary reflector, thereby providing means for said axial point to coincide with the distance of a front projection surface, thereby resulting in a seamless projection across the central part of a projection surface having a finite distance from said optical system, said apparatus being associated with the projection of images which completely surround the viewing participant.

13. Apparatus according to claim 6 in which said secondary reflector is a convex surface of revolution and said secondary reflector with its associated mounting and shielding having a diameter less than forty percent of the diameter of said primary reflector.

14. Apparatus according to claim 1 in which said secondary reflector is a convex surface of revolution, said convex surface of said secondary reflector also facilitating a smaller central obscuration angle.

15. Apparatus according to claim 1 in which said secondary reflector is a convex surface of revolution having a figure which is radially compressed inward toward from the optical axis in order to facilitate an unchanged field of view while not imaging said central transparent area in center of said primary reflector surface, thereby allowing the radial image scale of the covered area to be increased owing to the virtual absence of imaged central obscuration area, said convex surface also providing for the correction of off-axis aberrations.

16. Apparatus according to claim 1 in which the figure of said secondary reflector surface is an aspheric surface of revolution and provides means for the substantial correction of off-axis astigmatism which results from off-axis reflections off of said primary reflector, said apparatus further comprising refracting optics which are coaxial with said primary reflector and in longitudinal proximity to said transparent central zone of said primary reflector, said refracting optics correcting for residual aberrations from said primary reflector and said secondary reflector.

17. Apparatus according to claim 1 in which the substrate of said secondary reflector is transparent, having the reflective surface on the side opposite the primary reflector, the side of said substrate toward said primary reflector also having a surface of revolution and acting as a refracting surface, said refracting surface not being concentric with said secondary reflector surface, said refracting surface providing means for the substantial correction of off-axis astigmatism, said optical system further comprising refracting optics which are coaxial with said primary reflector and in longitudinal proximity to said transparent central zone of said primary reflector, said refracting optics correcting for residual aberrations from said primary reflector and said secondary reflector.

18. Apparatus according to claim 1 in which the secondary reflector is convex, further comprising an annular reflector which is coaxial with said secondary reflector, said annular reflector having sufficient curvature to cover the same area in front and behind said great circle as said primary reflector, said annular reflector having a longitudinal position which places its virtual image in close longitudinal proximity to that of said virtual image from said primary reflector as reflected in said secondary reflector, said virtual image from said annular reflector being visible from a vantage point behind said optically transparent central zone of said primary reflector due to said vantage point being in optical communication with said great circle and said area in front and behind the plane of said great circle by means of reflection from said annular reflector, said annular reflector providing redundant coverage, said redundant coverage providing three dimensional information for the entire area of coverage.

19. Apparatus according to claim 7 in which the secondary reflector is convex, further comprising an annular reflector which is coaxial with said secondary reflector, said annular reflector having sufficient curvature to cover the same area in front and behind said great circle as said primary reflector, said annular reflector having a longitudinal position which places its virtual image in close longitudinal proximity to that of said virtual image from said primary reflector, as reflected in said secondary reflector, said virtual image from said annular reflector being visible from a vantage point behind said optically transparent central zone of said primary reflector due to said vantage point being in optical communication with said great circle and said area in front and behind the plane of said great circle by means of reflection from said annular reflector, said annular reflector providing redundant coverage, said redundant coverage providing three dimensional information in all axes of the entire area of coverage.

20. Apparatus according to claim 1, further comprising at least one refracting optic, said refracting optics having a negative optical power, said refracting optics being coaxial with said primary reflector and in longitudinal proximity to said transparent central zone of said primary reflector, whereby said refracting optics provide for said vantage point behind said optically transparent central zone of said primary reflector to be moved to a substantial axial distance behind said transparent central zone, thereby allowing unobstructed optical communication between said moved vantage point and the entirety of said secondary reflector while allowing said transparent central zone of said primary reflector to have a relatively small diameter.

21. Apparatus according to claim 1 in which said mounting means for connecting said primary and said secondary reflector consist of a single darkened strut, said strut being coaxial with both reflectors, said strut having a diameter which is increased toward the end closest to said secondary reflector, said axial strut being coaxially supported in front of said vantage point by means of an optically transparent substrate, whereby the combination of said strut and transparent substrate provide stable support and provide alignment means for said secondary reflector without obstructing any of the subject matter.

22. Apparatus according to claim 21 in which said transparent substrate is in a cell, said cell being attached to mounting structures for said primary reflector and said article, said cell protruding in front of the apex of said primary reflector, said cell being removable, whereby said cell, said axial strut, and said secondary reflector assembly may be removed from the overall optical system as a unit, said axial strut also having adjustment means for its length, said darkened shield associated with said secondary reflector having provision to accept a variety of additional shields; said shields being interchangeable, said shields being flat cylindrical, and conical; the perimeter of said conical and cylindrical shields extending a short distance toward said primary reflector.

23. Apparatus according to claim 1 in which said secondary reflector shield has a conical shape of moderate taper, said conical shape having the largest diameter at the end toward said the primary reflector, said shield extending a moderate distance from around the perimeter of said secondary reflector toward a zone near the perimeter of said primary reflector.

24. Apparatus according to claim 1 in which said mounting means for connecting said primary and said secondary reflector consist of a single vane, said vane being off-axis and having a cross section of less than three degrees when viewed from the optical axis, said vane also having means to route electrical cable and similar articles, said vane further having means to accept an attachment providing means for occulting bright light sources which would otherwise cause flare; whereby said vane provides stable support and alignment means for said secondary reflector.

25. Apparatus according to claim 1 in which said mounting means for connecting said primary and said secondary reflector consist of a solid transparent optical substrate between said reflectors, said reflectors being comprised of internal reflective surfaces in said optical substrate, said substrate having an outer surface which is convex except for the area occupied by the secondary reflector surface, said substrate also providing refracting means to extend the field of view of said primary reflector to cover the entire sphere around itself, whereby the front part of said substrate refracts light from an axial point a finite distance in front of said optical system around said secondary reflector surface and toward an inner zone of said primary reflector surface around said secondary reflector surface and toward, and whereby the rearward surface of said substrate refracts light from an axial point a finite distance behind the optical system toward the perimeter of said primary reflector surface at an angle which causes said axial point to be in optical communication with said vantage point behind said transparent central zone in said primary reflector surface, said optical system also having an opaque covering around the perimeter of said secondary reflector to act as a light baffle, said optical substrate provides permanent support and alignment of said reflector surfaces, said solid optical system further comprising refracting optics which are coaxial with said primary reflector and behind said transparent central zone of said primary reflector substrate, said refracting optics correcting for residual aberrations from said solid transparent optical substrate, said primary reflector and said secondary reflector, said corrected aberrations including astigmatism and lateral chromatic aberration; said optics also forming a real image of said virtual image at said focal surface as well as correcting aberrations when the invention is used to project an annular image onto a three dimensional surface or into a three dimensional media.

26. Apparatus according to claim 1, further comprising a durable rim behind the perimeter of said primary reflector, said rim having a slightly larger diameter than said reflector and, said rim providing protection for said primary reflector and serving as a grip surface to permit handling said primary reflector without soiling the optical surface, said rim also having provision to accurately indicate the limit of coverage for said primary reflector, said rim also being connected to the mounting means for said article having a focal surface, said means for mounting and said rim also having provision for the attachment of accessories such as a clear storage and composition tube, a solar occulting disk, a level indicator, and data display devices, said level indicator and display devices being directly visible and imaged at said focal surface of said article.

27. Apparatus according to claim 1, further comprising a covering over the inner and outer boundaries of said primary reflector surface, said covering not being specular, said covering providing means to accurately indicate the limit of coverage for said primary reflector.

28. Apparatus according to claim 1, further comprising refracting lenses, said refracting lenses being coaxial with and having a diameter smaller than said primary reflector, said means for mounting including a cell for said refracting optics, said means for mounting positioning said refracting lenses between said secondary reflector and the focal surface of said article (typically behind said transparent central zone in said primary reflector), and in unobstructed optical communication with both, said refracting optics being in optical communication with said great circle surrounding said primary reflector by means of reflection from said primary reflector and said secondary reflector, said refracting lenses having a longitudinal position corresponding to said axial vantage point being in optical communication with said great circle and said area in front and behind the plane of said great circle by means of reflection from said secondary reflector and said primary reflector.

29. Apparatus according to claim 28, further comprising a filter holder.

30. Apparatus according to claim 28, further comprising a series of refracting lenses in interchangeable cells which are each capable of producing a real image from the overall optical system at the focal surface, said cells being of appropriate lengths to produce proper focus and image size at said focal surface when used with the intended articles having a focal surface, said cells also incorporating adaptation and mounting means for appropriate standardized adapters and camera and instrumentation mounting interfaces.

31. Apparatus according to claim 28 in which said refracting lenses are capable of producing a real annular image of the virtual image resulting from reflections off said primary reflector and said secondary reflector, said real image being at the focal surface of said article, mounting means for said refracting lenses also providing means for aperture adjustment.

32. Apparatus according to claim 31 in which said refracting lenses are of the zoom type, whereby images of different sizes are produced by adjusting the focal length of said zoom lens, whereby the same optical system can be used advantageously with different formats.

33. Apparatus according to claim 28 in which said refracting optics cause light rays from a given point in the subject to be parallel as they exit said optical system, thereby permitting use of said optical system in front of the fixed or interchangeable lens of an article having a focal surface.

34. Apparatus according to claim 28 in which said refracting lenses substantially correct curvature of the virtual image resulting from reflections off said primary reflector and said secondary reflector, thereby facilitating the optimum use of a flat focal surface, said refracting lenses typically comprising at least one refracting lens, at least one of which has negative optical power, said negative lens being positioned in relatively close proximity to said focal surface, further, where the application permits, said negative lens can be virtually in contact with said focal surface.

35. Apparatus according to claim 28 in which said refracting lenses substantially correct aberrations such as off-axis astigmatism which result from off-axis reflections off of said primary reflector and said secondary reflector.

36. Apparatus according to claim 28 in which the means for mounting includes a central cell, said cell protruding back behind said primary reflector, said protruding cell having a slot around its circumference which may be used to attach accessories and facilitate storage of the overall optical system in a case without any optical surfaces being in contact with said case, said cell being capable of supporting the weight of the entire optical system, attributes of said cell including said slot providing means to attach devices including a solar occulting disk, a level indicator, and data display devices; at least some of said level indicator and display devices having provision to be directly visible and imaged at said focal surface of said article having a focal surface, said cell also having provision to house said refracting lenses.

37. Apparatus according to claim 1, further comprising an occulting attachment consisting of a small darkened occulting body which is affixed to the end of a thin wire of sufficient rigidity to prevent visible oscillation of said occulting body by wind or moderate motion, said attachment providing for reduction of flare by interrupting specular optical communication between a bright light source such as the sun and the focal surface of said article, said occulting body having an angular subtense larger than that of said bright light source as seen from the corresponding area of said virtual image from said primary reflector, thereby causing the image of said occulting body to completely cover said bright light source in the image formed by said optical system, said occultation resulting in a drastic reduction in unwanted reflections and flare; said means for mounting having provision for attaching said occulting attachment to either said secondary reflector shield or a rim surrounding said primary reflector, said mounting means also providing for adjustment of said occulting body position.

38. Apparatus according to claim 1, further comprising a level indicator which is attached in close proximity to and slightly behind the perimeter of said primary reflector, said level indicator having easily distinguished indication means when observed from above and below, said secondary reflector being larger than what is required to image said primary reflector alone, said secondary reflector shield providing means for optical communication between said level and the focal surface of said article, said level being imaged at said focal surface by means of reflection via said secondary reflector, whereby said level is visible in the viewfinder of a camera, thereby facilitating effective hand held use of the optical system since the photographer and said camera are behind said primary reflector.

39. Apparatus according to claim 6, further comprising a periscopic optical system which points directly behind said optical system, said periscopic optical system being attached to said optical system at a point between the back of said primary reflector and the front of said article having a focal surface, said attachment means including a hollow tube, mirrors, and relay optics, said periscopic optical system having a circular field of view greater than the conical exclusion zone behind said primary reflector, the image from said periscopic optical system being imaged at a common focal surface with the annular image from said optical system, but in an area not occupied by said annular image, whereby the overall optical system images the entire sphere around itself on a single focal surface; further, the use of a beam splitter on a transparent support which is in proximity to said focal surface will allow said circular image to be imaged in the center of said annular image.

40. Apparatus according to claim 1, used in conjunction with or incorporated into an article which includes a camera, photographic optical system, electronic image system, or motion picture system, said apparatus or article further comprising one or more illuminators which include flash illuminators to provide means for 360 degree illumination of the subject matter around said apparatus, said illumination being compatible with still and motion imaging.

41. Apparatus according to claim 40, associated with an electronic imaging sensor, provision of subject illumination means also employing a range gated flash illumination and imaging by means of an image sensor exposure of only a few to a few dozen nanoseconds, which in turn results in a shorter effective exposure for objects nearest the optical system; further provision thereof in which a flash of illumination is actually directed through said optical system by means of a beam splitter prior to the initiation on an exposure.

42. Apparatus according to claim 1, further comprising an electronic imaging sensor capable of readout without mechanical shuttering, said optical system being capable of imaging said great circle and said area in front and behind the plane of said great circle; said imaging being accomplished without any moving parts.

43. Apparatus according to claim 42, said combination also having provision and interface capability to facilitate real time digital processing of at least 24 images per second, whereby said optical system may also be associated with a separate full motion imaging system.

44. An optical system comprising:
a convex specular reflector having radial symmetry,
said primary reflector being in optical communication with a great circle surrounding it, said great circle being perpendicular to the optical axis of said primary reflector,
said primary reflector having sufficient curvature to be in optical communication with a substantial area in front and behind the plane of said great circle,
whereby said optical system produces a virtual image of said great circle and said area above and below its plane, said virtual image being annular,
said virtual image being visible from a vantage point in front of said primary reflector by means of said vantage point being in optical communication with said great circle and said area in front and behind the plane of said great circle by means of reflection from said convex reflector,
means for mounting and said reflector,
said means for mounting providing stable support and alignment of said primary reflector without causing deformation thereof,
said means for mounting providing for attachment of said optical system to an article having a focal surface,
said article being in front of said reflector,
said means providing a shield in close proximity to said article, said shield preventing stray light from entering from the side,
said mounting means facilitating unobstructed optical communication between said article and the utilized radial zones of said convex reflector,
said article being associated with a refracting lens system, said refracting lens system being disposed coaxial to said optical system, both being associated with the formation of a real image of said virtual image at said focal surface,
whereby said optical system combined with said article facilitate the geometric conversion of said great circle and said area in front and behind the plane of said great circle into a real annular image at the focal surface of said article as well as conversion of a flat annular image into a three dimensional image which surrounds the invention.

45. Apparatus according to claim 44 in which said convex reflector comprises a surface of revolution, said surface of revolution having a prolate aspheric figure, said prolate aspheric figure also being radially enlarged outward from the optical axis, whereby the surface said convex reflector is closer to perpendicular with the optical axis at a zone which immediately surrounds the reflection of said article having a focal surface, whereby said focal surface is in optical communication with a greater angular area in front of said great circle, thereby reducing the size of the central angular exclusion zone in front of said convex reflector caused by said article.

46. Apparatus according to claim 44 in which said convex reflector comprises a surface of revolution, said surface of revolution having a prolate aspheric figure, said prolate aspheric figure also being torroidal as a result of being radially enlarged outward from the optical axis, whereby the surface of said torroidal reflector curves backward in the zone immediately surrounding an area the size of a central obstruction, whereby the radial zone of said torroidal reflector by which the focal surface of said article is in optical communication with an axial point disposed at a finite distance in front of said optical system by means of reflection from said zone of said torroidal reflector has a larger diameter than the obstruction of said article, thereby eliminating the central angular exclusion zone in front of said reflector, the only excluded area being confined to a narrow conical area extending from the perimeter of said article with any associated mounting and shielding to said axial point disposed a finite distance in front of said torroidal reflector.

47. Apparatus according to claim 44 in which said convex reflector has a scalloped surface resulting in more than three identical convex lobes disposed evenly around its circumference, each lobe having more than twice the included angle as the angular circumference of the reflector body it occupies; for example, as seen from the front, each lobe of an eight lobe reflector would occupy 45 degrees of the circumference; therefore, each of said lobes would have more than 90 degrees of curvature as seen from the front; said scalloped reflector providing a sectored virtual image, said image having the same number of sectors as said scalloped reflector has lobes, each of said sectors covering a circumferential angle of view of more than twice the circumferential angle occupied by each sector, whereby said virtual image covers each point in said great circle and said area in front and behind the plane of said great circle at least twice, thereby providing fully redundant coverage thereof; said twice imaged points having circumferentially separated vantage points and being circumferentially separated in said virtual image, said redundant coverage providing three dimensional information for the entire area of coverage, said optical system also being applicable to the projection of sectored images whereby said redundant images overlap and include three dimensional information; the geometry of said optical system are also being applicable for the basis of image processing techniques, algorithms, and software which are associated with viewing, analyzing, and otherwise utilizing images produced and reproduced by said optical system.

48. Apparatus according to claim 44, having a secondary reflector disposed coaxially in front of said convex reflector, said secondary reflector providing optical communication between said convex reflector and an axial vantage point in relatively close proximity to the apex of said convex reflector, said optical system further comprising refracting optics which produce a real annular image of the virtual image from said convex reflector, as reflected in said secondary reflector, said real image being formed at a shielded focal surface in close proximity to the front central surface of said convex reflector.

49. Apparatus according to claim 44, further comprising refracting lenses to correct for curvature of the virtual image and aberrations resulting from oblique reflections off said convex reflector, means for coaxially mounting said refracting lenses in front of said convex reflector, said mounting means including a cell for said refracting lenses and facilitating optical communication between said lenses, said article, and said primary reflector.

50. Apparatus according to claim 44 in which said mounting means consist of a single darkened strut, said strut being coaxial with said reflector, said strut having a diameter which is increased toward the end having the greatest distance the focal surface, said strut being coaxially supported in front of said article by means of an optically transparent substrate, whereby the combination of said strut and transparent substrate provide stable support and alignment means for said reflector, whereby said strut is thin enough to facilitate unobstructed optical communication between said article and said convex reflector, and between said convex reflector and said area in front and behind the plane of said great circle, said strut and said transparent substrate being of sufficient thickness to support the full weight of said article or said convex reflector.

51. Apparatus according to claim 50 in which said axial strut extends to near the optical center of imaging lenses associated with said article, said axial strut being hollow and facilitating the routing of wires without obstructing the subject, whereby said wires are routed from an axial to an off-axis position in close proximity to the optical center of said imaging lenses.

52. Apparatus according to claim 44 in which said mounting means for connecting said convex reflector and said article consist of a single vane, said vane being off-axis and having a cross section of less than three degrees when viewed from the optical axis, said vane also having means to route electrical cable and similar articles, said vane further having means to accept an attachment providing means for occulting bright light sources which would otherwise cause flare; whereby said vane provides stable support and alignment means for an article including said article having a focal surface.

53. Apparatus according to claim 44, whereby said optical system is associated with a projector and a cylindrical projection surface to facilitate the geometric conversion of an annular image into a cylindrical projection around said optical system, whereby said convex reflector has a strong aspheric figure which facilitates correct image proportions and provides substantially constant projection brightness throughout the projection area, said cylindrical projection being applicable to display and printing.

54. Apparatus according to claim 44, whereby said optical system is associated with a projector and a spherical projection surface to facilitate the geometric conversion of an annular image into a spherical projection around said optical system, whereby said convex reflector is at the center of said spherical projection surface, said primary reflector having an aspheric figure which facilitates correct image proportions and constant projection brightness throughout the projection area.

55. Apparatus according to claim 44, whereby said optical system is associated with a projector and a spherical or semi spherical projection surface to facilitate the geometric conversion of an annular image into a spherical projection around said optical system, whereby said convex reflector is at a position other than the center of said spherical or semi spherical projection surface, said primary reflector having a strong aspheric figure which facilitates correct image proportions and constant projection brightness throughout the projection area in spite of the varying distances to said projection area, said apparatus being applicable to applications including virtual reality games and simulators.

56. Apparatus according to claim 44, whereby said optical system is used to image, display, and simulate phenomena associated with a total solar eclipse, said optical system being associated with a projector for display of said subject matter by projection, whereby said convex reflector is at a position other than the center of a spherical or semi spherical projection surface, said primary reflector having a strong aspheric figure which facilitates correct image proportions and constant projection brightness throughout the projection area in spite of the varying distances to said projection area.

57. Apparatus according to claim 55, in which a plurality of said optical systems are utilized to project images into multiple rooms, including multiple portal virtual reality suites and theaters; said apparatus providing for the active masking of projection onto doorways which may be opened and closed, said masking accomplished by means of masks which are positioned in order to obstruct optical communication between an open doorway and the projection source, said masking means having provision to be synchronized with the opening and closing of doors and portals between different rooms; further, a fixed mask may be used where a doorway is always open, said fixed mask being a separate part or a coating which is applied to the surface of said convex reflector.

58. Apparatus according to claim 55, whereby two of said optical systems are associated with a projector and a spherical or semi spherical projection surface, said optical systems being off center and on opposing ends of said spherical projection area, said arrangement facilitating the geometric conversion of two annular images into a spherical projection which covers the entire inside of said spherical projection area without obstructing the center of said projection area or requiring projector light to pass through the center of said spherical projection area, thereby allowing members of an audience to be positioned at and near the center of said projection area, said reflector also having provision for rear projection means onto an area surrounding the back surface of its perimeter.

59. Apparatus according to claim 58, further comprising means to suspend members of an audience at and near the center of said projection area, said suspension means having provision for lowering and raising an audience member to and from the floor, the surface of said projection area under the audience being comprised of inexpensive modular sections which can be replaced if soiled by a participant's feet or the results of motion sickness.

60. Apparatus and means for geometric conversion of a 360 degree panoramic image into an annular image having polar projection, said apparatus comprising a tilting easel which receives unexposed photographic media, said easel having tilt adjustment means a concave focal surface which is curved according to a conical surface, said focal surface having the smallest radius of curvature at the end closest to an enlarging lens;

said easel being combined with a photographic enlarger having a light source and image carrier, an enlarging lens of shorter focal length than the lens which photographed the original image, a tiltable lens standard to compensate for tilt of said easel in order to maintain high resolution, and means for accurately positioning and securing said easel in optical communication with said enlarging lens;

said combination resulting in a greater enlargement of one end of a rectangular section of said panorama when a segment of said panorama is projected onto said easel so that its vertical angle of view (assuming the panorama is a conventional horizontal one) is distributed up the vertical tilt of said easel, whereby the resulting image is a truncated wedge shape having borders and lines perpendicular to its vertical dimension which are smoothly curved as a result of being projected onto said conical focal surface of said easel, whereby a complete smoothly curved and flat 360 degree annular image results from assembling a series of truncated wedge shaped images produced through use of said apparatus and means;

said apparatus and means also facilitating the incremental geometric conversion of an annular image into a rectangular image by implementing said means in reverse, whereby a complete 360 degree rectangular panorama results from assembling a series of the rectangular images which are produced by utilization of said apparatus and means;

said apparatus and means also facilitating extraction and transformation of limited parts of an annular image.

61. Apparatus and means according to claim 60 whereby the geometric conversion of the image is accomplished by exposing photographic media through a slit combined with said tilting easel, said easel also having means to translate the photographic media under said slit, said easel being in optical communication with said photographic enlarger, with said photographic enlarger also having a rotating carrier for the original annular image, whereby the resulting 360 degree image and images extracted therefrom are continuous and seamless.

62. Apparatus and means according to claim 60, also associated with the use of an image acquired with an optical system having hyper hemispherical coverage to produce said original annular image, said optical system typically incorporating a reflector having a prolate aspheric figure which results in an annular image having increasing radial image scale toward its perimeter, whereby use and implementation of said apparatus and means will result in an undistorted 360 degree rectangular panorama and images extracted therefrom.

63. Apparatus and means according to claim 60 whereby vertical distribution of the resulting geometrically converted image is modified by re-imaging said converted image on a cylindrical easel having an axis which is perpendicular to the axis of said tilting easel, the axis of said cylindrical easel being parallel with the projected horizon of a horizontal panorama.

64. Apparatus and means according to claim 60, whereby geometric conversion of the image is accomplished by exposing photographic media through a slit that is combined with said tilting easel, said easel also having means to translate said photographic media under said slit, said easel being in optical communication with said photographic enlarger, said photographic enlarger also having a rotating carrier for the original annular image, whereby said annular image is rotated by said rotating carrier and is progressively exposed onto said photographic media through said slit, whereby the resulting 360 degree image and images extracted therefrom are continuous and seamless, said easel also having means to warp said photographic media and said slit in a direction that is perpendicular to the motion of said photographic media.

65. Apparatus and means according to claim 64, also associated with an image that is acquired with an optical system having more than hemispherical coverage, whereby said apparatus and means provide substantially undistorted 360 degree rectangular panoramas and images extracted therefrom.

66. Apparatus and means according to claim 60 also comprising a linear gradient neutral density filter to substantially compensate for the range of brightness due to differing lens to easel distances and the range of angles at which the light from the image source impinges on the easel, whereby the density resulting projected image is substantially constant, whereby the density of resulting print or film is substantially consistent.

67. Apparatus and means according to claim 60 also comprising active linear dodging and active color filtration means, said active filtration means being accomplished by registering appropriate color printing filters with a dodging mask in such a way that both said filters and said mask can be moved together, whereby the edges of said filters precede the leading edge of said dodging mask as said registered assembly is moved between said photographic enlarger and said easel; said active filtration providing means to compensate for reciprocity failure in the photographic media resulting by the variable exposure time which is required due to the pronounced tilt of said easel, whereby the density and color rendition of a resulting print or film is substantial consistent.

* * * * *